(12) United States Patent
Kubo et al.

(10) Patent No.: US 7,882,758 B2
(45) Date of Patent: Feb. 8, 2011

(54) TRANSMISSION AND METHOD OF UP-SHIFTING FOR TRANSMISSION

(75) Inventors: Katsumi Kubo, Saitama (JP); Ryo Matsui, Saitama (JP); Kouhei Ohsono, Saitama (JP); Toshio Hiyoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/233,226

(22) Filed: Sep. 18, 2008

(65) Prior Publication Data

US 2009/0078073 A1 Mar. 26, 2009

(30) Foreign Application Priority Data

Sep. 21, 2007 (JP) .............................. 2007-245429
Sep. 21, 2007 (JP) .............................. 2007-245430

(51) Int. Cl.
F16H 3/08 (2006.01)
F16H 59/00 (2006.01)

(52) U.S. Cl. ........................................ 74/372; 74/337.5
(58) Field of Classification Search ........................ None
See application file for complete search history.

(56) References Cited

U.S. PATENT DOCUMENTS

| | | | |
|---|---|---|---|
| 6,032,774 | A | 3/2000 | Gadd |
| 6,409,000 | B1 | 6/2002 | Itoh et al. |
| 6,675,667 | B1 | 1/2004 | Pelletier et al. |
| 6,898,993 | B2 * | 5/2005 | Matsumoto et al. ........... 74/371 |
| 6,978,692 | B2 | 12/2005 | Thery |
| 2009/0078071 | A1 * | 3/2009 | Kubo et al. ................... 74/333 |
| 2010/0071493 | A1 * | 3/2010 | Matsumoto ................ 74/337.5 |

FOREIGN PATENT DOCUMENTS

EP 1452739 A 10/1976

(Continued)

OTHER PUBLICATIONS

European Search Report dated Apr. 24, 2009, issued in corresponding European Patent Application No. EP 08 16 4627.

(Continued)

*Primary Examiner*—Dirk Wright
(74) *Attorney, Agent, or Firm*—Westerman, Hattori, Daniels & Adrian, LLP

(57) ABSTRACT

The driving force can be transmitted at the time of both acceleration and deceleration in an engaged state where a first engagement face of a strut is forced to protrude inside a cutaway of a gear. The driving force is transmitted at the time of acceleration and the transmission of the driving force can be cut off at the time of deceleration in a one-way state where the first engagement face of the strut and the cutaway of the gear are made either to engage with or to disengage from each other in accordance with the rotational direction of the gear relative to the rotational shaft. The transmission of the driving force can be cut off at the time of both acceleration and deceleration in a disengaged state where the first engagement face of the strut is forced to withdraw from the cutaway of the gear. In addition, the decreasing of the transmission efficiency caused by friction between the strut and the gear can be prevented.

10 Claims, 61 Drawing Sheets

FOREIGN PATENT DOCUMENTS

| | | |
|---|---|---|
| JP | 45-35687 | 11/1970 |
| JP | 50-25963 | 3/1975 |
| JP | 54-108169 A | 8/1979 |
| JP | 54-114670 A | 9/1979 |
| JP | 61-39871 Y2 | 11/1986 |
| JP | 5-47592 U | 6/1993 |
| JP | 2003-508704 A | 3/2003 |
| JP | 2004-529294 A1 | 9/2004 |
| JP | 3838494 B2 | 10/2006 |
| WO | 98/10203 A1 | 3/1998 |

OTHER PUBLICATIONS

Japanese Office Action dated Jul. 1, 2009, issued in corresponding Japanese Patent Application No. 2007-245429.

Japanese Office Action dated Nov. 5, 2009, issued in corresponding Japanese Patent Application No. 2007-245429.

\* cited by examiner

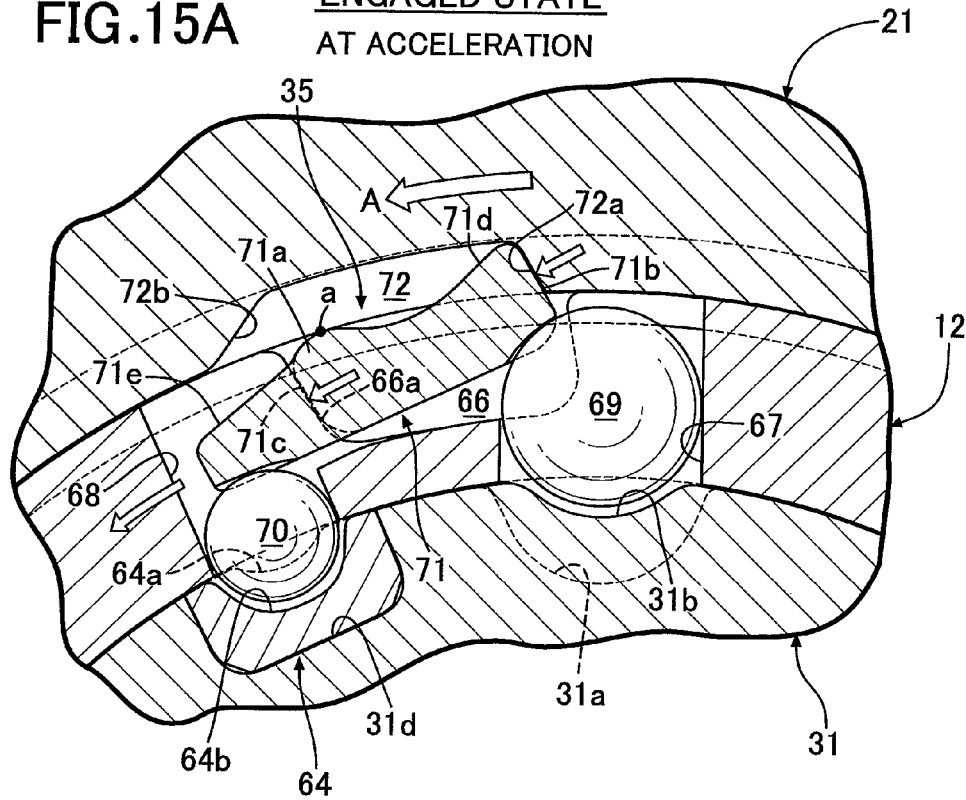
FIG.15A ENGAGED STATE AT ACCELERATION
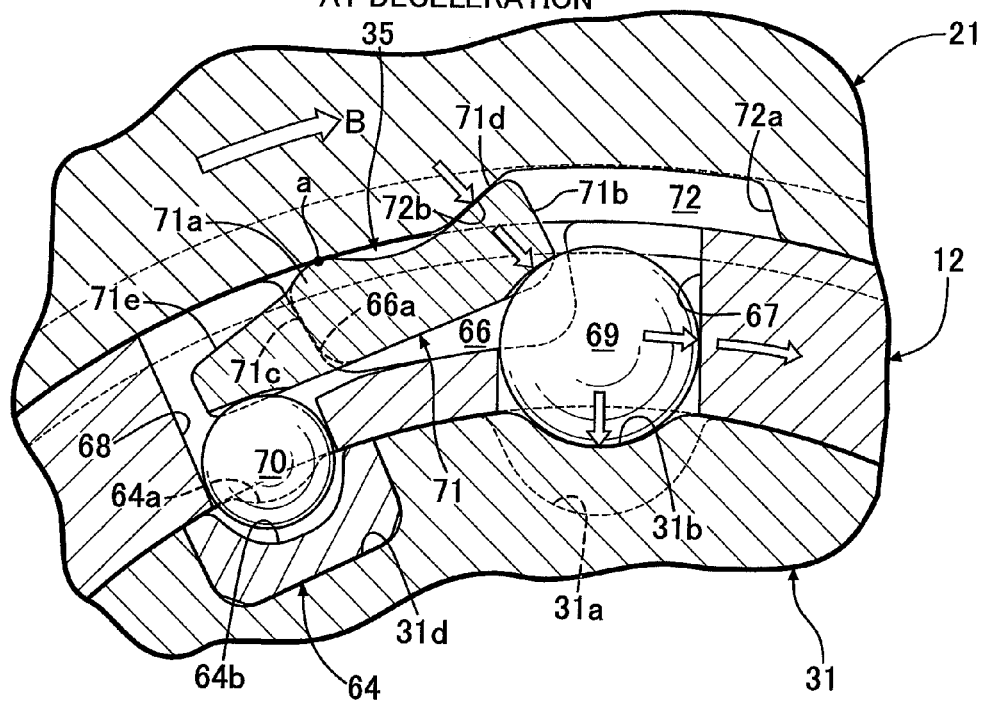
FIG.15B ENGAGED STATE AT DECELERATION

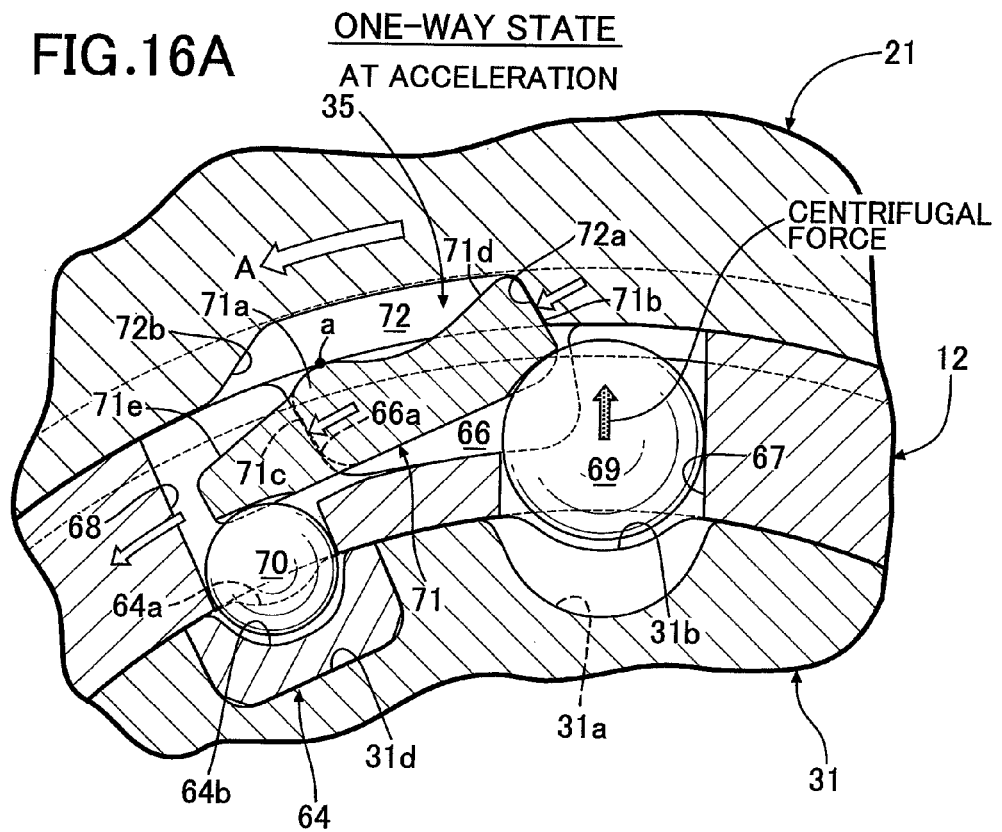
FIG.16A ONE-WAY STATE AT ACCELERATION
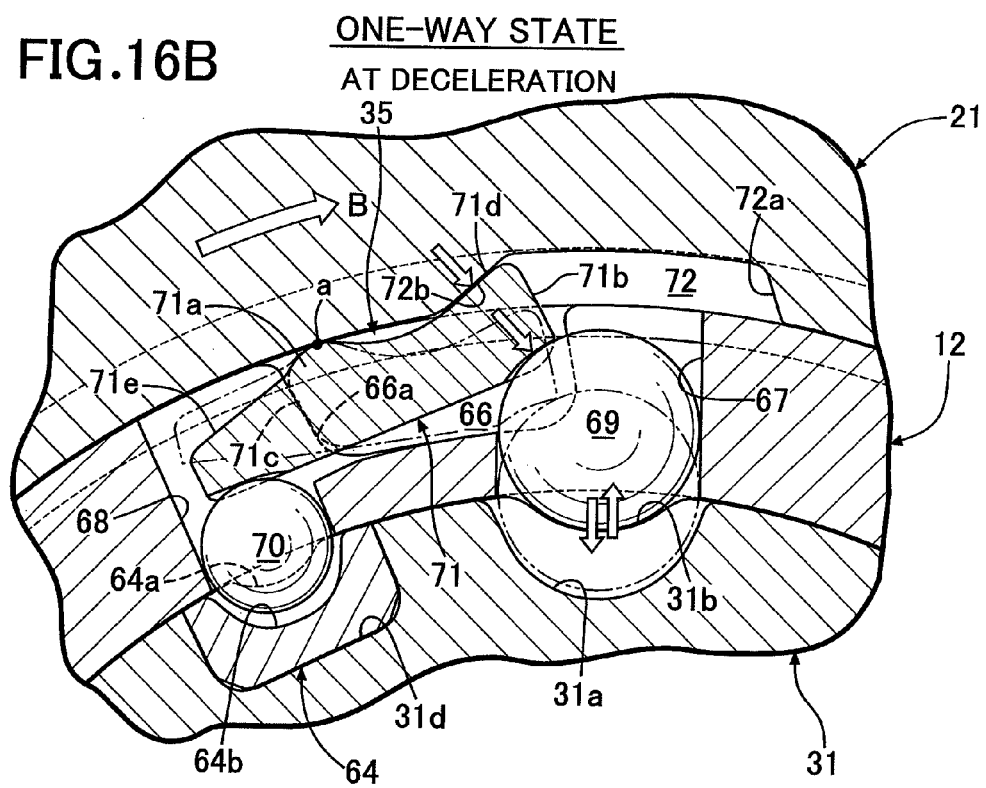
FIG.16B ONE-WAY STATE AT DECELERATION

DISENGAGED STATE

- Shift Position(Drive Gear);1st to 2nd
- Actuator Rotation Angle;70deg
- Other Strut Condition;3rd-7th Unlocked

- Shift Position(Drive Gear);3rd to 2nd
- Actuator Rotation Angle;106.5deg
- Other Strut Condition;1st,3rd-7th Unlocked

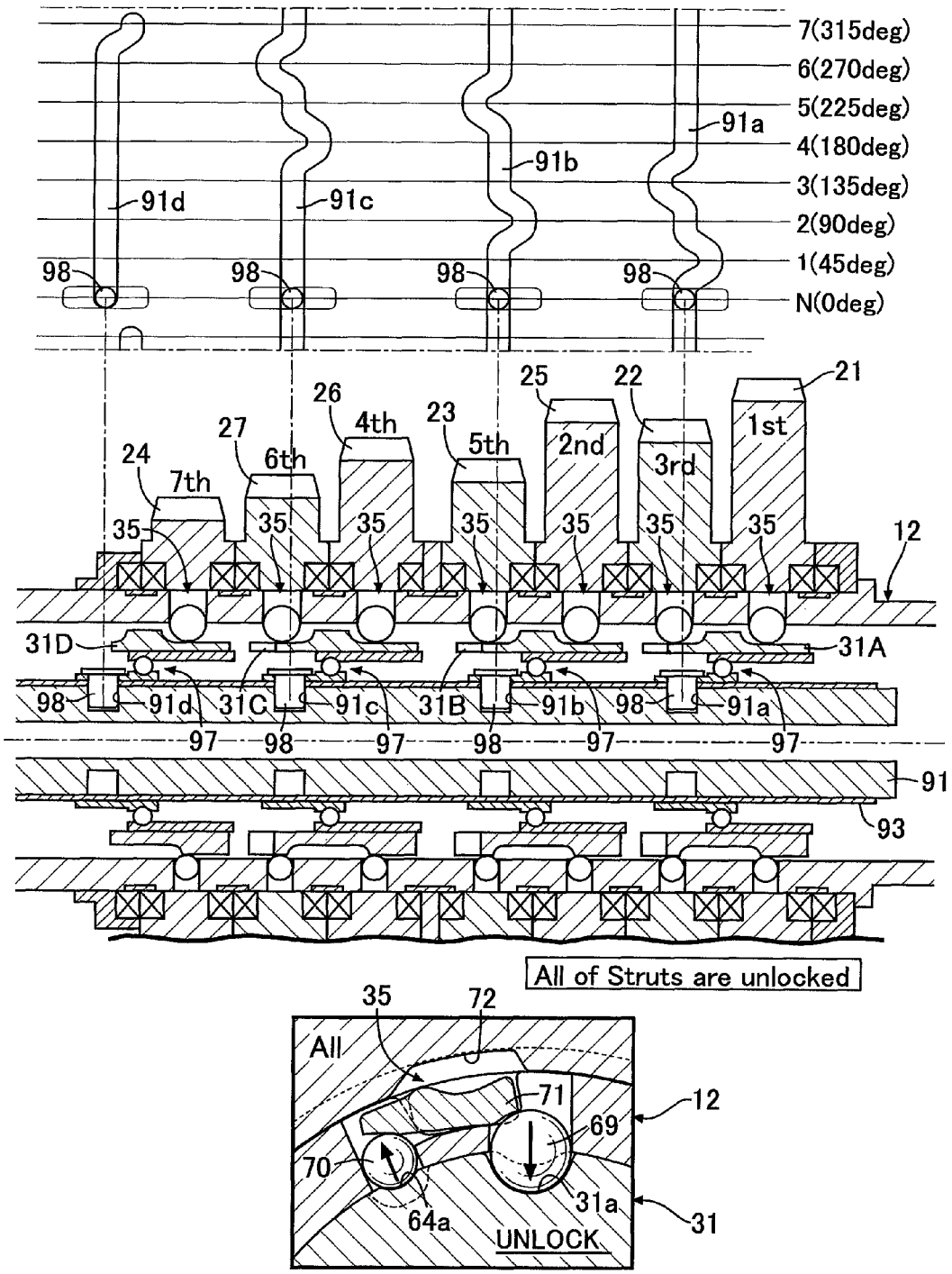

TRANSMISSION AND METHOD OF UP-SHIFTING FOR TRANSMISSION

BACKGROUND OF THE INVENTION

1. Field of the Invention

The present invention relates to a transmission in which plural gears are relatively rotatably supported on rotational shafts and in which a desired shift stage can be achieved by selectively connecting any one of the plural gears to the corresponding one of the rotational shafts by means of a corresponding clutch mechanism. The present invention also relates to a method of up-shifting for the transmission.

2. Description of the Related Art

Japanese Patent No. 3838494 discloses a transmission for a bicycle with the following characteristic features. The transmission includes three transmission shafts disposed in parallel to one another. Plural gears corresponding respectively to various shift stages are fixed on a second transmission shaft located in the middle of the three transmission shafts. Plural gears corresponding respectively to the shift stages are relatively rotatably supported on each of first and third transmission shafts located respectively on the both sides of the second transmission shaft. The gears on the second transmission shaft are meshed with the gears on the first and the third transmission shafts. Each of the first and the third transmission shafts is formed to have a hollow structure. Either a ratchet one-way mechanism or a ball one-way mechanism is disposed between each of the first and the third transmission shafts and each of the gears supported on the outer circumference thereof. The one-way mechanisms are selectively activated by moving, in the axial direction, clutch operation elements disposed in the insides of the first and the third transmission shafts. As a consequence, chosen ones of the gears are selectively connected to the first and the third transmission shafts, so that the desired one of the shift stages is achieved.

In addition, Japanese Utility Model Application Publication No. 61-39871 discloses a transmission with the following characteristic features. In this transmission, drive gears are fixed on an input shaft, while driven gears are relatively rotatably supported on an output shaft. The drive gears are meshed with their respective driven gears. Installation holes penetrate the output shaft in the radial direction thereof, and steel balls are installed in the installation holes. A shift lever is disposed inside the input shaft so as to be movable in the axial direction thereof. Some of the steel balls are moved with the shift lever in the radial direction of the output shaft, so as to be engaged with a fitting groove formed in the inner circumferential surface of the corresponding driven gear. As a consequence, one of the driven gears is connected to the output shaft, so that the desired one of the shift stages is achieved.

In the transmission disclosed in Japanese Patent No. 3838494, however, while the one-way mechanism for the achieved shift stage is engaging, the one-way mechanisms for the other shift stages are slipping. A problem thus arises in that the friction due to the slipping of the one-way mechanisms reduces the transmission efficiency. In addition, there is a following problem because the one-way mechanisms can slip in any moment. While the transmission can be used in the case of bicycles in which the driving force is not transmitted during the deceleration but is transmitted only during the acceleration, the transmission, however, cannot be used for vehicles, such as automobiles, in which the driving force has to be transmitted during the deceleration for the engine brake and regenerative brake.

The transmission disclosed in Japanese Utility Model Application Publication No. 61-39871 has the following problems. Since the driving force is transmitted through the point contact of the steel balls, the surface of each steel ball may be worn or deformed. In addition, even when the one-way mechanism is slipping, the steel balls are pressed onto the inner circumferential surface of the driven gear by the centrifugal force. As a consequence, friction acts between the steel balls and the driven gear, thereby decreasing the transmission efficiency.

Moreover, both of the transmissions disclosed by Japanese Patent No. 3838494 and by Japanese Utility Model Application Publication No. 61-39871 have the following problem. During an up-shifting operation from a lower shift stage to a higher shift stage, there is a time lag between the disengaging of the gear-set for the prior shift stage and the completion of the engaging of the gear-set for the subsequent shift stage. The transmission of the driving force from the engine to the drive wheel is temporarily discontinued during the time lag, so that the acceleration performance is reduced. The mechanism for the reduction is as follows. The engagement of the gear-set for the subsequent shift stage requires the connection of the relevant gear to the rotational shaft by means of the clutch mechanism. The clutch mechanism, however, does not work until the phase of the gear to be connected becomes a predetermined state. Accordingly, the transmission of the driving force becomes impossible when the gear-set for the prior shift stage is disengaged, and continues to be impossible until the phase of the relevant gear of the gear-set for the subsequent shift stage becomes the predetermined state.

SUMMARY OF THE INVENTION

The present invention has been made in view of the above-described circumstances. A first object of the present invention is to provide a transmission which is capable of transmitting the driving force not only during the acceleration but also during the deceleration as necessary, and which is capable of keeping the reduction of the transmission efficiency caused by the friction down to the minimum level.

In addition, a second object of the present invention is to provide a method of up-shifting for a transmission which is capable of up-shifting the shift stage from a lower shift stage to a higher shift stage without causing any discontinuance of the transmission of the driving force.

In order to achieve the first object, according to a first feature of the present invention, there is provided a transmission in which a plurality of gears are relatively rotatably supported on a rotational shaft, and in which a desired shift stage is achieved by selectively connecting any one of the plurality of gears to the rotational shaft by means of a corresponding one of clutch mechanisms, wherein each of the clutch mechanisms includes: a strut-installation groove formed in an outer circumferential portion of the rotational shaft that is formed to have a hollow structure; a strut swingably supported in an inside of the strut-installation groove; a first engagement face which is formed on a trailing side of the strut in a rotational direction of the gear and which is capable of engaging with a cutaway formed in an inner circumferential surface of the gear; and a second engagement face which is formed on a leading side of the strut in the rotational direction of the gear and which engages with the strut-installation groove, and each of the clutch mechanisms is capable of switching the following states in accordance with the position of a slide cam that is disposed in an inside of the rotational shaft so as to be movable in an axial direction, and that controls a swinging state of the strut, said states being: an engaged state where the first engagement face of the strut is forced to protrude in the cutaway of the gear; a one-way state where the first engagement face of the strut and the cutaway of the gear are engaged with or disengaged from each other in accordance with the rotating direction of the gear relative to the rotational shaft; and a disengaged state where the first engagement face of the strut is forced to withdraw from the cutaway of the gear.

With the above configuration, in each of the clutch mechanism, a strut is swingably supported in the strut-installation groove formed in the outer circumferential portion of the hollow rotational shaft. The clutch mechanism is provided with a first engagement face which is formed in the strut on the trailing side in the rotational direction of the gear and which is capable of engaging with a cutaway formed in the inner circumferential surface of the gear. The clutch mechanism is provided with a second engagement face which is formed in the strut on the leading side in the rotational direction of the gear and which is capable of engaging with a strut-installation groove. Accordingly, by adjusting the position of a slide cam disposed inside the rotational shaft in axial direction, the swinging state of the strut is controlled and the position of the first engagement face can be changed. As a consequence, the driving force can be transmitted at the time of both acceleration and deceleration in the engaged state where the first engagement face of the strut is forced to protrude inside the cutaway of the gear. The driving force is transmitted at the time of acceleration and the transmission of the driving force is released at the time of deceleration in the one-way state where the first engagement face of the strut and the cutaway of the gear are made either to engage with or to disengage from each other in accordance with the rotational direction of the gear relative to the rotational shaft. The transmission of the driving force can be cut off at the time of both acceleration and deceleration in a disengaged state where the first engagement face of the strut is forced to withdraw from the cutaway of the gear. In addition, the decreasing of the transmission efficiency caused by the occurrence of friction between the strut and the gear can be prevented.

According to a second feature of the present invention, in addition to the first feature, each of the clutch mechanisms includes: a head-ball installation hole which is communicated with the trailing side, in the rotational direction of the gear, of the strut-installation groove and which penetrates the rotational shaft in the radial direction; a head ball which is fitted to the head-ball installation hole so as to be movable in the radial direction, and which is capable of abutting on the inner surface, in the radial direction, of an end portion of the strut located on the trailing side, in the rotational direction of the gear; a tail-ball installation hole which is communicated with the leading side, in the rotational direction of the gear, of the strut-installation groove and which penetrates the rotational shaft in the radial direction; a tail ball which is fitted to the tail-ball installation hole so as to be movable in the radial direction, and which is capable of abutting on the inner surface, in the radial direction, of an end portion of the strut located on the leading side, in the rotational direction of the gear, the slide cam is capable of controlling the position, in the radial direction, of the head ball and the position, in the radial direction, of the tail ball, and the following states are capable of being switched in accordance with the position of the slide cam, said states being: the engaged state where the first engagement face of the strut is forced to protrude in the cutaway of the gear, the engaged state being accomplished by allowing the inward movement, in the radial direction, of the tail ball and by pushing up the head ball outwards in the radial direction; the one-way state where the first engagement face of the strut and the cutaway of the gear are engaged with or disengaged from each other, the one-way state being accomplished by allowing both the inward movement, in the radial direction, of the tail ball and the inward movement, in the radial direction, of the head ball; the disengaged state where the first engagement face of the strut is forced to withdraw from the cutaway of the gear, the disengaged state being accomplished by allowing the inward movement, in the radial direction, of the head ball and by pushing up the tail ball outwards in the radial direction.

With the above configuration, each of the clutch mechanisms includes a head-ball installation hole which is communicated with the strut-installation groove on the trailing side in the rotational direction of the gear and which penetrates the rotational shaft in the radial direction. The clutch mechanism includes a head ball which is fitted to the head-ball installation hole so as to be capable of moving in the radial direction. The head ball is capable of abutting on the inner surface, in the radial direction, of the end portion of the strut located on the trailing side, in the rotational direction of the gear. The clutch mechanism includes a tail-ball installation hole which is communicated with the strut-installation groove on the leading side in the rotational direction of the gear and which penetrates the rotational shaft in the radial direction. The clutch mechanism includes a tail ball which is fitted to the tail-ball installation hole so as to be capable of moving in the radial direction. The tail ball is capable of abutting on the inner surface, in the radial direction, of the end portion of the strut located on the leading side, in the rotational direction of the gear. Accordingly, the position, in the radial direction, of the head ball and the position, in the radial direction, of the tail ball can be controlled by changing the position, in the axial direction, of the slide cam. As a consequence, even when the position of the slide cam is changed so as to allow the inward movement, in the radial direction, of the tail ball and to push out the head ball outwards in the radial direction, the engaged state can be accomplished. In the engaged state, the first engagement face of the strut is forced to protrude in the cutaway of the gear. In the engaged state, the driving force can be transmitted both at the time of acceleration and at the time of deceleration. When the position of the slide cam is changed so as to allow both the inward movement, in the radial direction, of the tail ball and the inward movement, in the radial direction, of the head ball, the one-way state can be accomplished. In the one-way state, the first engagement face of the strut and the cutaway of the rotational shaft are engaged with or disengaged from each other. In the one-way state, the driving force is transmitted at the time of acceleration and the transmission of the driving force can be cut off at the time of the deceleration. When the position of the slide cam is changed to allow the inward movement, in the radial direction, of the head ball and to push out the tail ball outwards in the radial direction, the disengaged state can be accomplished. In the disengaged state, the first engagement face of the strut is forced to withdraw from the cutaway of the gear. In the disengaged state, the transmission of the driving force can be cut off both at the time of acceleration and at the time of deceleration.

According to a third feature of the present invention, in addition to the second feature, at the time of acceleration, the first engagement face of the strut is in surface contact with the cutaway of the gear, and the second engagement face of the strut is in surface contact with the strut-installation groove of the rotational shaft.

With the above configuration, at the time of acceleration, the first engagement face of the strut is in surface contact with the cutaway of the gear, and the second engagement face of the strut is in surface contact with the strut-installation groove of the rotational shaft, thereby transmitting the driving force. Accordingly, the large load of the driving force at the time of acceleration is transmitted by means of a surface contact, so that the wearing and the deformation of the strut due to the transmission of the load are restrained, and the durability of the strut can be enhanced.

According to a fourth feature of the present invention, in addition to the second feature, at the time of deceleration in the engaged state, the driving force is transmitted from the cutaway of the gear to the rotational shaft by the strut, the head ball, and the head-ball installation hole.

With the above configuration, at the time of deceleration in the engaged state, since the driving force is transmitted from the cutaway of the gear to the rotational shaft by means of the strut, the head ball, and the head-ball installation hole, the driving force can be transmitted not only at the time of acceleration but also at the time of deceleration.

According to a fifth feature of the present invention, in addition to the second feature, at the time of acceleration in the one-way state, the head ball is biased to a position outwards in the radial direction by its own centrifugal force so as to maintain the engaged state.

With the above configuration, at the time of acceleration in the one-way state, the head ball is biased on the position of outwards in the radial direction by its own centrifugal force, so that the driving force is transmitted. Accordingly, the one-way state can be accomplished irrespective of the operation speed of the gear-shifting operation to move the slide cam.

According to a sixth feature of the present invention, in addition to any of the first to fifth features, each of the gears is supported on the outer circumference of the rotational shaft by a pair of bearing members that are disposed respectively on the opposite end portions, in the axial direction, of the gear, and each of the clutch mechanisms is disposed in a space formed between the pair of bearing members.

With the above configuration, each of the gears is supported on the outer circumference of the rotational shaft by the means of the pair of bearing members that are disposed respectively on the opposite end portions, in the axial direction, of each gear. In addition, each of the clutch mechanisms is disposed in the space formed between the pair of bearing members. Accordingly, the clutch mechanism can be placed in a small space while the interference of the clutch mechanism with the bearing members is avoided.

According to a seventh feature of the present invention, in addition to the sixth feature, among the plurality of gears, both of the two gears that are adjacent to any of the bearing members are supported together by the bearing member located between the two gears.

With the above configuration, of the plurality of gears, both of the two gears that are adjacent to any of the bearing members are supported by the bearing member located between the two gears. Accordingly, the number of necessary bearing members can be reduced to the minimum level.

According to an eighth feature of the present invention, in addition to any of the first to fifth features, while the head ball and the tail ball are installed respectively in the head-ball installation hole and in the tail-ball installation hole, the strut is installed in the strut-installation groove so as to cover the head ball and the tail ball from the outer side in the radial direction, and each of set-ring engagement portions that protrude respectively from the opposite end faces, in the axial direction, of the strut is held by the inner circumferential surface of a set ring that is fitted to the outer circumference of the output shaft.

With the above configuration, while the head ball and the tail ball are installed respectively in the head-ball installation hole and in the tail-ball installation hole, the strut is installed in the strut-installation groove so as to cover the head ball and the tail ball from the outer side in the radial direction. In addition, each of the set-ring engagement portions that protrude respectively from the opposite end faces, in the axial direction, of the strut is held by the inner circumferential surface of the set ring that is fitted to the outer circumference of the output shaft. Accordingly, the head ball, the tail ball, and the strut are temporarily held in the rotational shaft by means of the set rings so as not to drop off. As a consequence, the assembling work for these members can be made easier.

In order to achieve the second object, according to a ninth feature of the present invention, there is provided an up-shifting method for a transmission in which a plurality of gears are relatively rotatably supported on a rotational shaft, and in which a desired shift stage is achieved by selectively connecting any one of the plurality of gears to the rotational shaft by means of a corresponding one of clutch mechanisms, each of the clutch mechanism including a strut-installation groove formed in an outer circumferential portion of the rotational shaft that is formed to have a hollow structure; a strut swingably supported in an inside of the strut-installation groove; a first engagement face which is formed on a trailing side of the strut in a rotational direction of the gear and which is capable of engaging with a cutaway formed in an inner circumferential surface of the gear; and a second engagement face which is formed on a leading side of the strut in the rotational direction of the gear and which engages with the strut-installation groove, and each of the clutch mechanisms being capable of switching the following states in accordance with the position of a slide cam that is disposed in an inside of the rotational shaft so as to be movable in an axial direction, and that performs the up-shifting operation by sequentially changing each swinging state of the strut of each shift stage, said states being: an engaged state where the first engagement face of the strut is forced to protrude in the cutaway of the gear; a one-way state where the first engagement face of the strut and the cutaway of the gear are engaged with or disengaged from each other in accordance with the rotating direction of the gear relative to the rotational shaft; and a disengaged state where the first engagement face of the strut is forced to withdraw from the cutaway of the gear, wherein the up-shifting method comprises: a first step of moving the slide cam in the up-shifting direction from a first position to a second position, in the first position, the gear set of the lower-speed side shift stage being in the engaged state and the gear set of the higher-speed side shift stage being in the disengaged state, and in the second position, the gear set of the lower-speed side shift stage being in the one-way state where the gear set is capable of transmitting the driving force and the gear set of the higher-speed side shift stage being in the disengaged state; and a second step of moving the slide cam in the up-shifting direction from the second position to a third position, in the third position, the gear set of the higher-speed side shift stage being in the engaged state and the gear set of the lower-speed side shift stage being in the disengaged state.

With the above configuration, in each of the clutch mechanism, the strut is swingably supported in the strut-installation groove formed in the outer circumferential portion of the hollow rotational shaft. The clutch mechanism is provided with the first engagement face which is formed in the strut on the trailing side in the rotational direction of the gear and which is capable of engaging with the cutaway formed in the inner circumferential surface of the gear. The clutch mechanism is provided with the second engagement face which is formed in the strut on the leading side in the rotational direction of the gear and which is capable of engaging with the strut-installation groove. Accordingly, the position of the first engagement face can be changed by controlling the swinging state of the strut while the control of the swinging state is carried out by adjusting the position, in the axial direction, of the slide cam disposed inside the rotational shaft. As a consequence, the driving force can be transmitted at the time of both acceleration and deceleration in the engaged state where the first engagement face of the strut is forced to protrude inside the cutaway of the gear. The driving force is transmitted at the time of acceleration and the transmission of the driving force can be cut off at the time of deceleration in the one-way state where the first engagement face of the strut and the cutaway of the gear are made either to engage with or to disengage from each other in accordance with the rotational direction of the gear relative to the rotational shaft. The transmission of the driving force can be cut off at the time of both acceleration and deceleration in a disengaged state where the first engagement face of the strut is forced to withdraw from the cutaway of the gear. In addition, the decreasing of the transmission efficiency caused by friction between the strut and the gear can be prevented.

In the first step, the slide cam is moved in the up-shifting direction from the first position to the second position. In the first position, the gear set of the lower-speed side shift stage is in the engaged state and the gear set of the higher-speed side shift stage is in the disengaged state. In the second position, the gear set of the lower-speed side shift stage is in the one-way state where the gear set is capable of transmitting the driving force and the gear set of the higher-speed side shift stage is in the disengaged state. Subsequently, in the second step, the slide cam is moved in the up-shifting direction from the second position to the third position. In the third position, the gear set of the higher-speed side shift stage is in the engaged state and the gear set of the lower-speed side shift stage is in the disengaged state. Accordingly, between the state where the engaging of the gear set of the lower-speed side shift stage is completed and the state where the engaging of the gear set of the higher-speed side shift stage is completed, the driving force is kept on being transmitted by making the gear set of the lower-speed side shift stage be in the one-way state where the driving force can be transmitted. As a consequence, the up-shifting without any discontinuance of the transmission of the driving force is made possible.

According to a tenth feature of the present invention, in addition to the ninth feature, each of the clutch mechanisms includes: a head-ball installation hole which is communicated with the trailing side, in the rotational direction of the gear, of the strut-installation groove and which penetrates the rotational shaft in the radial direction; a head ball fitted to the head-ball installation hole so as to be movable in the radial direction, and which is capable of abutting on the inner surface, in the radial direction, of an end portion of the strut located on the trailing side, in the rotational direction of the gear; a tail-ball installation hole which is communicated with the leading side, in the rotational direction of the gear, of the strut-installation groove and which penetrates the rotational shaft in the radial direction; a tail ball which is fitted to the tail-ball installation hole so as to be movable in the radial direction, and which is capable of abutting on the inner surface, in the radial direction, of an end portion of the strut located on the leading side, in the rotational direction of the gear, the slide cam is capable of controlling the position, in the radial direction, of the head ball and the position, in the radial direction, of the tail ball, and the following states can be switched in accordance with the position of the slide cam, said states being: the engaged state where the first engagement face of the strut is forced to protrude in the cutaway of the gear, the engaged state being accomplished by allowing the inward movement, in the radial direction, of the tail ball and by pushing up the head ball outwards in the radial direction; the one-way state where the first engagement face of the strut and the cutaway of the gear are engaged with or disengaged from each other, the one-way state being accomplished by allowing both the inward movement, in the radial direction, of the tail ball and the inward movement, in the radial direction, of the head ball; the disengaged state where the first engagement face of the strut is forced to withdraw from the cutaway of the gear, the disengaged state being accomplished by allowing the inward movement, in the radial direction, of the head ball and by pushing up the tail ball outwards in the radial direction.

With the above configuration, each of the clutch mechanisms includes a head-ball installation hole which communicates to the trailing side, in the rotational direction of the gear, of the strut-installation groove and which penetrates the rotational shaft in the radial direction. The clutch mechanism includes a head ball which is fitted to the head-ball installation hole so as to be capable of moving in the radial direction and which is capable of abutting on the inner surface, in the radial direction, of the end portion of the strut located on the trailing side, in the rotational direction of the gear. The clutch mechanism includes a tail-ball installation hole which communicates to the leading side, in the rotational direction of the gear, of the strut-installation groove and which penetrates the rotational shaft in the radial direction. The clutch mechanism includes a tail ball which is fitted to the tail-ball installation hole so as to be capable of moving in the radial direction and which is capable of abutting on the inner surface, in the radial direction, of the end portion of the strut located on the leading side, in the rotational direction of the gear. Accordingly, the position, in the radial direction, of the head ball and the position, in the radial direction, of the tail ball can be controlled by changing the position, in the axial direction, of the slide cam. As a consequence, when the position of the slide cam is changed so as to allow the inward movement, in the radial direction, of the tail ball and to push up the head ball outwards in the radial direction, the engaged state can be accomplished. In the engaged state, the first engagement face of the strut is forced to protrude in the cutaway of the gear. In the engaged state, the driving force can be transmitted both at the time of acceleration and at the time of deceleration. When the position of the slide cam is changed so as to allow both the inward movement, in the radial direction, of the tail ball and the inward movement, in the radial direction, of the head ball, the one-way state can be accomplished. In the one-way state, the first engagement face of the strut and the cutaway of the gear are engaged with or disengaged from each other. In the one-way state, the driving force is transmitted at the time of acceleration and the transmission of the driving force can be cut off at the time of the deceleration. When the position of the slide cam is changed to allow the inward movement, in the radial direction, of the head ball and to push up the tail ball outwards in the radial direction, the disengaged state can be accomplished. In the disengaged state, the first engagement face of the strut is forced to withdraw from the cutaway of the gear. In the disengaged state, the transmission of the driving force can be cut off both at the time of acceleration and at the time of deceleration.

Note that an output shaft 12 of the embodiments corresponds to the rotational shaft of the present invention. A first-speed driven gear 21 to a seventh-speed driven gear 27 of the embodiments correspond to the gears of the present invention. A bush 28 and a ball bearing 28' of the embodiments correspond to the bearing members of the present invention.

The above-mentioned and other objects, features, and advantages of the present invention will be apparent from the following preferred embodiments, the description of which will be given below with reference to the accompanying drawings.

BRIEF DESCRIPTION OF THE DRAWINGS

FIGS. 1 to 34 show a first embodiment of the present invention.

FIG. 1 is a longitudinal sectional view of a transmission.

FIG. 2 is an enlarged view of the portion 2 of FIG. 1 (and is a sectional view taken along a line 2-2 in FIG. 3).

FIG. 3 is a sectional view taken along a line 3-3 in FIG. 2.

FIG. 4 is a sectional view taken along a line 4-4 in FIG. 2.

FIG. 5 is a sectional view taken along a line 5-5 in FIG. 2.

FIG. 6 is a view from a direction of an arrow 6 in FIG. 2.

FIG. 7 is an enlarged perspective view of the portion 7 of FIG. 6.

FIG. 8 is a sectional view taken along a line 8-8 in FIG. 6.

FIG. 9 is a sectional view taken along a line 9-9 in FIG. 6.

FIG. 10 is a sectional view taken along a line 10-10 in FIG. 6.

FIG. 11 is a sectional view taken along a line 11-11 in FIG. 6.

FIG. 12 is a sectional view taken along a line 12-12 in FIG. 10.

FIG. 13 is a perspective view of a slide cam and a slider.

FIG. 14 is a perspective view of a strut, a head ball, and a tail ball.

FIGS. 15A and 15B are operation-illustrating drawings each of which shows an engaged state of a driven gear.

FIGS. 16A and 16B are operation-illustrating drawings each of which shows a one-way state of a driven gear.

FIG. 17 is an operation-illustrating drawing that shows a disengaged state of a driven gear.

FIGS. 18 to 34 are operation-illustrating drawings. Some of the drawings of FIGS. 18 to 34 show states in an up-shifting operation, and the others show states in a down-shifting operation.

FIG. 35 is a view corresponding to FIG. 2 (and is a sectional view taken along a line 35-35 in FIG. 36).

FIG. 36 is a sectional view taken along a line 36-36 in FIG. 35.

FIG. 37 is a sectional view taken along a line 37-37 in FIG. 35.

FIG. 38 is a sectional view taken along a line 38-38 in FIG. 35.

FIG. 39 is an enlarged view of the portion 39 of FIG. 35.

FIG. 40 is a perspective view of a slide cam.

FIG. 41 is an exploded perspective view of an actuator spring and the vicinity thereof.

FIGS. 42 to 61 show a third embodiment of the present invention.

FIG. 42 is a view corresponding to FIG. 2 (and is a sectional view taken along a line 42-42 in FIG. 43).

FIG. 43 is a sectional view taken along a line 43-43 in FIG. 42.

FIG. 44 is a sectional view taken along a line 44-44 in FIG. 42.

FIG. 45 is a perspective view of a slide cam.

FIG. 46 is an enlarged view of the portion 46 of FIG. 45.

FIG. 47 is a view from a direction of an arrow 47 in FIG. 46.

FIG. 48 is a sectional view taken along a line 48-48 in FIG. 47.

FIG. 49 is an exploded perspective view of the portion 49 of FIG. 48.

FIG. 50 is a view showing cam grooves formed in a rotary barrel.

FIGS. 51 to 61 are operation-illustrating drawings. Some of the drawings of FIGS. 51 to 61 show states in an up-shifting operation, and the others show states in a down-shifting operation.

DETAILED DESCRIPTION OF THE PREFERRED EMBODIMENTS

A first embodiment of the present invention will be described below, and the description will be based on FIGS. 1 to 34.

Figure 1:
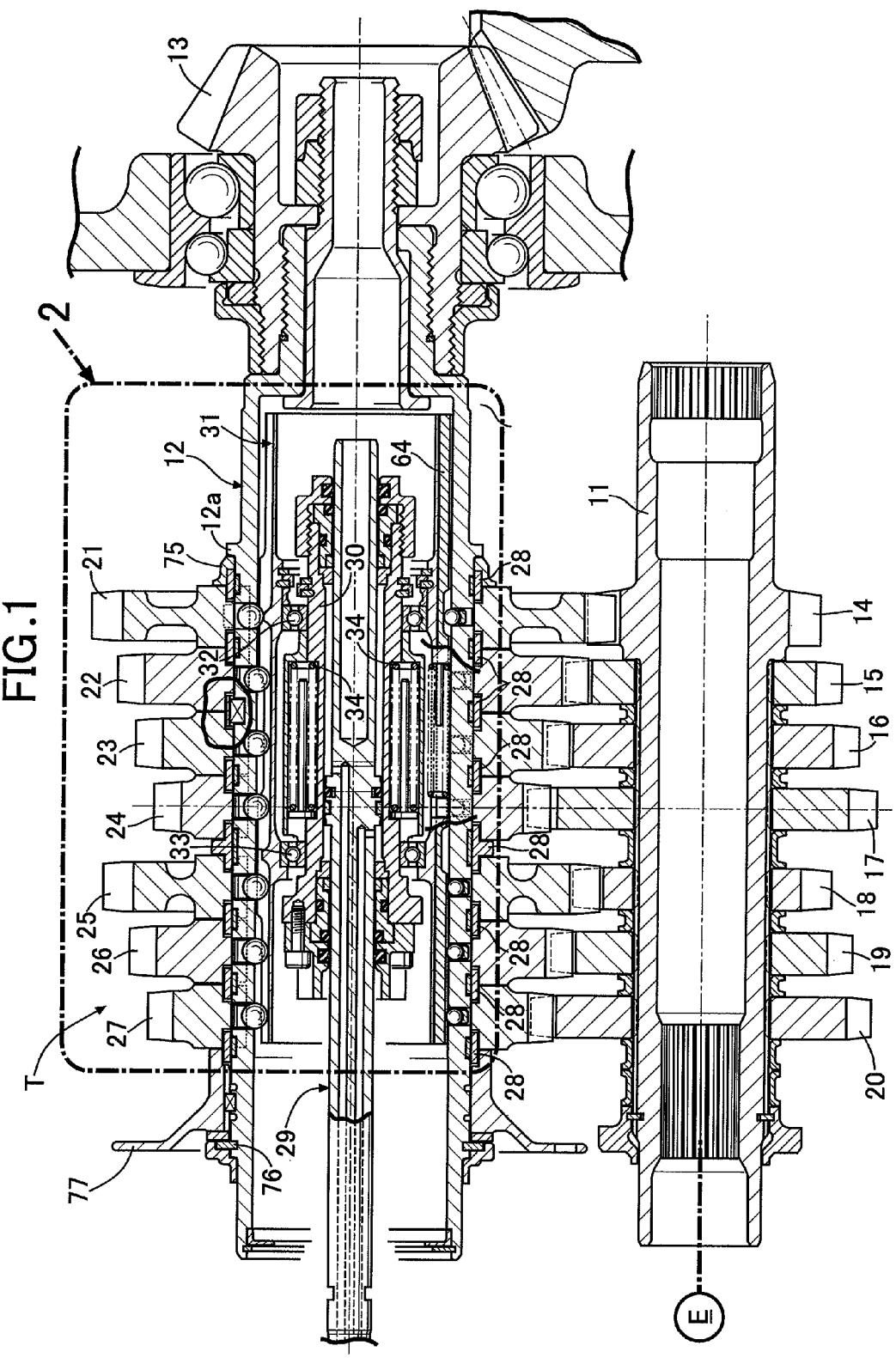

FIG. 1 shows a transmission T which has seven forward shift stages and which is used in, for example, an F1 racing car. The transmission T includes a hollow input shaft 11 and a hollow output shaft 12 that are disposed in parallel to each other. An engine E is connected to an end side (hereafter referred to as the left-hand side) of the input shaft 11. An output gear 13 comprising a bevel gear is disposed on the other end side (hereafter referred to as the right-hand side) of the output shaft 12. The output gear 13 is provided for the purpose of transmitting the driving force to the drive wheels. A first-speed drive gear 14, a third-speed drive gear 15, a fifth-speed drive gear 16, a seventh-speed drive gear 17, a second-speed drive gear 18, a fourth-speed drive gear 19, and a sixth-speed drive gear 20 are fixed onto the outer circumferential surface of the input shaft 11 in this order from its right-hand side to its left-hand side. A first-speed driven gear 21, a third-speed driven gear 22, a fifth-speed driven gear 23, a seventh-speed driven gear 24, a second-speed driven gear 25, a fourth-speed driven gear 26, and a sixth-speed driven gear 27 that constantly mesh respectively with each of drive gears 14 to 20 are relatively rotatably supported on the outer circumferential surface of the output shaft 12 in this order from its right-hand side to its left-hand side. Bushes 28 are set between the output shaft 12 and the respective driven gears 21 to 27.

An actuator shaft 29 that is fixed to a transmission case (not illustrated) is disposed coaxially inside the output shaft 12. A cylinder 30 that has a cylindrical shape is supported on the outer circumference of the actuator shaft 29. The cylinder 30 thus supported is movable in the axial direction thereof. In addition, a cylindrical slide cam 31 is supported on the outer circumference of the cylinder 30 with a pair of ball bearings 32 and 33 set in between. The slide cam 31 thus supported is relatively rotatable independently of the cylinder 30. At the same time, the slide cam 31 is slidable in the axial direction thereof. Plural (specifically, eight in this embodiment) coil springs—actuator springs 34—are disposed equidistantly in the circumferential direction, and provide a floating support for the slide cam 31 so that the slide cam 31 can move in the axial direction thereof independently of the cylinder 30.

Suppose a case where an oil pressure is supplied from the inside of the actuator shaft 29 and thereby the cylinder 30 is moved by the oil pressure from the right-hand side of the output shaft 12 to the left-hand side thereof In this case, the slide cam 31 for which a floating support is provided by the cylinder 30 with help of the actuator springs 34 moves from the right-hand side of the output shaft 12 to the left-hand side thereof. As a consequence, each one of the engaging of the first-speed gear set to the seventh-speed gear set is sequentially completed. One thing that should be noted here is that the transmission T allows no up-shifting or down-shifting operation with an intermediate speed gear skipped.

Subsequently, the internal structure of the output shaft 12 will be described in detail with reference to FIGS. 2 to 6.

Figure 2:
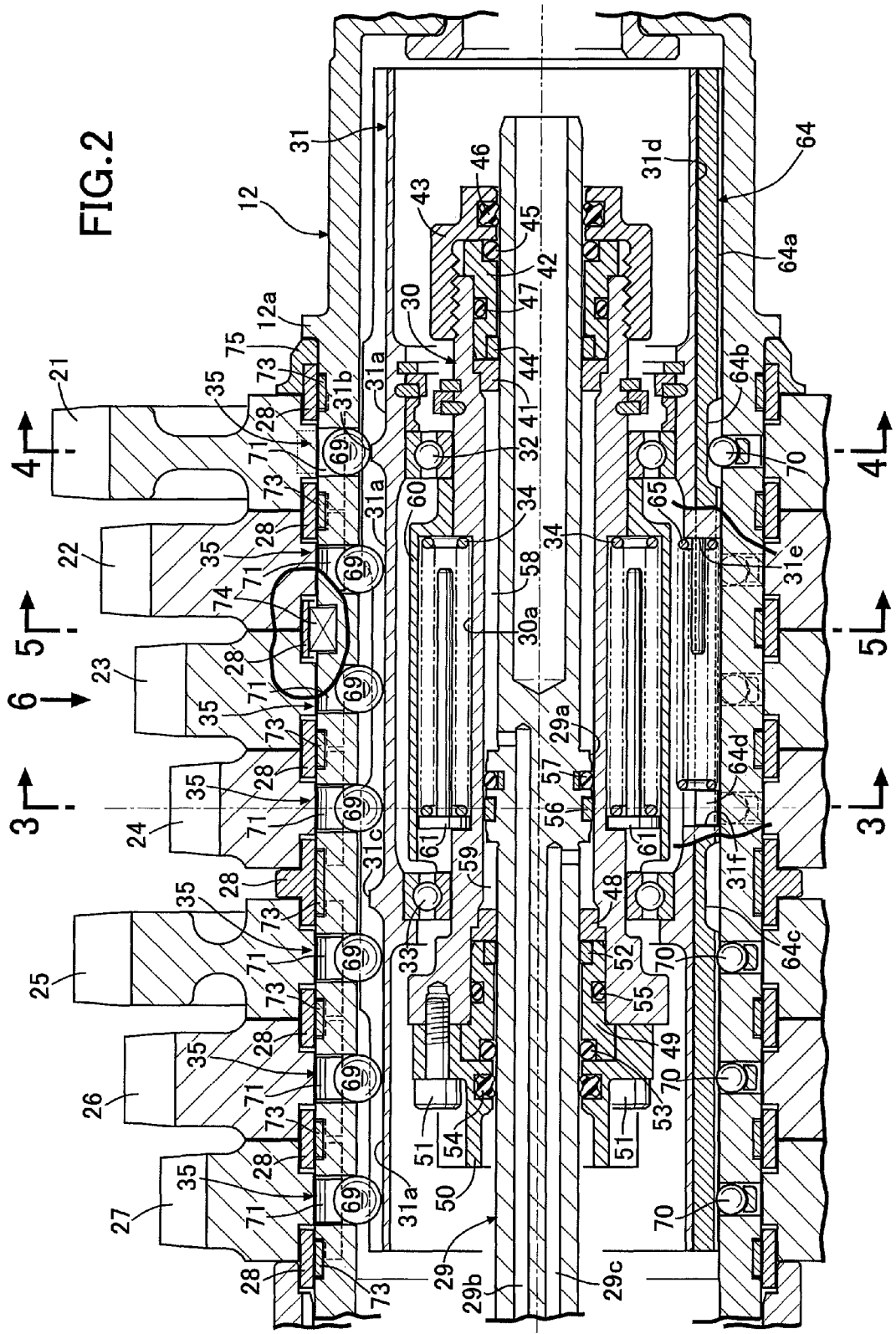

As FIG. 2 shows, a stopper ring 41 and a collar 42 are fitted to a right-hand-side end portion of the inner circumferential surface of the cylinder 30, which is fitted to the outer circumference of the actuator shaft 29. A cap 43 is provided to fix the stopper ring 41 and the collar 42 to the above-mentioned portion. A slide guide 44 and a seal member 45 are disposed in portions where the collar 42 slides on the outer circumferential surface of the actuator shaft 29. A seal member 46 is disposed in a portion where the cap 43 slides on the outer circumferential surface of the actuator shaft 29. A seal member 47 is disposed in a portion where the collar 42 abuts on the inner circumferential surface of the cylinder 30.

In addition, a stopper ring 48, a collar 49, and a cap 50 are fitted to a left-hand-side end portion of the inner circumferential surface of the cylinder 30, which is fitted to the outer circumference of the actuator shaft 29. The cap 50 is fastened to the left-hand-side end of the cylinder 30 with bolts 51. A slide guide 52 and a seal member 53 are disposed in portions where the collar 49 slides on the outer circumferential surface of the actuator shaft 29. A seal member 54 is disposed in a portion where the cap 50 slides on the outer circumferential surface of the actuator shaft 29. A seal member 55 is disposed in a portion where the collar 49 abuts on the inner circumferential surface of the cylinder 30.

A piston 29a is formed on a middle portion of the actuator shaft 29. A slide guide 56 and a seal member 57 are disposed on the piston 29a so as to slide on the inner circumferential surface of the cylinder 30. As a consequence, a first oil chamber 58 is formed between the piston 29a of the actuator shaft 29 and the collar 42 located on the right-hand side end portion of the cylinder 30, and a second oil chamber 59 is formed between the piston 29a of the actuator shaft 29 and the collar 49 located on the left-hand side end portion of the cylinder 30. The first oil chamber 58 communicates to either an unillustrated oil pump or an unillustrated reservoir through a first oil passage 29b formed inside the actuator shaft 29. The second oil chamber 59, on the other hand, communicates to either an unillustrated oil pump or an unillustrated reservoir through a second oil passage 29c formed inside the actuator shaft 29.

Accordingly, when an oil pressure is supplied from the oil pump through the second oil passage 29c to the second oil chamber 59, the operation oil in the first oil chamber 58 is returned back to the reservoir through the first oil passage 29b. As a consequence, the cylinder 30 is moved from the right-hand side to the left-hand side relative to the fixed actuator shaft 29, so that the speed gear is up-shifted. Conversely, when an oil pressure is supplied from the oil pump through the first oil passage 29b to the first oil chamber 58, the hydraulic oil in the second oil chamber 59 is returned back to the reservoir through the second oil passage 29c. As a consequence, the cylinder 30 is moved from the left-hand side to the right-hand side relative to the fixed actuator shaft 29, so that the speed gear is down-shifted.

As described above, the entire body of the cylinder 30, which is the drive source to drive and move the slide cam 31 so as to reciprocate in the axial direction, is installed inside the output shaft 12. This configuration allows the transmission T to be built compact in size in comparison to a case where the drive source is disposed outside the output shaft 12.

Figure 3:
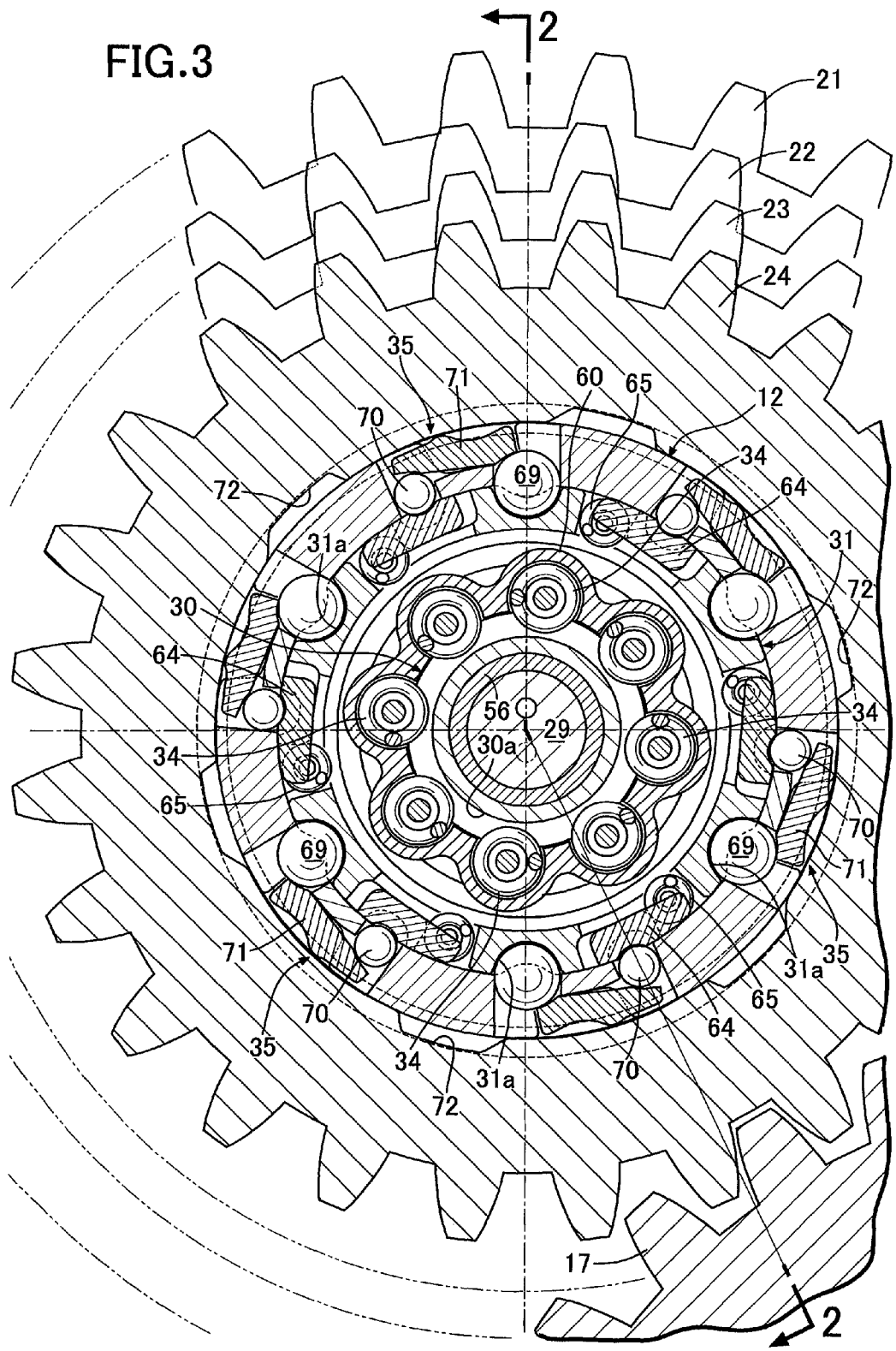
Figure 4:
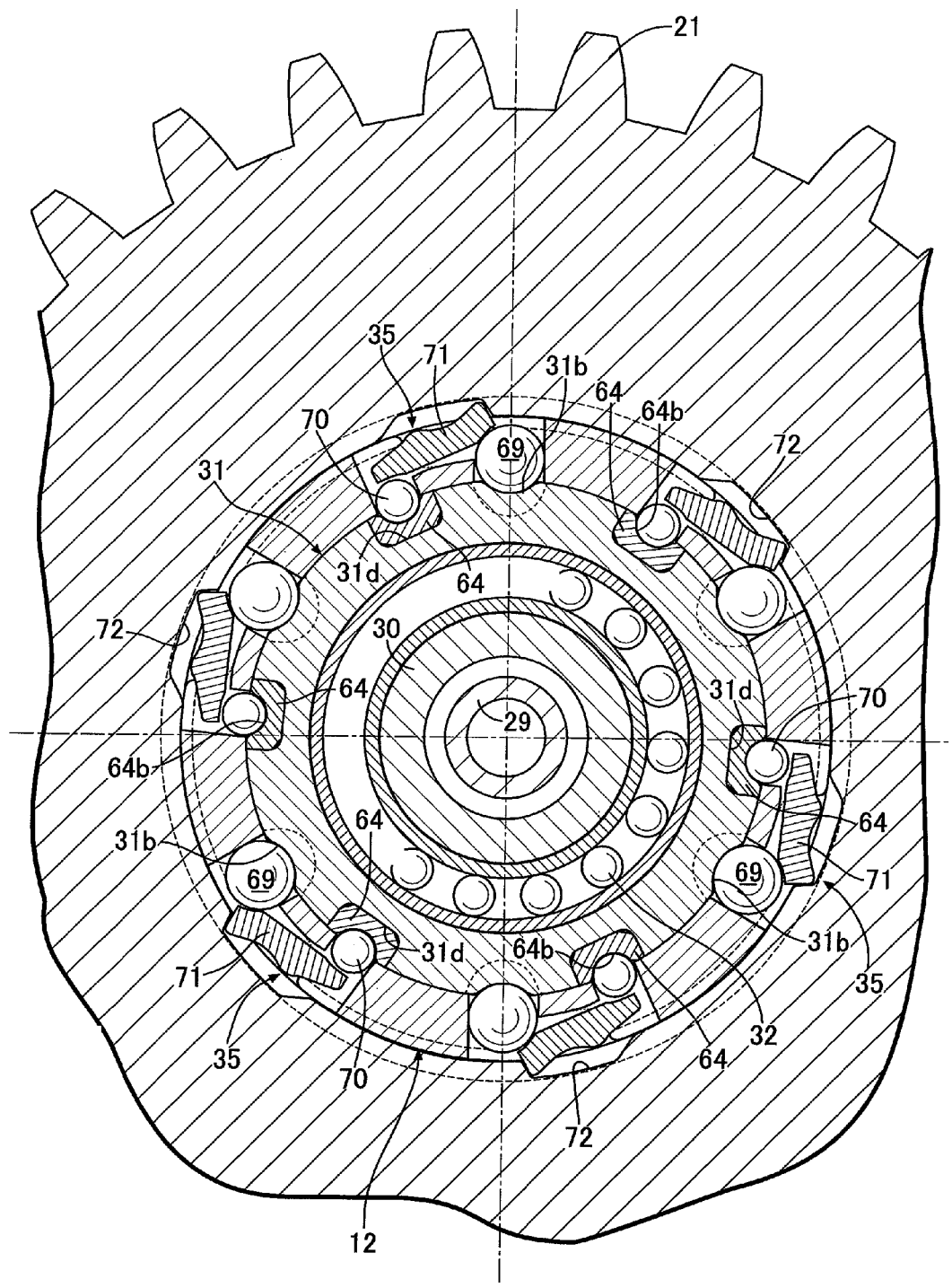
Figure 5:
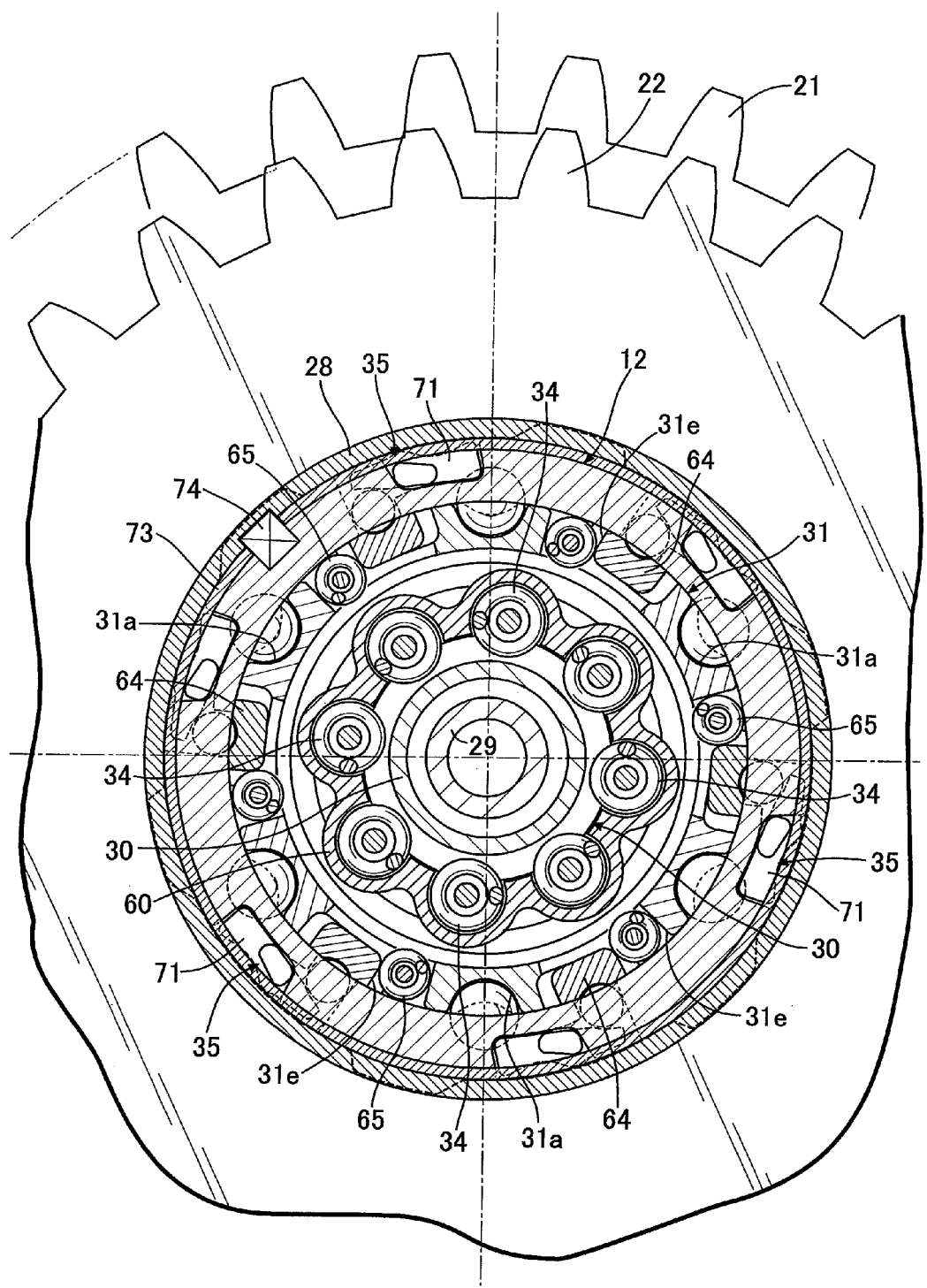
Figure 6:
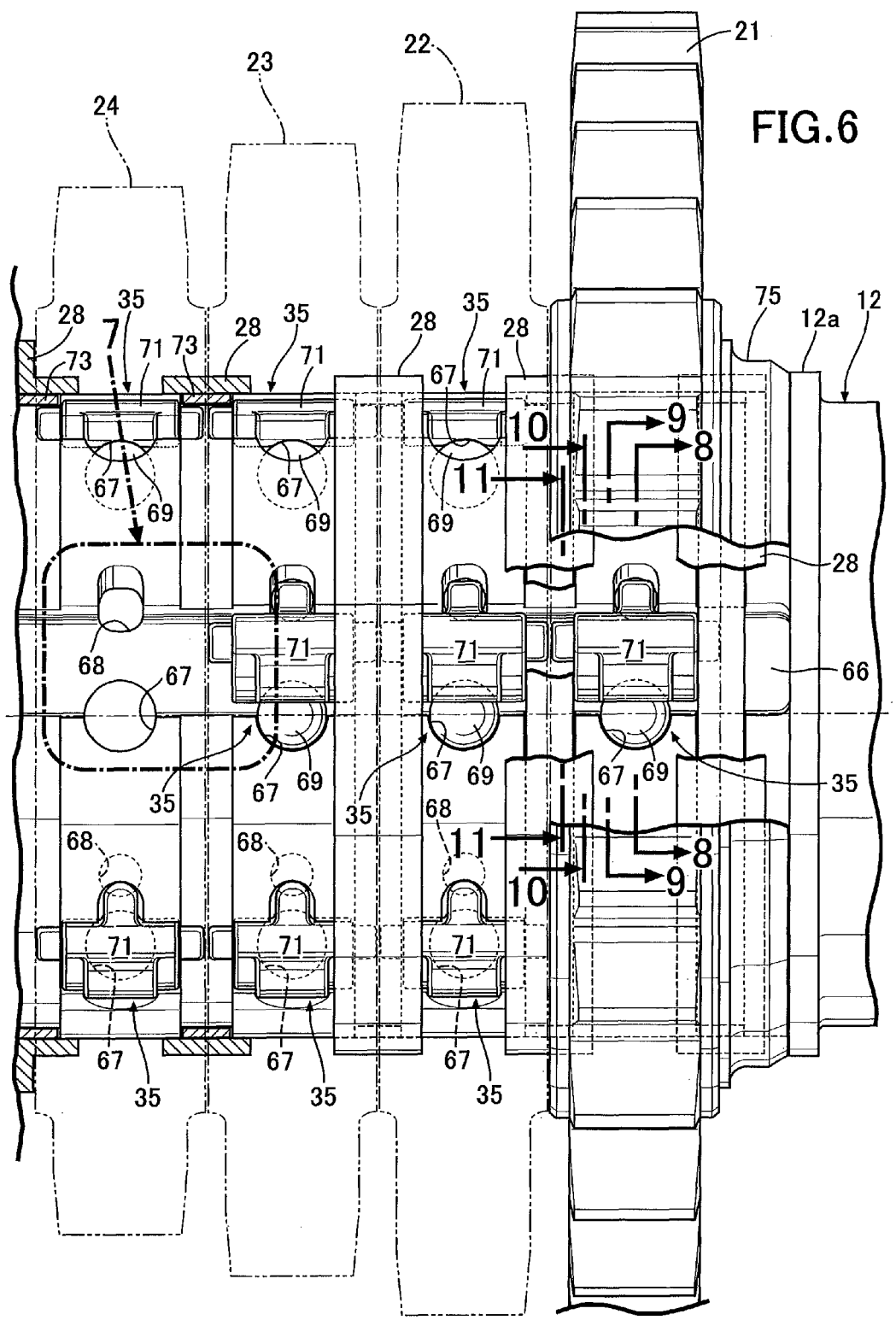
Figure 7:
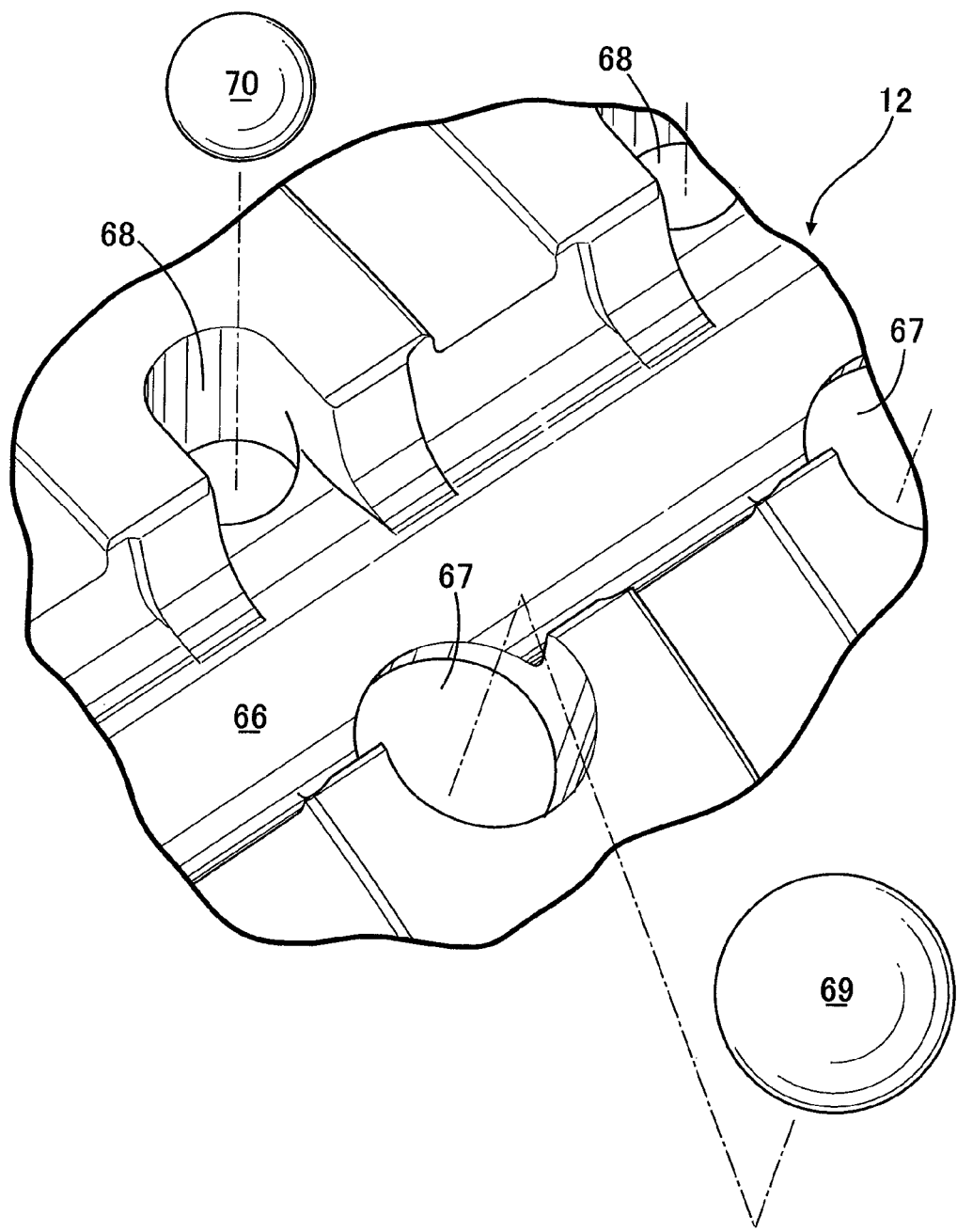
Figure 8:
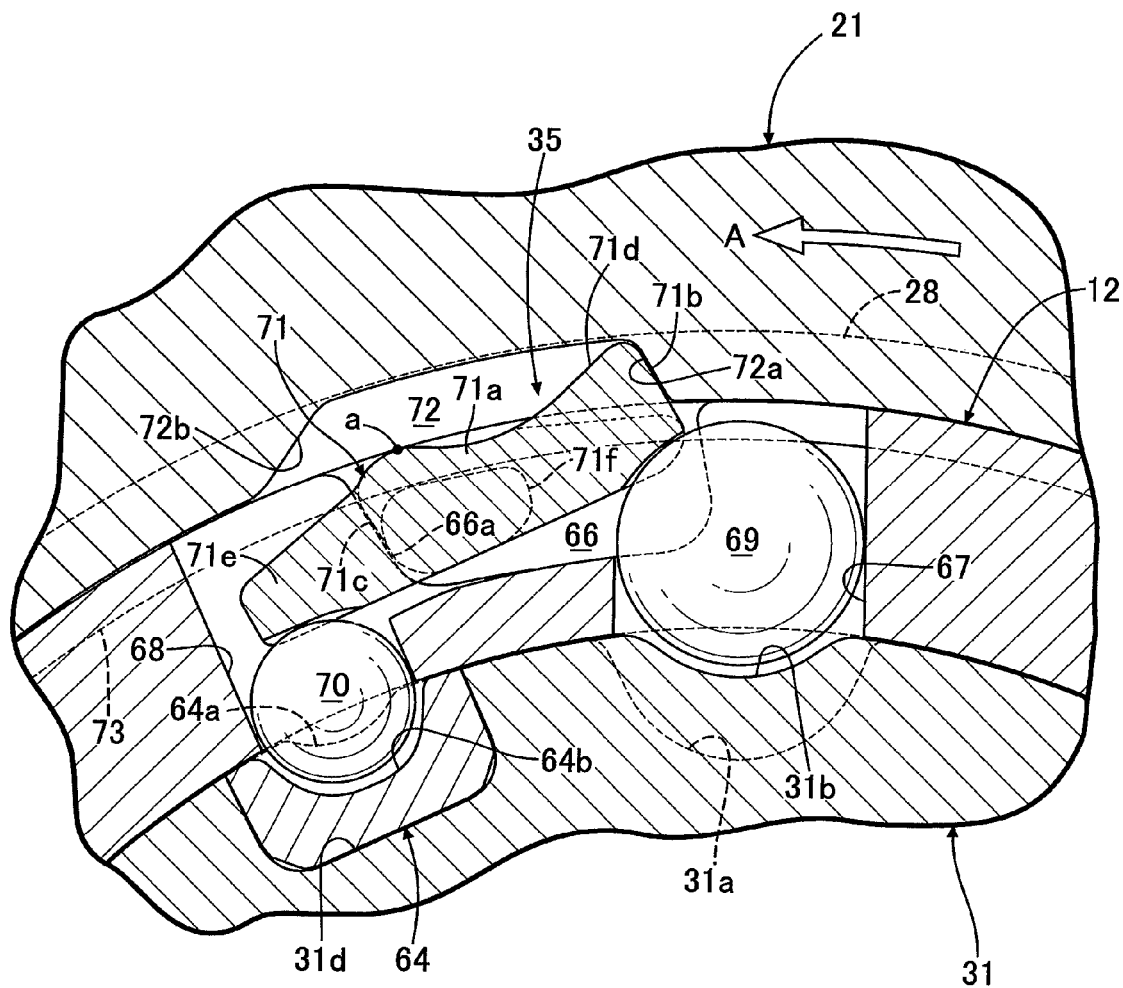
Figure 9:
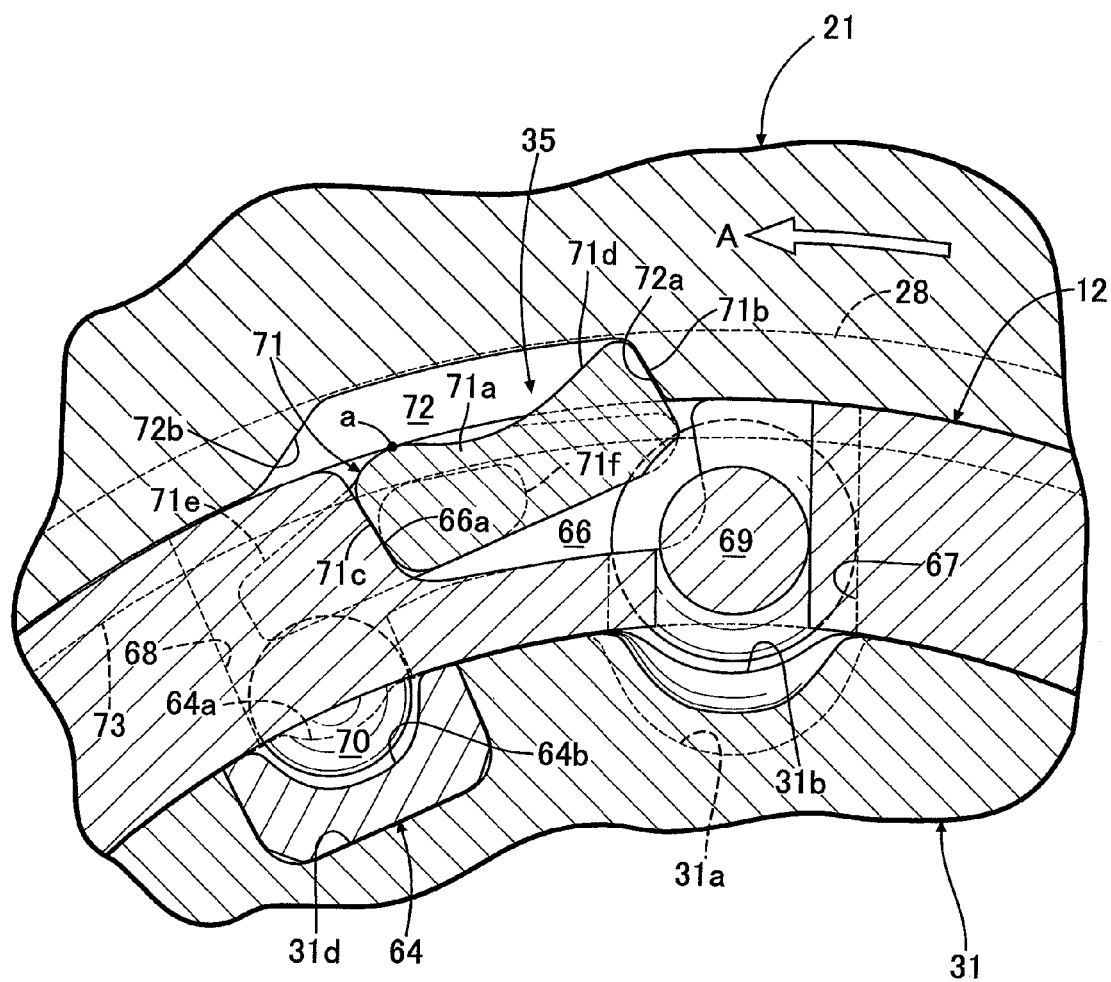
Figure 10:
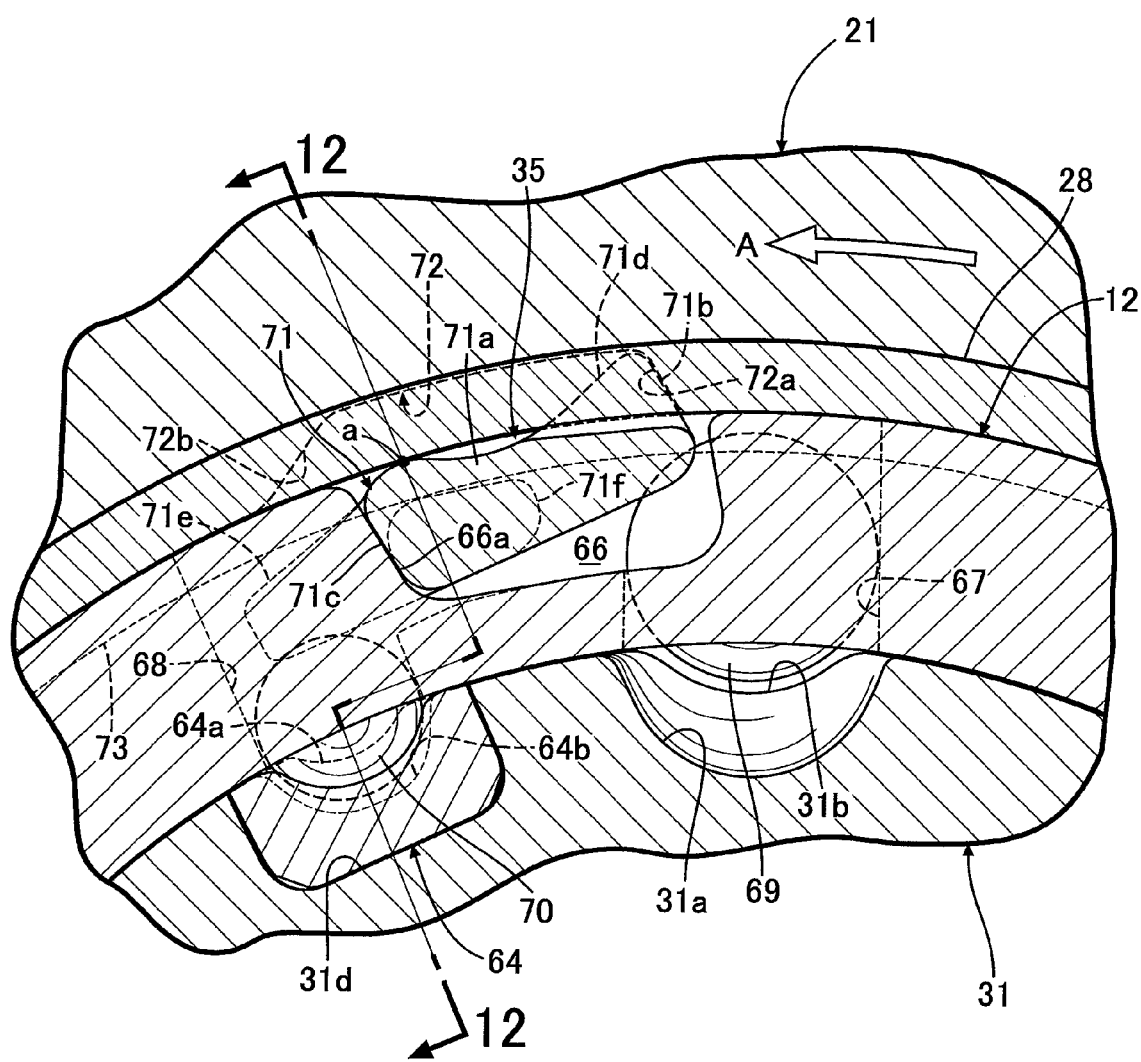
Figure 11:
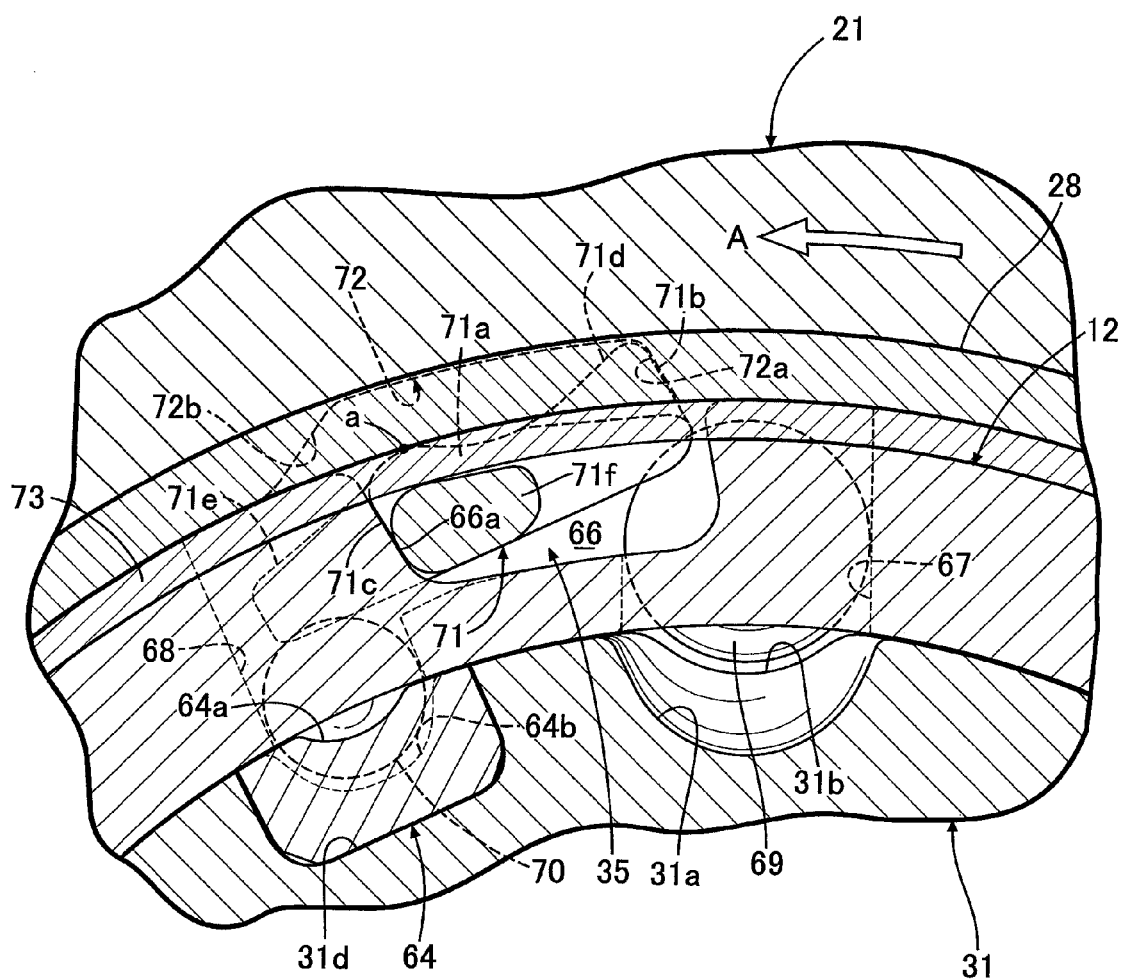
Figure 12:
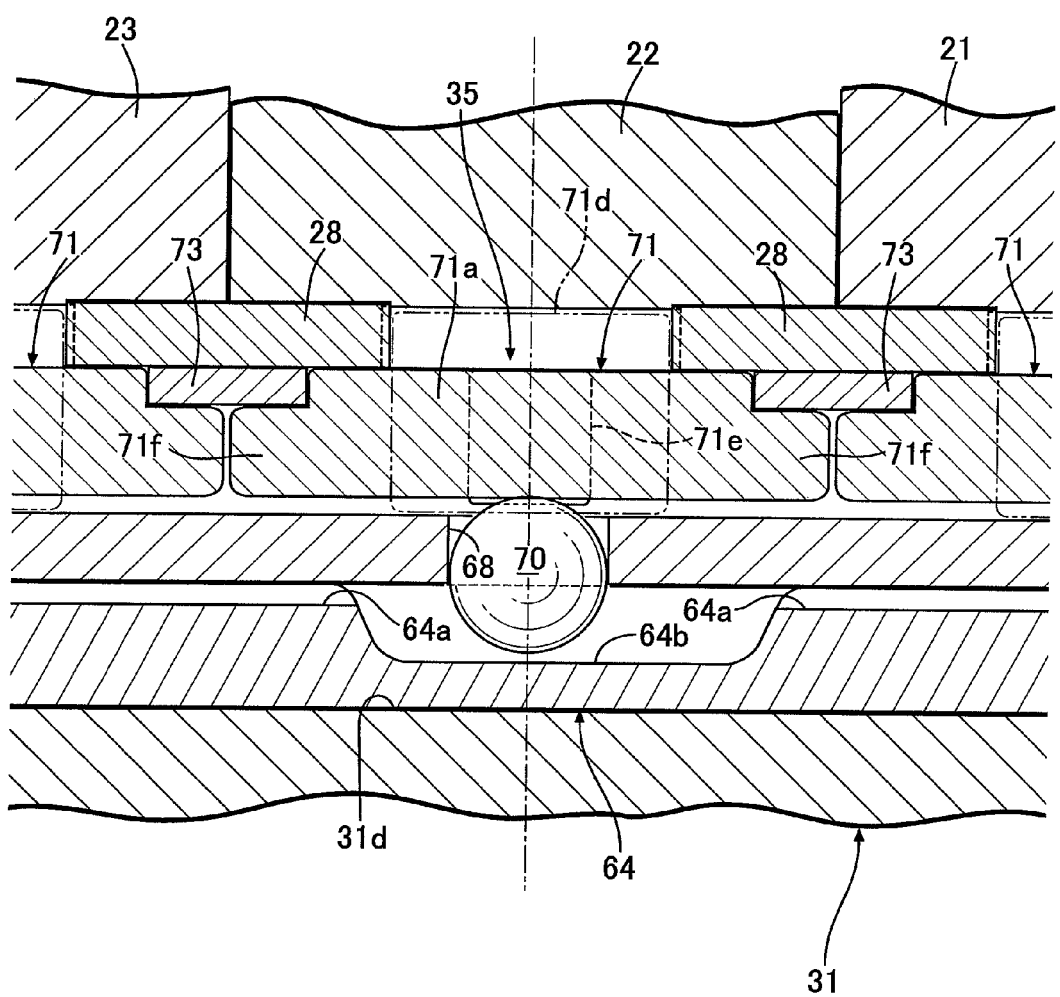
Figure 13:
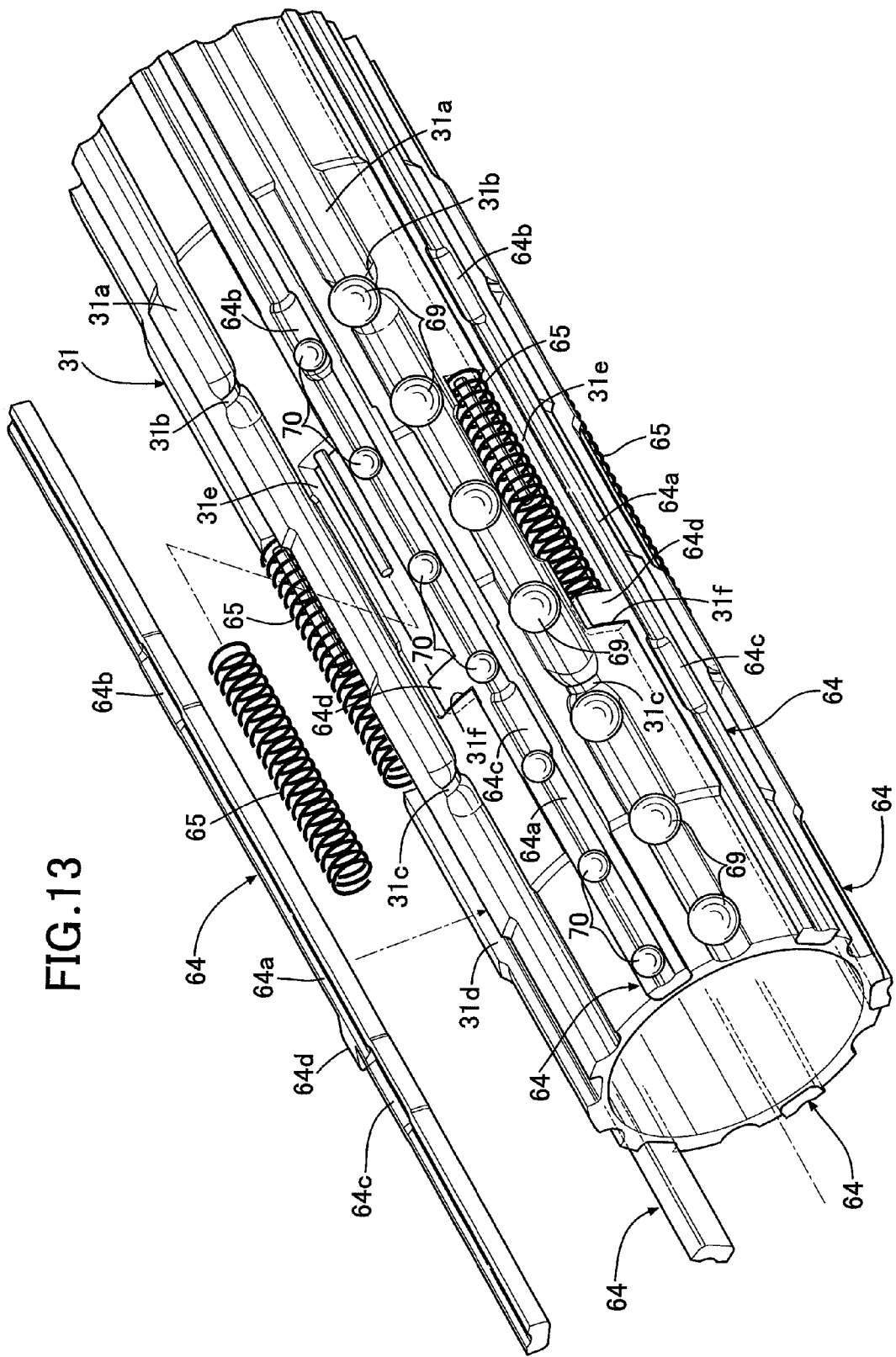
Figure 14:
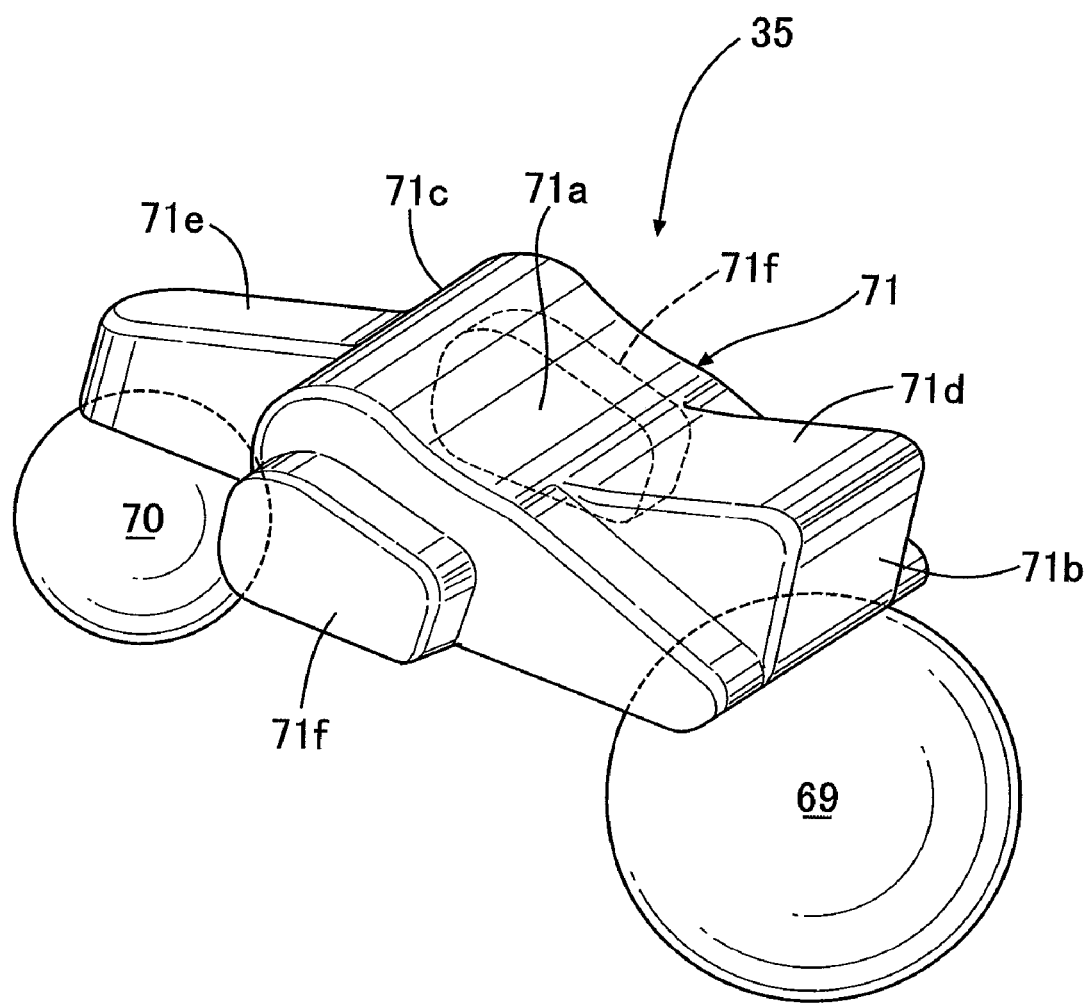

As seen clearly from FIGS. 2 and 3, an annular spring-installation groove 30a formed to have a smaller diameter in the outer circumferential surface of the cylinder 30, and the above-mentioned eight actuator springs 34 are disposed at 45° intervals. An outer spring guide 60 that has enclosed its right-hand-side end portion is fitted to the outer circumference of the cylinder 30, and is slidable in the axial direction. The right-hand-side end portion of each of the actuator springs 34 is locked both to the enclosed portion located on the right-hand side of the outer spring guide 60 and to a stepped portion located on the right-hand side of the spring-installation groove 30a. An inner spring guide 61 is provided to support the left-hand side end portion of each of the actuator springs 34, and is locked to the stepped portion located on the left-hand side of the spring-installation groove 30a. Opposite end portions of the outer spring guide 60 in the axial direction are locked respectively to the inner races of the pair of ball bearings 32 and 33, so that the outer spring guide 60 cannot move in the axial direction. Meanwhile, the outer races of the pair of ball bearings 32 and 33 are locked to the inner circumferential surface of the slide cam 31, so that the outer races cannot move in the axial direction.

Accordingly, the outer spring guide 60, the pair of ball bearings 32 and 33, and the slide cam 31 are integrated into a unit. While the slide cam 31 is free to move in the axial direction, a movement of the cylinder 30 in the axial direction is accompanied by a movement, in the axial direction, of the slide cam 31 that is integrated with the cylinder 30. Note that in this case the actuator springs 34 are not compressed. Conversely, while the movement of the slide cam 31 in the axial direction is restricted, a movement of the cylinder 30 in the axial direction causes the actuator springs 34 to be compressed. Accordingly, only the cylinder 30 can move in the axial direction while the movement of the slide cam 31 is still prohibited. As a consequence, the cylinder 30 provides a floating support in the axial direction for the slide cam 31 by means of the actuator springs 34.

As FIGS. 2 to 5 and FIG. 13 show, six cam grooves 31a each of which has an arc-shaped cross section are provided in a depressed manner at 60° intervals in the outer circumferential surface of the slide cam 31, which has a substantially cylindrical shape. The recessed six cam grooves 31a extend in the axial direction. The cam grooves 31a have respective annular first convex portions 31b, and also have respective annular second convex portions 31c. Each first convex portion 31b and each second convex portion 31c are formed so as to protrude outwards in the radial direction respectively at positions located between the opposite end portions of the corresponding cam groove 31a. The six first convex portions 31b of the six cam grooves 31a are aligned in the axial direction. The other six convex portions, that is, the second convex portions 31c, are also aligned in the axial direction. The top portion of each of the first and the second convex portions 31b and 31c is positioned at a lower level in the radial direction than the level of the outer circumferential surface of the slide cam 31.

Six guide grooves 31d that extend in the axial direction are formed at 60° intervals in the outer circumferential surface of the slide cam 31. Bar-shaped sliders 64 are fitted respectively to the guide grooves 31d, and are allowed to slide freely. A cam groove 64a that extends in the axial direction is formed in the outer circumferential surface of each of the sliders 64. The cam grooves 64a have respective first recessed portions 64b, and also have respective second recessed portions 64c. Each first recessed portion 64b and each second recessed portion 64c are formed so as to be recessed inwards in the radial direction respectively at positions located between the opposite end portions of the corresponding cam groove 64a. The six first recessed portions 64b of the six cam grooves 64a are aligned in the axial direction. The other six recessed portions, that is, the second recessed portions 64c, are also aligned in the axial direction.

Six spring-installation groove 31e are formed in the outer circumferential surface of the slide cam 31 so as to be adjacent to the six guide grooves 31d. Slider springs 65 are installed respectively in the spring-installation grooves 31e, and are locked respectively to spring seats 64d that protrude respectively from on the side surface of the sliders 64. The slider springs 65 bias their respective sliders 64 to the left-hand side in the axial direction with respect to the slide cam 31. The sliders 64 thus biased are held at positions where the sliders 64 abut respectively on stopper faces 31f that are formed on the left-hand side of the spring installation grooves 31e.

Accordingly, while the sliders 64 are free to move to the left-hand side in the axial direction, a leftward movement of the slide cam 31 is accompanied by a leftward movement of the sliders 64 as if the slide cam 31 and the sliders 64 were integrated into a unit. Note that, in this case, the slider springs 65 are not compressed. Conversely, while the leftward movement of the sliders 64 is restricted, a leftward movement of the slide cam 31 causes the slider springs 65 to be compressed. Accordingly, only the slide cam 31 can move to the left-hand side while the movement of the sliders 64 is still prohibited. As a consequence, the slide cam 31 provides a floating support in the axial direction for the sliders 64 by means of the slider springs 65.

As FIGS. 7 to 12 and FIG. 14 clearly show, six strut-installation grooves 66 are formed in the outer circumferential surface of the output shaft 12. The strut-installation grooves 66 are formed as grooves that extend all along the entire length of the output shaft 12 in the axial direction thereof and are recessed down to the level that corresponds to the middle portion, in the thickness direction, of the output shaft 12. Head-ball installation holes 67 and tail-ball installation holes 68 are formed so as to penetrate the output shaft 12. The head-ball installation holes 67 and the tail-ball installation holes 68 are formed at positions where the strut-installation grooves 66 face the inner circumferential surfaces of the first-speed driven gear 21 to the seventh-speed driven gear 27. The head-ball installation holes 67 and the tail-ball installation holes 68 thus formed are communicated with the opposite side edge portions, in the circumferential direction, of the strut-installation grooves 66. The cam grooves 31a of the slide cam 31 face the inner side, in the radial direction, of each of the head-ball installation holes 67. The cam grooves 64a of the sliders 64 face the inner side, in the radial direction, of each of the head-ball installation holes 68. Larger-diameter head balls 69 are fitted to their respective head-ball installation holes 67 and the cam grooves 31a of the slide cam 31, and are allowed to move in the radial direction. Smaller-diameter tail balls 70 are fitted to their respective tail-ball installation holes 67 and the cam grooves 65a of the sliders 64, and are allowed to move in the radial direction.

Struts 71 are installed in the strut-installation grooves 66. Each of the struts 71 includes a main-body portion 71a, a first engagement face 71b, a second engagement face 71c, a third engagement face 71d, an arm portion 71e, and a pair of set-ring engagement portions 71f and 71f. The main-body portion 71a has a top face (outer face in the radial direction) that is formed into an arc-shaped face. The first engagement face 71b is located on the trailing side of the main-body portion 71a in the rotational direction thereof, and extends substantially in the radial direction. The second engagement face 71c is located on the leading side of the main-body portion 71a in the rotational direction thereof, and extends substantially in the radial direction. The third engagement face 71d is formed contiguously from the outer end, in the radial direction, of the first engagement face 71b, and extends substantially in the circumferential direction. The arm portion 71e extends from the first engagement face 71b to the leading side in the rotational direction. A pair of the set-ring engagement portions 71f and 71f is formed respectively on the two lateral sides of the main-body portion 71a.

Six cutaways 72 are formed in the inner circumferential surface of each of the first-speed driven gear 21 to the seventh-speed driven gear 27. The six cutaways 72 are formed so as to correspond respectively to the six struts 71. An end, in the circumferential direction, of each of the cutaways 72 is formed into a drive face 72a that is capable of engaging with the first engagement face 71b of the strut 71. The other end, in the circumferential direction, of each of the cutaways 72 is formed into a slant face 72b that guides the third engagement face 71d of the strut 71. The bottom face of the first-engagement-face 71b of the strut 71 (the inner-side face in the radial direction) faces the head ball 69, and is capable of abutting on the head ball 69. The bottom face of the arm portion 71e of the strut 71 (the inner-side face in the radial direction) faces the tail ball 70, and is capable of abutting on the tail ball 70.

FIGS. 8 to 12 show a series of operational states. The first convex portion 31b of the cam groove 31a of the slide cam 31 pushes up, outwards in the radial direction, the head ball 69 in the head-ball installation hole 67 of the output shaft 12. The strut 71 with the bottom portion of its first engagement face 71b being pushed up by the head ball 69 makes a support point a of the main-body portion 71a abut on the bottom face of the first-speed driven gear 21, and swings counterclockwise in the drawings. The arm portion 71e of the strut 71 makes the tail ball 70 inside the tail-ball installation hole 68 of the output shaft 12 to fall down to the bottom portion of the first recessed portion 64b of the slider 64.

In this state, the drive face 72a of the cutaway 72 of the first-speed driven gear 21 that is driven by the first-speed drive gear 14 in the direction of the arrow A is engaged with the first engagement face 71b of the strut 71. In addition, the second engagement face 71c of the strut 71 is abutted on a driven face 66a of the strut-installation groove 66 of the output shaft 12. As a consequence, the driving force of the first-speed driven gear 21 is transmitted to the output shaft 12 by means of the six struts 71.

The strut-installation grooves 66, the head-ball installation holes 67, and the tail-ball installation holes 68, all of which are of the output shaft 12; the head balls 69; the tail balls 70; the struts 71; and the cutaways 72 of the first-speed driven gear 21 to the seventh-speed driven gear 27 together form a clutch mechanism 35 of the present invention.

The first-speed driven gear 21 to the seventh-speed driven gear 27 are assembled to the output shaft 12 in the following way. Note that the assembling of the first-speed driven gear 21 to the output shaft 12 is taken as an example for the explanation. Firstly, the head balls 69 are installed respectively in the head-ball installation holes 67 in the outer circumference of the output shaft 12 and the tail balls 70 are installed respectively in the tail-ball installation holes 68 in the outer circumference of the output shaft 12. The struts 71 are then installed respectively in the strut-installation grooves 66 so as to press the head balls 69 and the tail balls 70 from their respective outer sides in the radial direction. Subsequently, a pair of set rings 73 and 73 each of which is formed by cutting a portion thereof in the circumferential direction to make a key groove are disposed on the outer circumference of the output shaft 12 and at positions located on the two sides of each of the strut 71 in the axial direction. The set rings 73 thus disposed press respectively the set-ring engagement portions 71f of the struts 71 from the outer side in the radial direction, and thereby the head balls 69, the tail balls 70, and the struts 71 are held so as not to drop off. Furthermore, the bush 28 is fitted to the outer circumference of each set ring 73. Then, a key 74 is used to lock the set ring 73 and the bush 28 to the output shaft 12 so that the set ring 73 and the bush 28 cannot relatively rotate.

As has been described above, the set rings 73 are provided to fix temporarily the struts 71, the head balls 69, and the tail balls 70 to the output shaft 12 so as to prevent the dropping off of the struts 71, the head balls 69, and the tail balls 70 from the output shaft 12. In addition, the set rings 73 can be used for the purpose of positioning, in the axial direction, of the struts 71 so that an improvement in assembling these components can be accomplished.

Each of the first-speed driven gear 21 to the seventh-speed driven gear 27 is rotatably supported by two bushes 28 and 28. The struts 71, the head balls 69, and the tail balls 70 are supported between the two bushes 28 and 28. In this way, the first-speed driven gear 21 to the seventh-speed driven gear 27 are assembled to the output shaft 12 sequentially, in accordance with their arrangement sequence, from the right-hand side thereof to the left-hand side thereof. The first-speed driven gear 21 located at the most right-hand side is locked to a stopper protrusion 12a with a spacer 75 set in between. The sixth-speed driven gear 27 located at the most left-hand side is locked to a sensor ring 77 fixed to the output shaft 12 with a C-clip 76. As a consequence, the first-speed driven gear 21 to the seventh-speed driven gear 27 are supported on the output shaft 12.

The bushes 28 support the first-speed driven gear 21 to the seventh-speed driven gear 27 on the output shaft 12 so that the first-speed driven gear 21 to the seventh-speed driven gear 27 can be relatively rotatable. The bushes 28 support each gear at its opposite end portions in the axial direction thereof while evading the central portion in the axial direction thereof. Accordingly, a space for disposing the clutch mechanism 35 can be obtained in the central portion in the axial direction thereof. In addition, each bush 28 provides support for opposite end portions of two adjacent gears which face each other. As a consequence, the number of bushes 28 can be kept to the minimum.

There are three switchable engagement relationships between the output shaft 12 and the first-speed driven gear 21 to the seventh-speed driven gear 27.
(1) Engaged state (see FIGS. 15A and 15B).
(2) One-way state (see FIGS. 16A and 16B).
(3) Disengaged state (see FIG. 17).

First of all, the engaged state (1) will be described. The state that FIGS. 15A and 15B illustrate is: the first convex portion 31b of the cam groove 31a of the slide cam 31 pushes up outwards in the radial direction the head ball 69 and the first engagement face 71b of the strut 71. The arm portion 71e of the strut 71 pushes down the tail ball 70 into the first recessed portion 64b of the slider 64 (i.e., the state that FIGS. 8 to 12 describe).

As described above, at the time of acceleration with this engaged state (see FIG. 15A), the rotation of the first-speed driven gear 21 in the direction indicated by the arrow A is transmitted via the strut 71 to the output shaft 12. Accordingly, the rotation of the input shaft 11 is transmitted to the output shaft 12 via the first-speed drive gear 14 and the first-speed driven gear 21 while the speed of the rotation is reduced.

Conversely, at the time of deceleration (see FIG. 15B), the rotation of the first-speed driven gear 21 is relatively in the opposite direction (as indicated by the arrow B) with respect to the output shaft 12. In the meanwhile, the driving force of the first-speed driven gear 21 is transmitted from the slant face 72b of the first-speed driven gear 21 to the output shaft 12 via the first engagement face 71b of the strut 71, the head ball 69, and the head-ball installation hole 67. As a consequence, the driving force is kept on being transmitted even at the time of deceleration. Accordingly, at the time of deceleration, the driving force is transmitted in the reverse direction from the drive-wheel side to the engine side, so that the engine brake can be activated without any hindrance.

Subsequently, the one-way state (2) will be described. As FIGS. 16A and 16B show, in the one-way state, the cam groove 31a of the slide cam 31 faces the bottom surface of the head ball 69, and the first recessed portion 64b of the slider 64 faces the bottom surface of the tail ball 70.

In this state, at the time of acceleration during which the first-speed driven gear 21 rotates in the direction indicated by the arrow A (see FIG. 16A), even when the head ball 69 is not pushed up by the first convex portion 31b of the cam groove 31a of the slide cam 31, the head ball 69 is pushed up outwards in the radial direction by the centrifugal force. Accordingly, the driving force is kept on being transmitted as in the case of the time of acceleration in the engaged state (see FIG. 15A).

As described above, at the time of transition from the acceleration in the engaged state (see FIG. 15A) to the acceleration in the one-way state (see FIG. 16A), the head ball 69 is biased outwards in the radial direction by the centrifugal force. Accordingly, the driving force is kept on being transmitted without any discontinuance. As a consequence, the one-way state can be achieved without being affected by the operation speed of the gear-shifting operation to move the slide cam 31.

Conversely, at the deceleration (see FIG. 16B), the rotation of the first-speed driven gear 21 is relatively in the opposite direction (as indicated by the arrow B) with respect to the output shaft 12. Accordingly, since the third engagement face 71d of the strut 71 is pressed on by the slant face 72b of the cutaway 72 of the first-speed driven gear 21, the strut 71 moves swinging clockwise from the position indicated by the solid line to the position indicated by the chained line. As a consequence, the first engagement face 71b of the strut 71 disengages from the drive face 72a of the cutaway 72 of the first-speed driven gear 21, so that the first-speed driven gear 21 slips on the output shaft 12.

Figure 17:
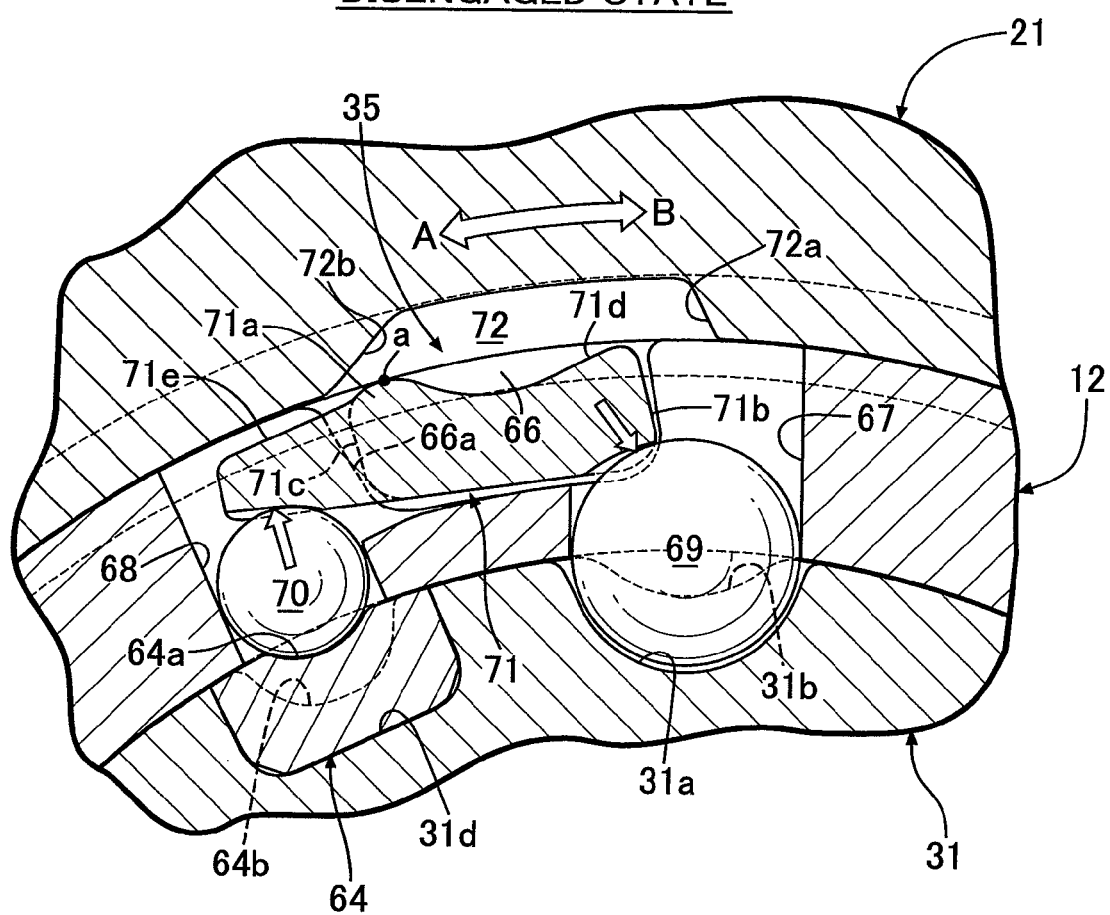

Subsequently, the disengaged state (3) will be described. As FIG. 17 shows, in the disengaged state, the cam groove 31a of the slide cam 31 faces the bottom surface of the head ball 69, and the cam groove 64a of the slider 64 faces the bottom surface of the tail ball 70.

In this state, the tail ball 70 that is pushed up by the cam groove 64a of the slider 64 pushes up the arm portion 71e of the strut 71, and the head ball 69 is made to fall down into the cam groove 31a of the slide cam 31. Accordingly, the strut 71 moves swinging clockwise around the support point a, and the first engagement face 71b of the strut 71 disengages from the drive face 72a of the cutaway 72 of the first-speed driven gear 21. As a consequence, the first-speed driven gear 21 slips on the output shaft 12 both at the time of acceleration and at the time of deceleration.

The engaged state of the first-speed driven gear 21, the one-way state thereof, and the disengaged state thereof have been described thus far, and each of the second-speed driven gear 22 to the seventh-speed driven gear 27 operates in a similar fashion. There is, however, a difference between the group of the first-speed driven gear 21, the third-speed driven gear 22, the fifth-speed driven gear 23, and the seventh-speed driven gear 24 and the group of the second-speed driven gear 25, the fourth-speed driven gear 26, and the sixth-speed driven gear 27. In the first, third, fifth, seventh-speed driven gears 21 to 24, the head ball 69 is pushed up by the first convex portion 31*b* of the cam groove 31*a* of the slide cam 31, and the tail ball 70 falls down into the first recessed portion 64*b* of the slider 64. By contrast, in the second, fourth, sixth-speed driven gears 25 to 27, the head ball 69 is pushed up by the second convex portion 31*c* of the cam groove 31*a* of the slide cam 31, and the tail ball 70 falls down into the second recessed portion 64*c* of the slider 64.

first-speed shift stage, to the neutral shift stage. The description will be given with reference to FIGS. 18 to 34.

Figure 18:
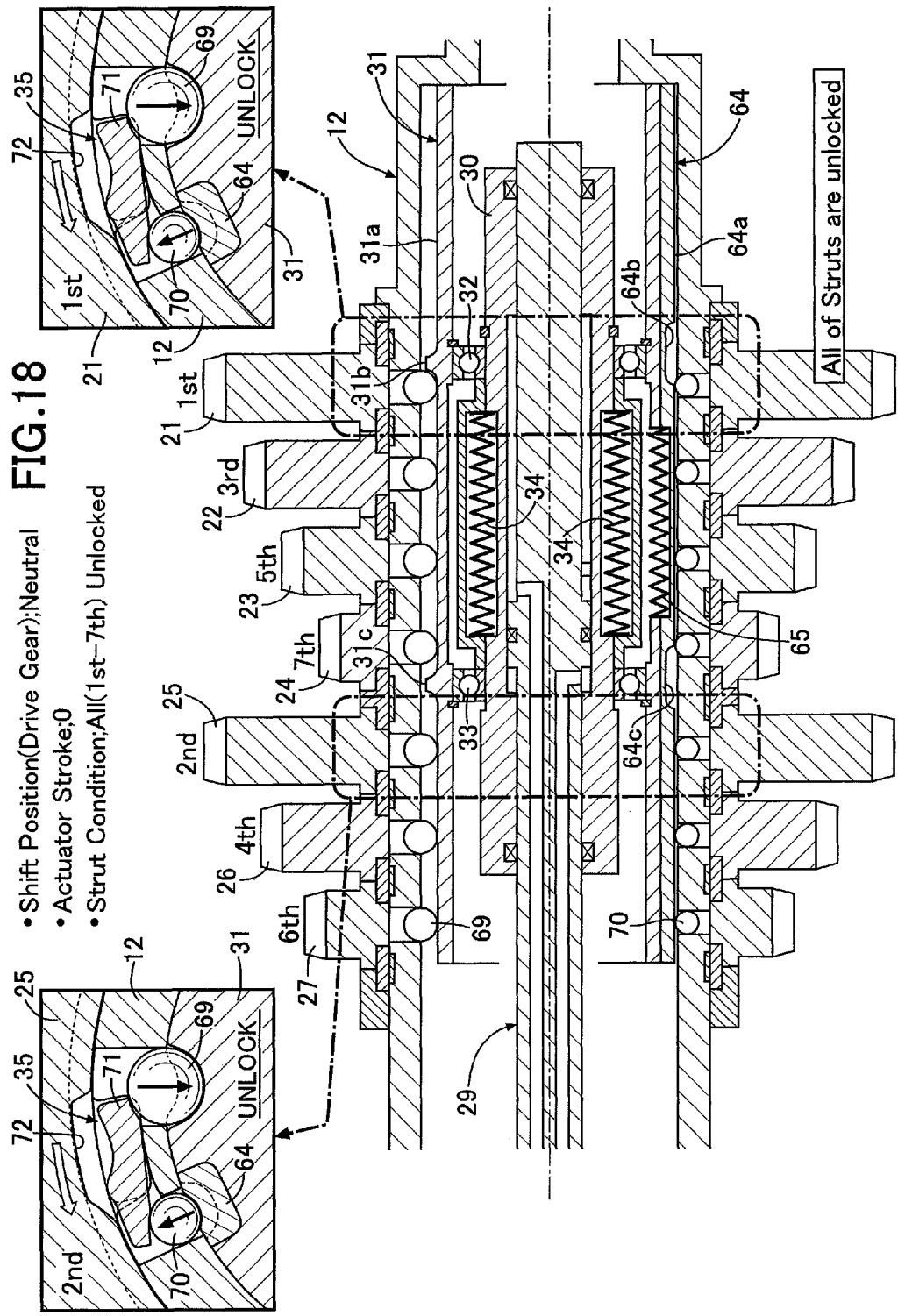

FIG. 18 corresponds to the actuator stroke "0" of Table 1. The cylinder 30 is positioned on the most right-hand side within the possible position range. The first convex portion 31*b* of the cam groove 31*a* of the slide cam 31 is positioned so as to be adjacent to the right-hand side of the first-speed driven gear 21. The second convex portion 31*c* of the cam groove 31*a* of the slide cam 31 is positioned on the right-hand side of the second driven gear 25 with a space in between. In addition, the first recessed portion 64*b* of the slider 64 disposed in the slide cam 31 is positioned so as to be adjacent to the right-hand side of the first-speed driven gear 21. The second recessed portion 64*c* of the slider 64 is positioned on the right-hand side of the second driven gear 25 with a space in between.

The tail ball 70 for the first-speed shift stage is pushed up by the slider 64 while the head ball 69 falls down into the cam groove 31*a* of the slide cam 31. Accordingly, the strut 71 swings clockwise, so that the engaging of the first-speed driven gear 21 and the output shaft 12 is released (disengaged state) and the second-speed driven gear 22 to the seventh-speed driven gear 27 are also disengaged. As a consequence, the driving force is not transmitted by means of the transmission T.

Figure 19:
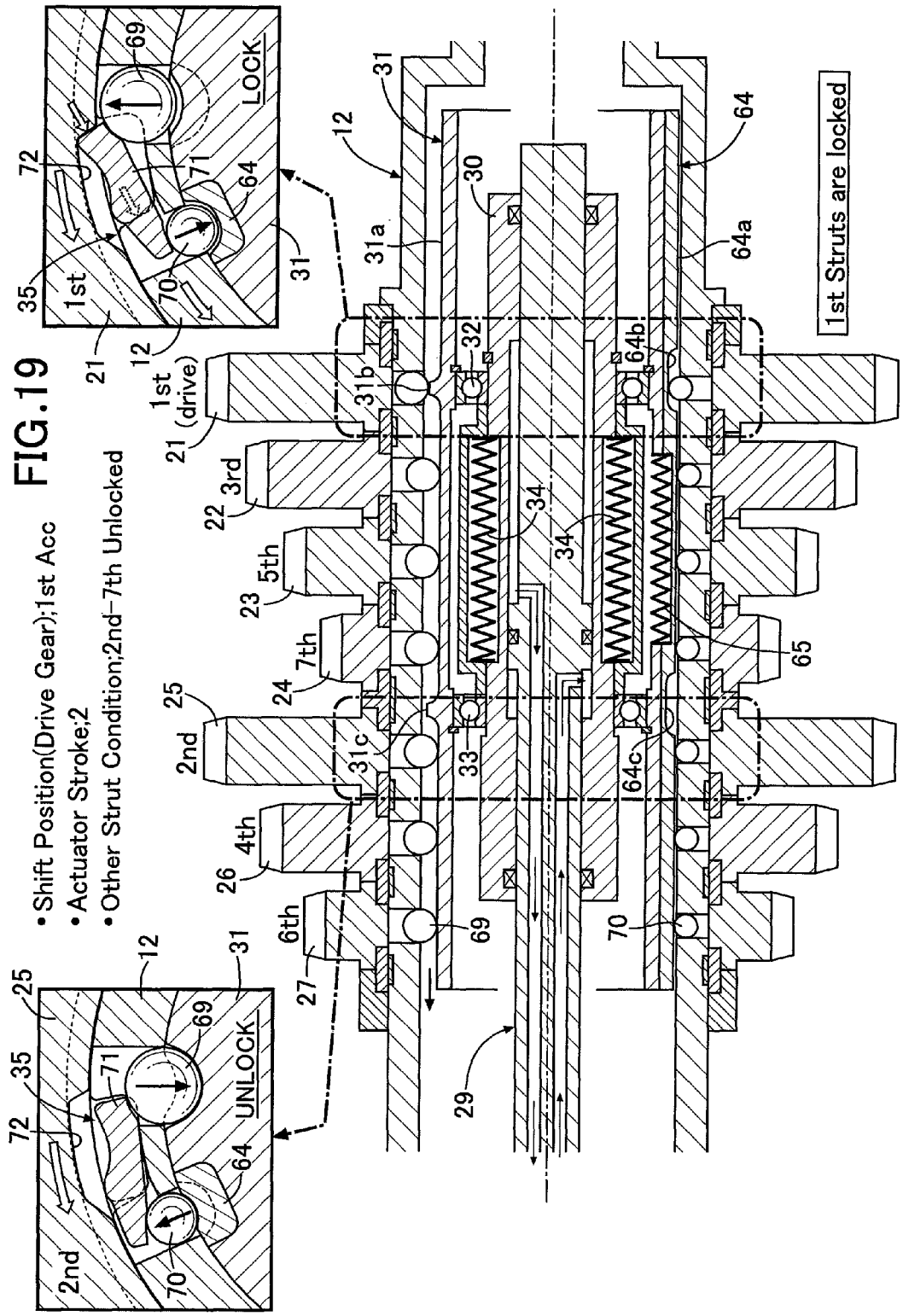

FIG. 19 corresponds to the actuator stroke "2" of Table 1. The cylinder 30 moves leftwards, and the first convex portion 31*b* of the cam groove 31*a* of the slide cam 31 pushes up the head ball 69 for the first-speed shift stage while the tail ball 70 falls down into the first recessed portion 64*b* of the slider 64. Accordingly, the strut 71 swings counterclockwise to become the engaged state. The rotation of the first-speed driven gear 21 is thus transmitted to the output shaft 12 by means of the strut 71, that is, the engaging of the first-speed gear set is completed. In the meanwhile, the second-speed driven gear 22 to the seventh-speed driven gear 27 are left still in disengaged state.

Figure 20:
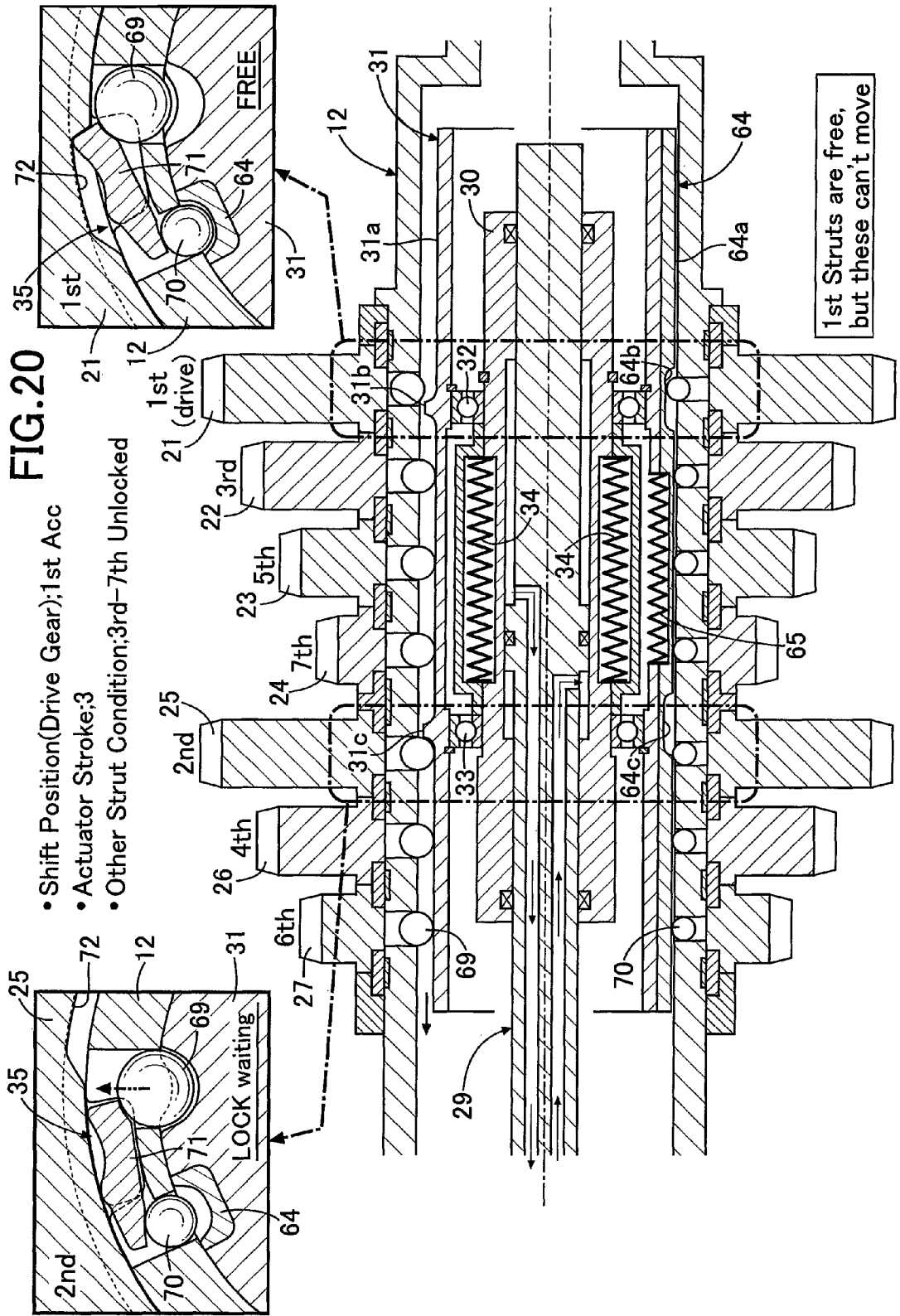

FIG. 20 corresponds to the actuator stroke "3" of Table 1. The cylinder 30 moves leftwards. The first convex portion 31*b* of the cam groove 31*a* of the slide cam 31 moves beyond the head ball 69 of the first-speed shift stage, and the cam

TABLE 1

| Actuator Stroke (interval) | | US@Acc | US@Dec | DS@Acc | DS@Dec | Gear Condition | | | | | | | |
|---|---|---|---|---|---|---|---|---|---|---|---|---|---|
| | | | | | | 1st | 2nd | 3rd | 4th | 5th | 6th | 7th | |
| 1st | 0 | ░░ | ░░ | ░░ | ░░ | x | x | x | x | x | x | x | ← Neutral NORMAL POSITION |
| | 1 | 1 | ░░ | 1 | ░░ | ▨ | x | x | x | x | x | x | |
| | 2 | 2 | 2 | 2 | 2 | ▨ | x | x | x | x | x | x | ← 1st NORMAL POSITION |
| 2nd | 3 | ░░ | ░░ | ░░ | ░░ | ▨ | ▨ | x | x | x | x | x | |
| | 4 | 4 | 4 | 4 | 4 | ▨ | ▨ | x | x | x | x | x | |
| | 5 | 5 | 5 | 5 | 5 | x | ▨ | x | x | x | x | x | ← 2nd NORMAL POSITION |
| 3rd | 6 | ░░ | ░░ | ░░ | ░░ | x | ▨ | ▨ | x | x | x | x | |
| | 7 | 7 | 7 | 7 | 7 | x | ▨ | ▨ | x | x | x | x | |
| | 8 | 8 | 8 | 8 | 8 | x | x | ▨ | x | x | x | x | ← 3rd NORMAL POSITION |
| 4th | 9 | ░░ | ░░ | ░░ | ░░ | x | x | ▨ | ▨ | x | x | x | |
| | 10 | 10 | 10 | 10 | 10 | x | x | ▨ | ▨ | x | x | x | |
| | 11 | 11 | 11 | 11 | 11 | x | x | x | ▨ | x | x | x | ← 4th NORMAL POSITION |
| 5th | 12 | ░░ | ░░ | ░░ | ░░ | x | x | x | ▨ | ▨ | x | x | |
| | 13 | 13 | 13 | 13 | 13 | x | x | x | ▨ | ▨ | x | x | |
| | 14 | 14 | 14 | 14 | 14 | x | x | x | x | ▨ | x | x | ← 5th NORMAL POSITION |
| 6th | 15 | ░░ | ░░ | ░░ | ░░ | x | x | x | x | ▨ | ▨ | x | |
| | 16 | 16 | 16 | 16 | 16 | x | x | x | x | ▨ | ▨ | x | |
| | 17 | 17 | 17 | 17 | 17 | x | x | x | x | x | ▨ | x | ← 6th NORMAL POSITION |
| 7th | 18 | ░░ | ░░ | ░░ | ░░ | x | x | x | x | x | ▨ | ▨ | |
| | 19 | 19 | 19 | 19 | 19 | x | x | x | x | x | ▨ | ▨ | |
| | 20 | 20 | 20 | 20 | 20 | x | x | x | x | x | x | ▨ | ← 7th NORMAL POSITION |

Table 1 shows states of the first-speed driven gear 21 to the seventh-speed driven gear 27 for 21 stages of the stroke of the actuator (cylinder 30). The 21 stages are formed by dividing the actuator stroke between the normal position of the neutral shift stage and the normal position of the seventh-speed shift stage into 21 stages from "0" to "20." In the table, "○" represents the engaged state; "x" represents the disengaged state; and "—" represents the one-way state. In addition, "US@Acc" represents the up-shifting at the time of acceleration; "US@Dec" represents the up-shifting at the time of deceleration; "DS@Acc" represents the down-shifting at the time of acceleration; and "DS@Dec" represents the down-shifting at the time of deceleration.

The seven hatched areas in the table represent the actuator strokes in which the transmission of the driving force is discontinued. Each of the 1st to the 7th displayed so as to correspond respectively to the seven areas located between the hatched areas indicates one of the driven gears 21 to 27 that is actually involved in the transmission of the driving force in the corresponding actuator stroke. What is characteristic in this respect is that, at the time of US@Acc (up-shifting at the time of acceleration), the up-shifting can be accomplished without any discontinuance of the transmission of the driving force in all the actuator strokes of "1" to "20" but the actuator stroke "0 (neutral shift stage)."

What follows is the detailed description for the operation in a case of up-shifting from the neutral shift stage, via the first-speed shift stage and the second-speed shift stage, to the third-speed shift stage, and then down-shifting from the third-speed shift stage, via the second-speed shift stage and the groove 31a of the slide cam 31 faces the bottom side of the head ball 69. Nevertheless, the head ball 69 is still left pushed up outwards in the radial direction by the centrifugal force, so that the rotation of the first-speed driven gear 21 is still transmitted to the output shaft 12 by means of the strut 71. To put it other way, the first-speed gear set comes to be in the one-way state, and the driving force is kept on being transmitted without any discontinuance. In the meanwhile, the second-speed driven gear 22 to the seventh-speed driven gear 27 are left still in disengaged state.

Figure 21:
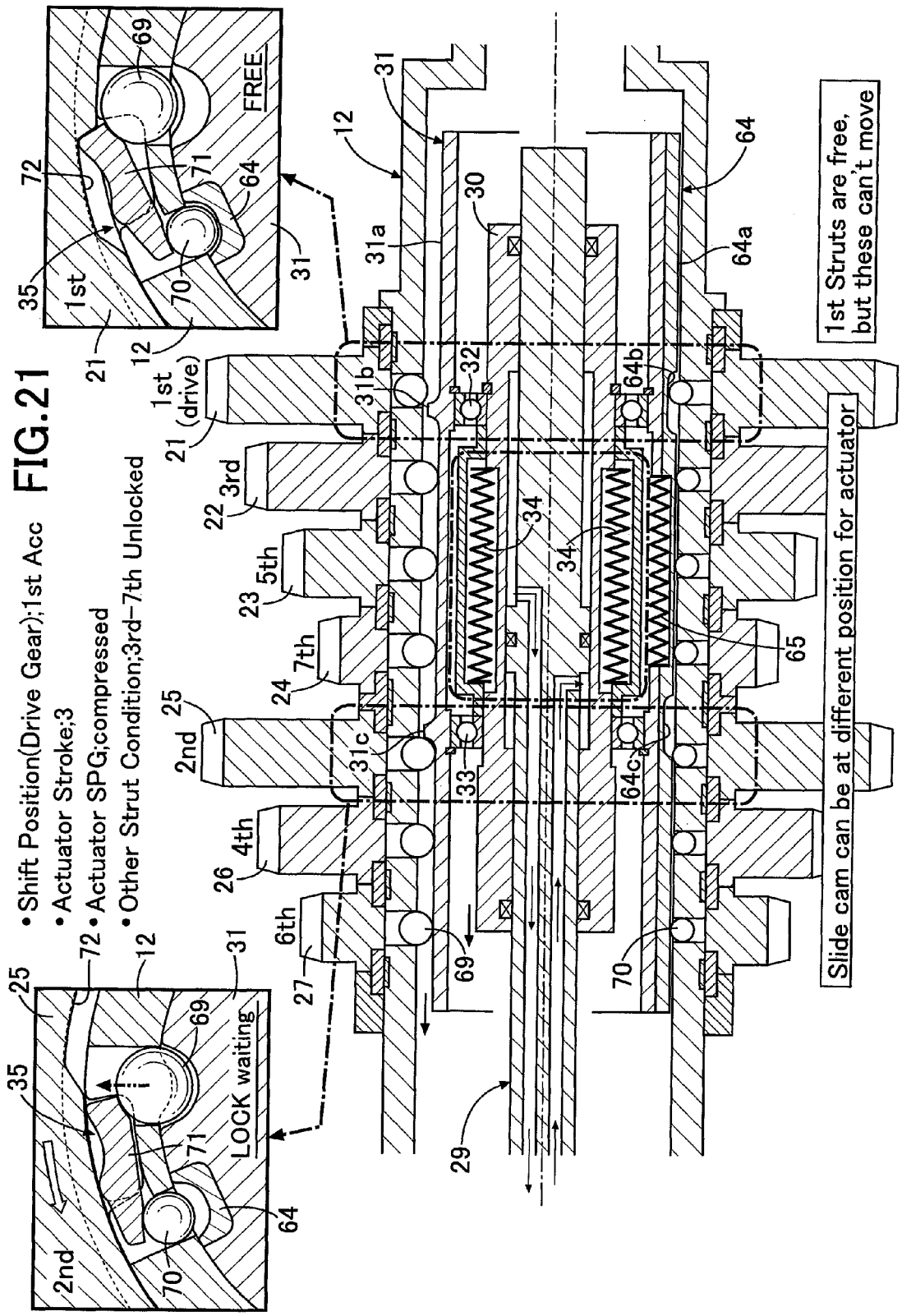

FIG. 21 also corresponds to the actuator stroke "3" of Table 1. The cylinder 30 moves further leftwards from its position shown in FIG. 20. The compression of the actuator springs 34, however, allows the slide cam 31 to remain at its position shown in FIG. 20. Also in this state, the first-speed gear set is in the one-way state, so that the driving force is kept on being transmitted without any discontinuance. The mechanism that brings about the compression of the actuator springs 34 and leaves the slide cam 31 at its position shown in FIG. 20 is as follows. The tail ball 70 of the second-speed shift stage rides on the cam groove 64a of the slider 64 so as to prevent the strut 71 from swinging counterclockwise. Accordingly, the head ball 69 cannot move outwards in the radial direction because of the strut 71 that blocks such a movement of the head ball 69. The head ball 69 that is prevented from moving blocks the leftward movement of the slide cam 31 with its second convex portion 31c being locked to the head ball 69.

Figure 22:
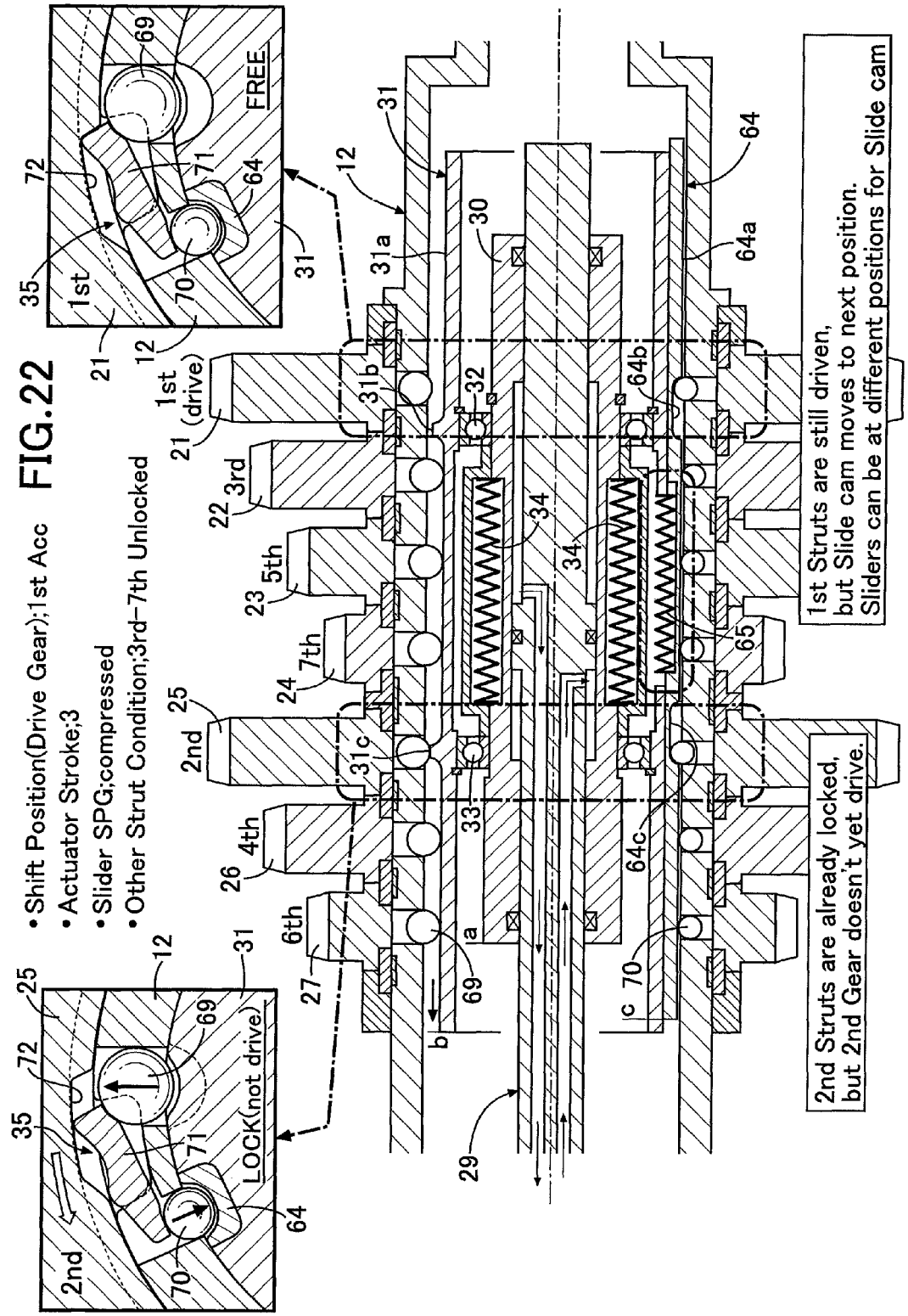

FIG. 22 also corresponds to the actuator stroke "3" of Table 1. The first-speed gear set becomes in the one-way state, so that the driving force is kept on being transmitted without any discontinuance. When the second-speed driven gear 25 relatively rotates with respect to the output shaft 12 to make the cutaway 72 reach the outer side, in the radial direction, of the strut 71, the head ball 69 becomes capable of moving outwards in the radial direction so as to push up the first engagement face 71b of the strut 71 into the inside of the cutaway 72. At the same time, the slide cam 31 also becomes capable of being moved leftwards by the spring force of the compressed actuator springs 34. In this state, however, the first engagement face 71b of the strut 71 of the second-speed shift stage does not still engage with the drive face 72a of the cutaway 72 of the second-speed driven gear 25. Accordingly, the engaging of the second-speed gear set has not been completed yet.

As has been described above, even when the cylinder 30 moves leftwards, the slide cam 31 compresses the actuator springs 34 and keeps its position. When the second-speed driven gear 25 rotates and becomes a state where the strut 71 can engage with the cutaway 72, the slide cam 31 is moved leftwards by the spring force of the actuator springs 34. The slide cam 31 thus pushes up the head ball 69 by the second convex portion 31c, and makes the strut 71 to swing so as to enter the cutaway 72. Accordingly, the strut 71 can be swung automatically at an appropriate timing irrespective of the moving speed of the cylinder 30.

In the meanwhile, the strut 71 of the first-speed shift stage engages with the drive face 72a of the cutaway 72 of the first-speed driven gear 21, and thereby the driving force is being transmitted. Accordingly, the strut 71 cannot swing clockwise, so that the tail ball 70 that is restrained by the strut 71 and cannot move outwards in the radial direction. As a consequence, even when the slide cam 31 moves leftwards, the slider 64 with its cam groove 64a being restrained by the tail ball 70 cannot move leftwards together with the slide cam 31. The slider 64 is left behind the slide cam 31 while the slider 64 is compressing the slider springs 65.

Figure 23:
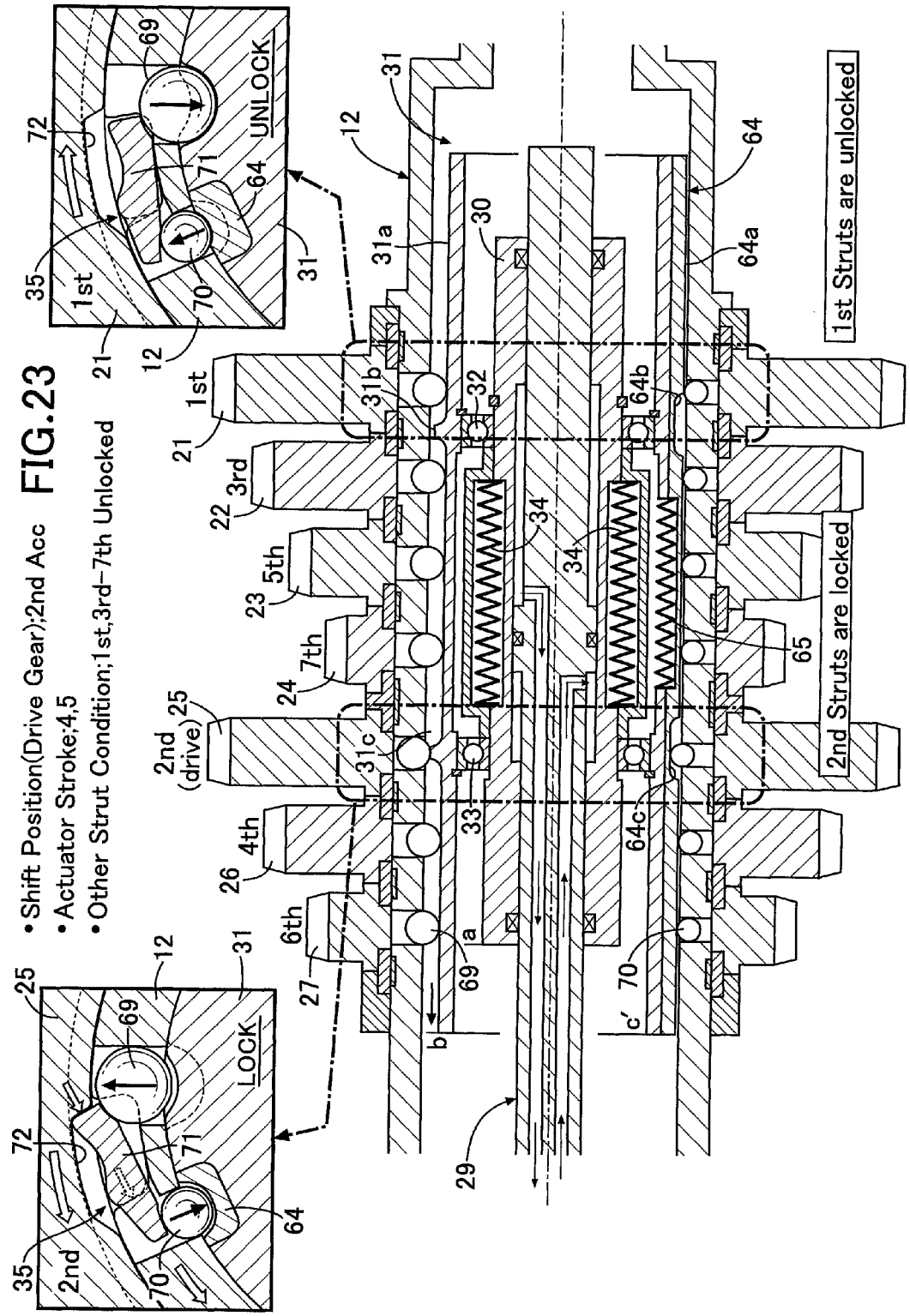

FIG. 23 corresponds to the actuator strokes "4" and "5" in Table 1. The drive face 72a of the cutaway 72 of the second-speed driven gear 25 engages with the first engagement face 71b of the strut 71, so that the engaging of the second-speed gear set is completed. The rotational speed of the output shaft 12 increases with the completion of the engaging of the second-speed gear set. Accordingly, the first-speed driven gear 21 rotates relatively in the opposite direction to the rotation of the output shaft 12. The first engagement face 71b of the strut 71 disengages from the drive face 72a of the cutaway 72 of the first-speed driven gear 21. As a consequence, the strut 71 is allowed to swing freely. In addition, the slider 64 that has been restrained as being compressing the slider spring 65 is moved leftwards by the spring force of the slider spring 65. Then, the tail ball 70 of the first-speed shift stage is pushed up to ride on the cam groove 64a of the slider 64, and the strut 71 swings clockwise to make the head ball 69 fall down into the cam groove 31a of the slide cam 31. As a consequence, the first-speed driven gear 21 becomes capable of relatively rotating with respect to the output shaft 12, and the first-speed gear set is disengaged.

During the transition from the state shown in FIG. 22 to the state shown in FIG. 23, neither the cylinder 30 nor the slide cam 31 moves. The cylinder 30 stays at a position a while the slide cam 31 stays at a position b. In the meanwhile, the slider 64 is moved leftwards from a position c to another position c' by the spring force of the slider spring 65 that has been compressed. As a consequence, the first-speed gear set is unlocked. Thus, the gear-shifting operation is progressed by moving the slider 64 without moving the cylinder 30. Accordingly, the total necessary stroke amount of the cylinder 30 can be reduced, and thus the transmission T can be made smaller in its dimension in the axial direction.

Figure 24:
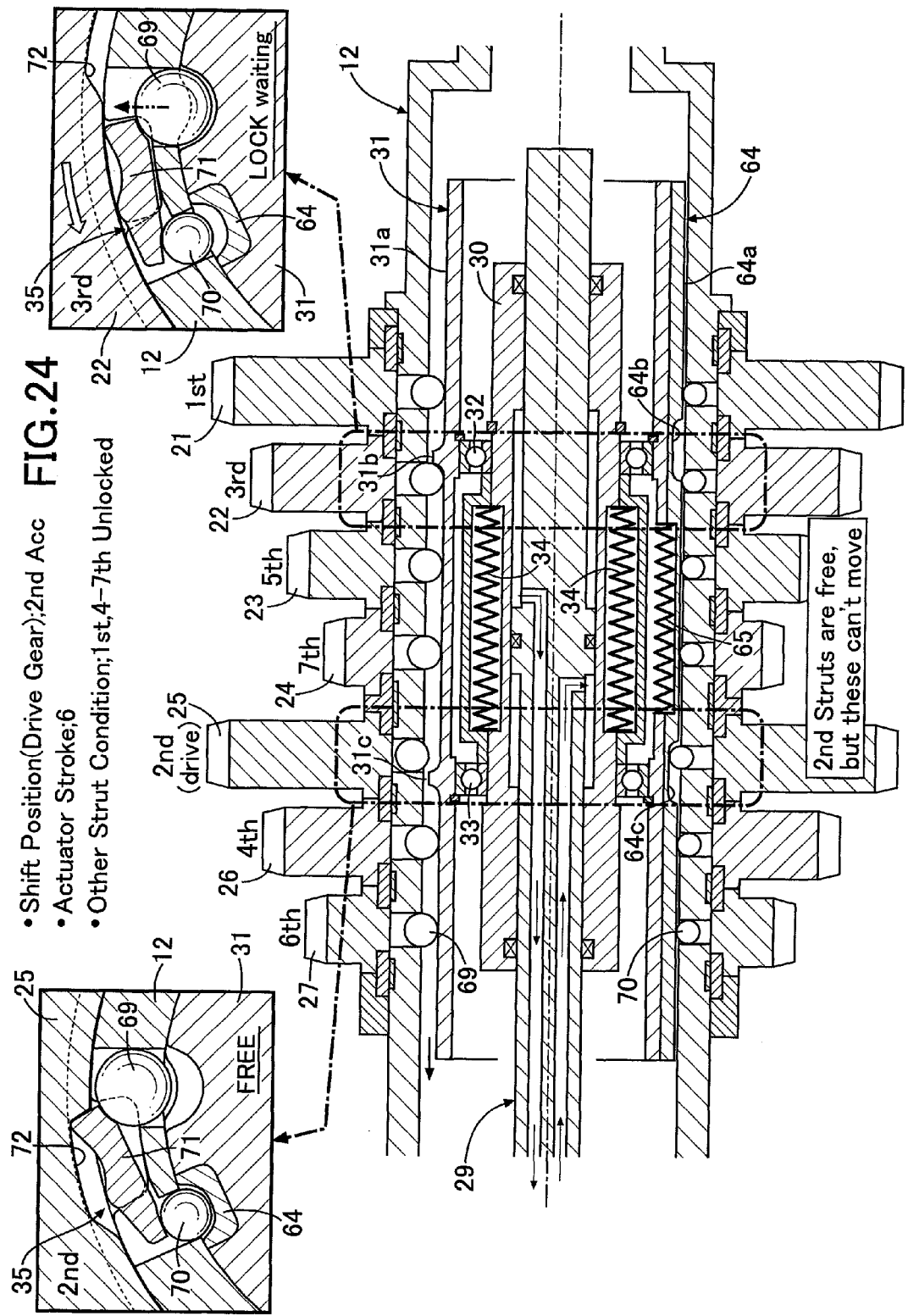

FIG. 24 corresponds to the actuator stroke "6" of Table 1. The cylinder 30 moves leftwards. The second convex portion 31c of the cam groove 31a of the slide cam 31 moves beyond the head ball 69 of the second-speed shift stage, and the cam groove 31a of the slide cam 31 faces the bottom side of the head ball 69. In the meanwhile, the head ball 69 is kept being pushed up outwards in the radial direction by the centrifugal force, so that the rotation of the second-speed driven gear 25 is still being transmitted to the output shaft 12 by means of the strut 71. To put it other way, the second-speed gear set comes to be in a one-way state, and the driving force is kept on being transmitted without any discontinuance. Note that in this event, the driven gears except for the second-speed driven gear 25 are in the disengaged state.

Figure 25:
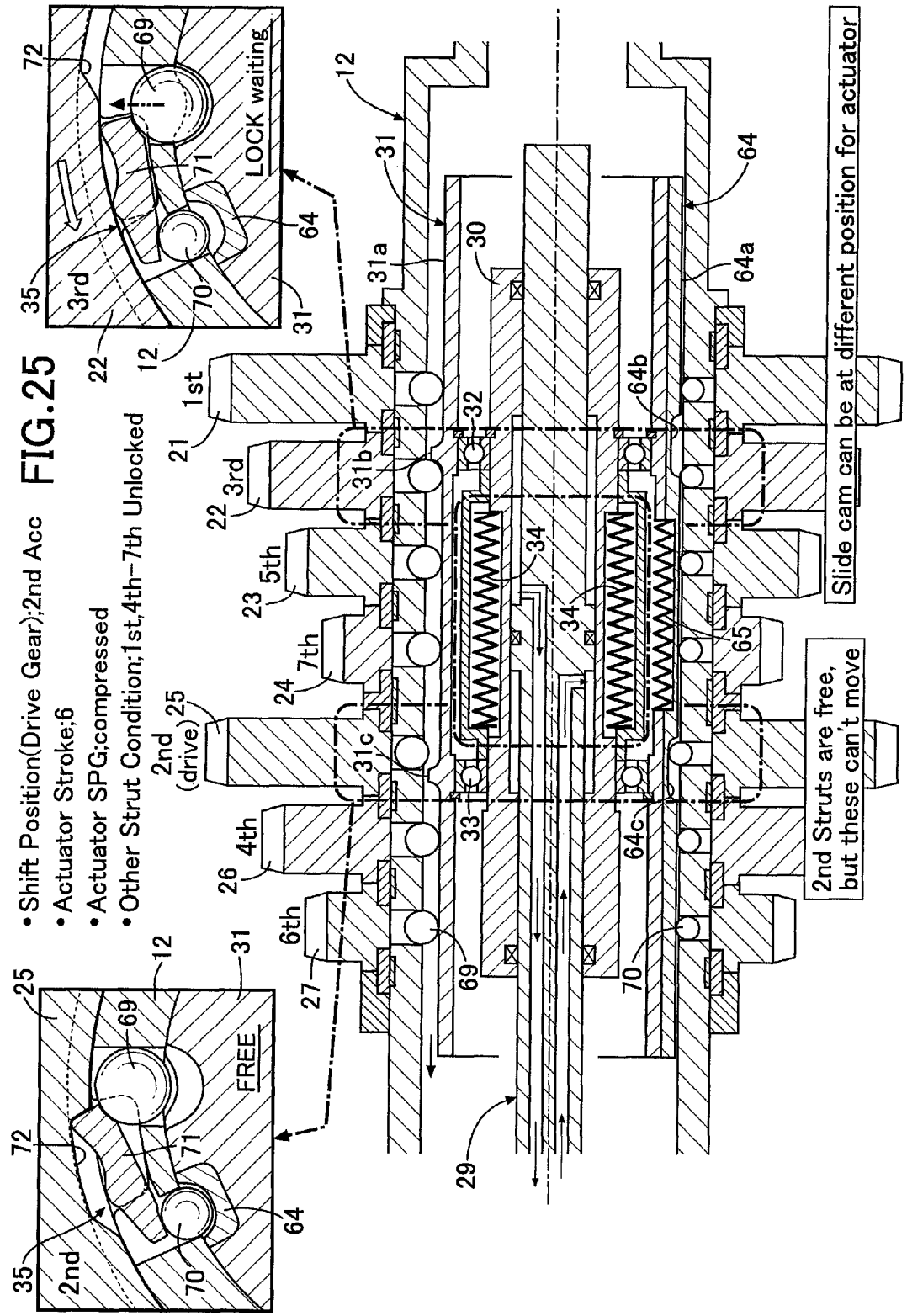

FIG. 25 also corresponds to the actuator stroke "6" of Table 1. The cylinder 30 moves further leftwards from the position shown in FIG. 25. Nevertheless, since the actuator springs 34 are compressed, the slide cam 31 remains at the same position that is shown in FIG. 25. Even in this state, the second-speed gear set comes to be in a one-way state, and the driving force is kept on being transmitted without any discontinuance. The mechanism which makes the actuator springs 34 be compressed and which makes the slide cam 31 remain at the same position that is shown in FIG. 25 is as follows. Since the tail ball 70 of the third-speed shift stage rides on the cam groove 64a of the slider 64 so as to prevent the counterclockwise swinging motion of the strut 71, the head ball 69 that is blocked by the strut 71 and cannot move outwards in the radial direction. As a consequence, since the first convex portion 31b of the slide cam 31 is locked to the head ball 69, the leftward movement of the same slide cam 31 is blocked.

Figure 26:
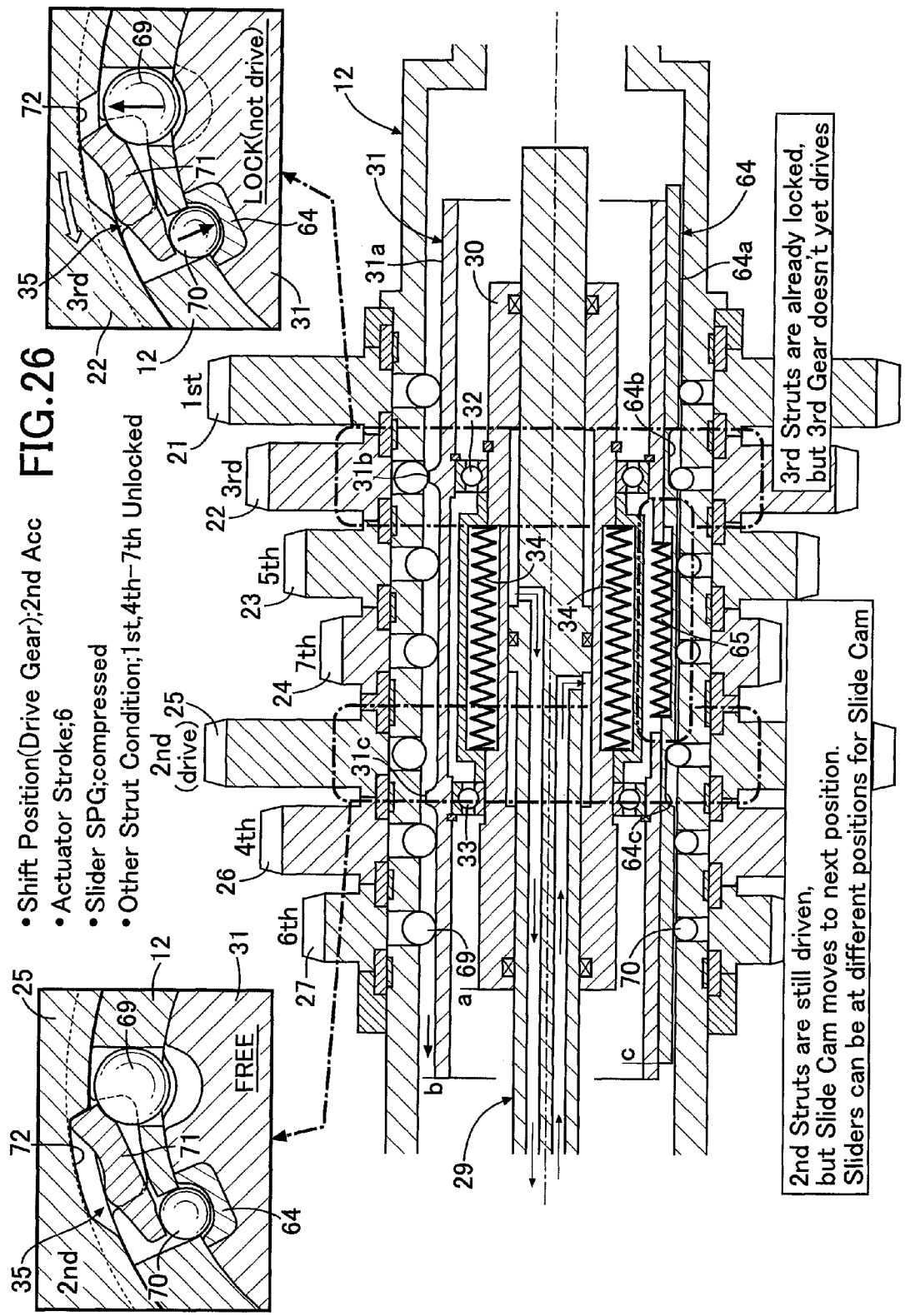

FIG. 26 also corresponds to the actuator stroke "6" in Table 1. The second-speed gear set is in the one-way state, so that the driving force is kept on being transmitted without any discontinuance. The third-speed driven gear 22 relatively rotates with respect to the output shaft 12 to make the cutaway 72 reach the outer side, in the radial direction, of the strut 71, the head ball 69 becomes capable of moving outwards in the radial direction so as to push up the first engagement face 71b of the strut 71 into the inside of the cutaway 72. At the same time, the slide cam 31 also becomes capable of being moved leftwards by the spring force of the compressed actuator springs 34. In this state, however, the first engagement face 71b of the strut 71 of the third-speed shift stage does not still engage with the drive face 72a of the cutaway 72 of the third-speed driven gear 22. Accordingly, the engaging of the third-speed gear set has not been completed yet.

As has been described above, even when the cylinder 30 moves leftwards, the slide cam 31 compresses the actuator springs 34 and keeps its position. When the third-speed driven gear 22 rotates and becomes a state where the strut 71 can engage with the cutaway 72, the slide cam 31 is moved leftwards by the spring force of the actuator springs 34. The slide cam 31 thus pushes up the head ball 69 by the first convex portion 31b, and makes the strut 71 swing so as to enter the cutaway 72. Accordingly, the strut 71 can be swung automatically at an appropriate timing irrespective of the moving speed of the cylinder 30.

In the meanwhile, the strut 71 of the second-speed shift stage engages with the drive face 72a of the cutaway 72 of the second-speed driven gear 25, and thereby the driving force is being transmitted. Accordingly, the strut 71 cannot swing clockwise, so that the tail ball 70 that is restrained by the strut 71 and cannot move outwards in the radial direction. As a consequence, even when the slide cam 31 moves leftwards, the slider 64 with its cam groove 64a being restrained by the tail ball 70 cannot move leftwards together with the slide cam 31. The slider 64 is left behind the slide cam 31 while the slider 64 is compressing the slider springs 65.

Figure 27:
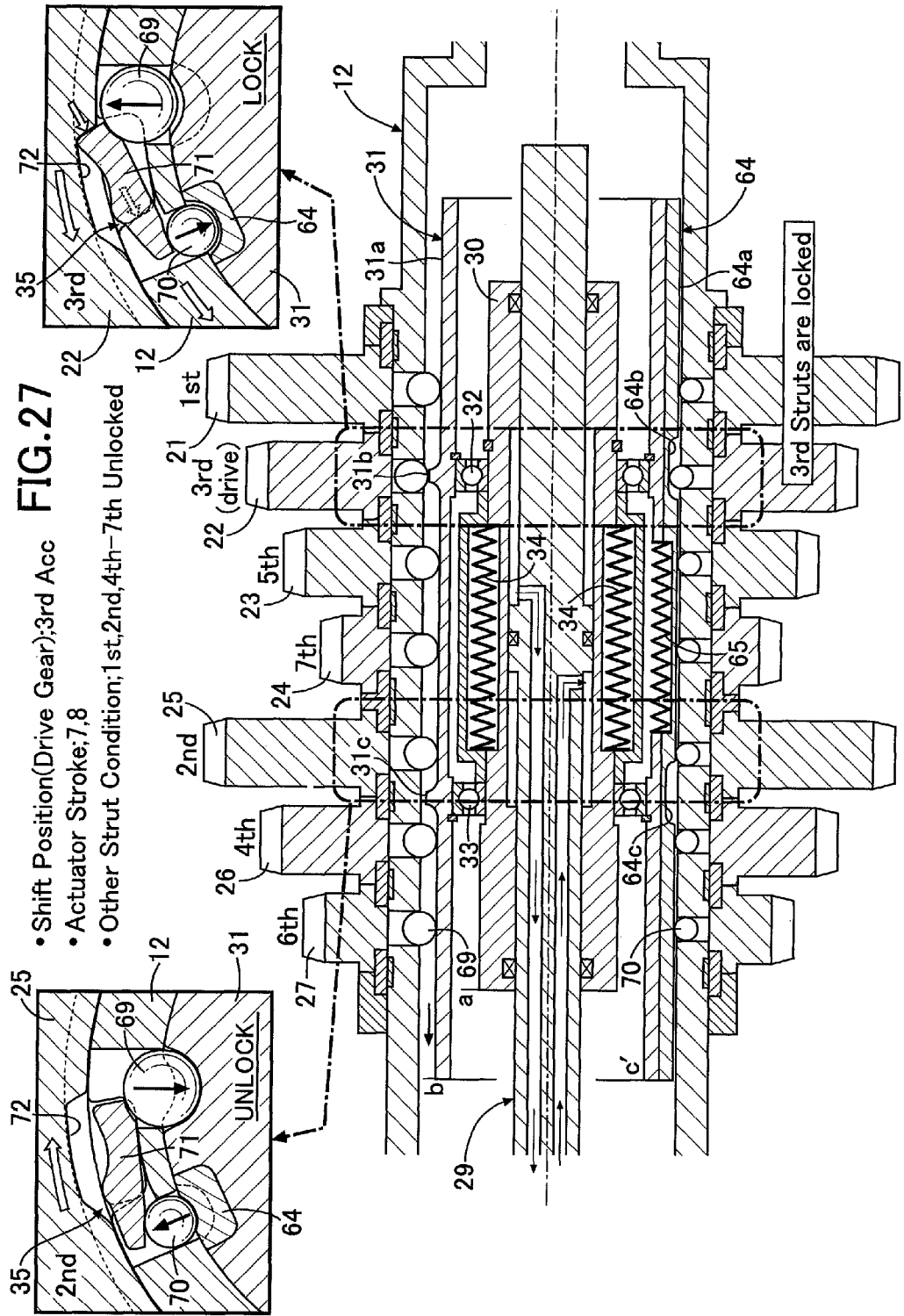

FIG. 27 corresponds to the actuator strokes "7" and "8" in Table 1. The drive face 72a of the cutaway 72 of the third-speed driven gear 22 engages with the first engagement face 71b of the strut 71, so that the locking of the third-speed gear set is completed. The rotational speed of the output shaft 12 increases with the completion of the locking of the third-speed gear set. Accordingly, the second-speed driven gear 25 rotates relatively in the opposite direction with respect to the output shaft 12. The first engagement face 71b of the strut 71 disengages from the drive face 72a of the cutaway 72 of the second-speed driven gear 25. As a consequence, the strut 71 is allowed to swing freely. In addition, the slider 64 that has been restrained as being compressing the slider spring 65 is moved leftwards by the spring force of the slider spring 65. Then, the tail ball 70 of the second-speed shift stage is pushed up to ride on the cam groove 64a of the slider 64, and the strut 71 swings clockwise to make the head ball 69 fall down into the cam groove 31a of the slide cam 31. As a consequence, the second-speed driven gear 25 becomes capable of relatively rotating with respect to the output shaft 12, that is, the second-speed gear set is unlocked.

During the transition from the state shown in FIG. 26 to the state shown in FIG. 27, neither the cylinder 30 nor the slide cam 31 moves. The cylinder 30 stays at a position a while the slide cam stays at a position b. In the meanwhile, the slider 64 is moved leftwards from a position c to another position c' by the spring force of the slider spring 65 that has been compressed. As a consequence, the second-speed gear set is unlocked. Thus, the gear-shifting operation is progressed by moving the slider 64 without moving the cylinder 30. Accordingly, the total necessary stroke amount of the cylinder 30 can be reduced, and thus the transmission T can be made smaller in its dimension in the axial direction.

The process of up-shifting from the neutral shift stage to the third-speed shift stage has been described thus far. The process of up-shifting from the third-speed shift stage to the seventh-speed shift stage is substantially the same as the above-described process, so that the overlapped description for the up-shifting process from the third-speed shift stage to the seventh-speed shift stage will be omitted below. Instead, what will be given next is the description of down-shifting from the third-speed shift stage to the neutral shift stage.

Figure 28:
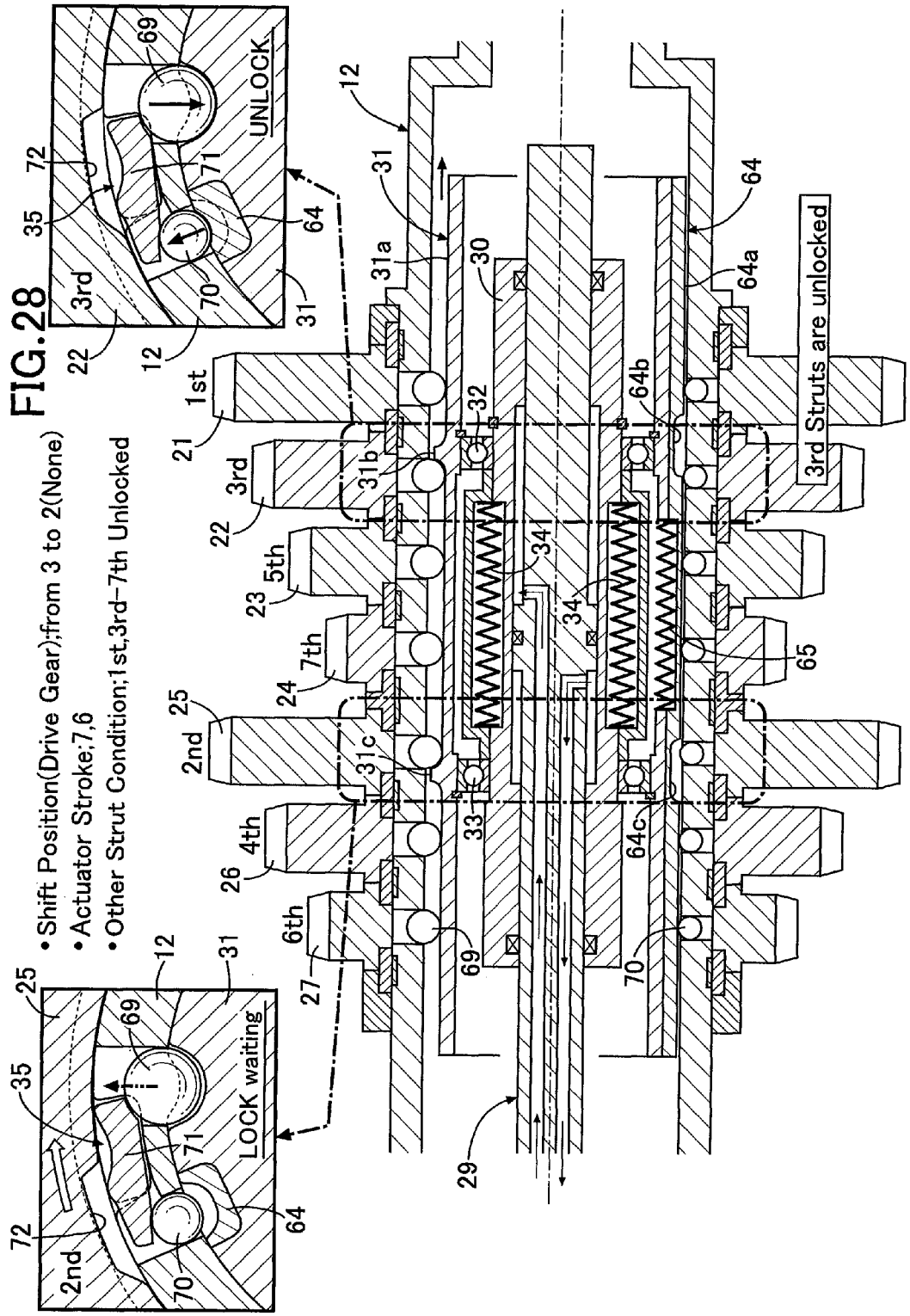

FIG. 28 corresponds to the actuator strokes "7" and "6" in Table 1. The slide cam 31 moves rightwards along with the rightward movement of the piston 30. Accordingly, the first convex portion 31b of the cam groove 31a of the slide cam 31 moves rightwards from the position below the head ball 69 of the third-speed shift stage. The head ball 69 falls down into the inside of the cam groove 31a, and, at the same time, the cam groove 64a of the slider 64 pushes up the tail ball 70. Accordingly, the strut 71 moves swinging clockwise to make the first engagement face 71b withdraws from the drive face 72a of the cutaway 72 of the third-speed driven gear 22, so that the third-speed gear set is unlocked. In the meanwhile, the tail ball 70 of the second-speed shift stage faces the second recessed portion 64c of the slider 64, and the head ball 69 is biased outwards in the radial direction by the centrifugal force. The cutaway 72 of the second-speed driven gear 25, however, has not reached the position of the strut 71 yet. Accordingly, the engaging of the second-speed gear set has not been completed yet.

Figure 29:
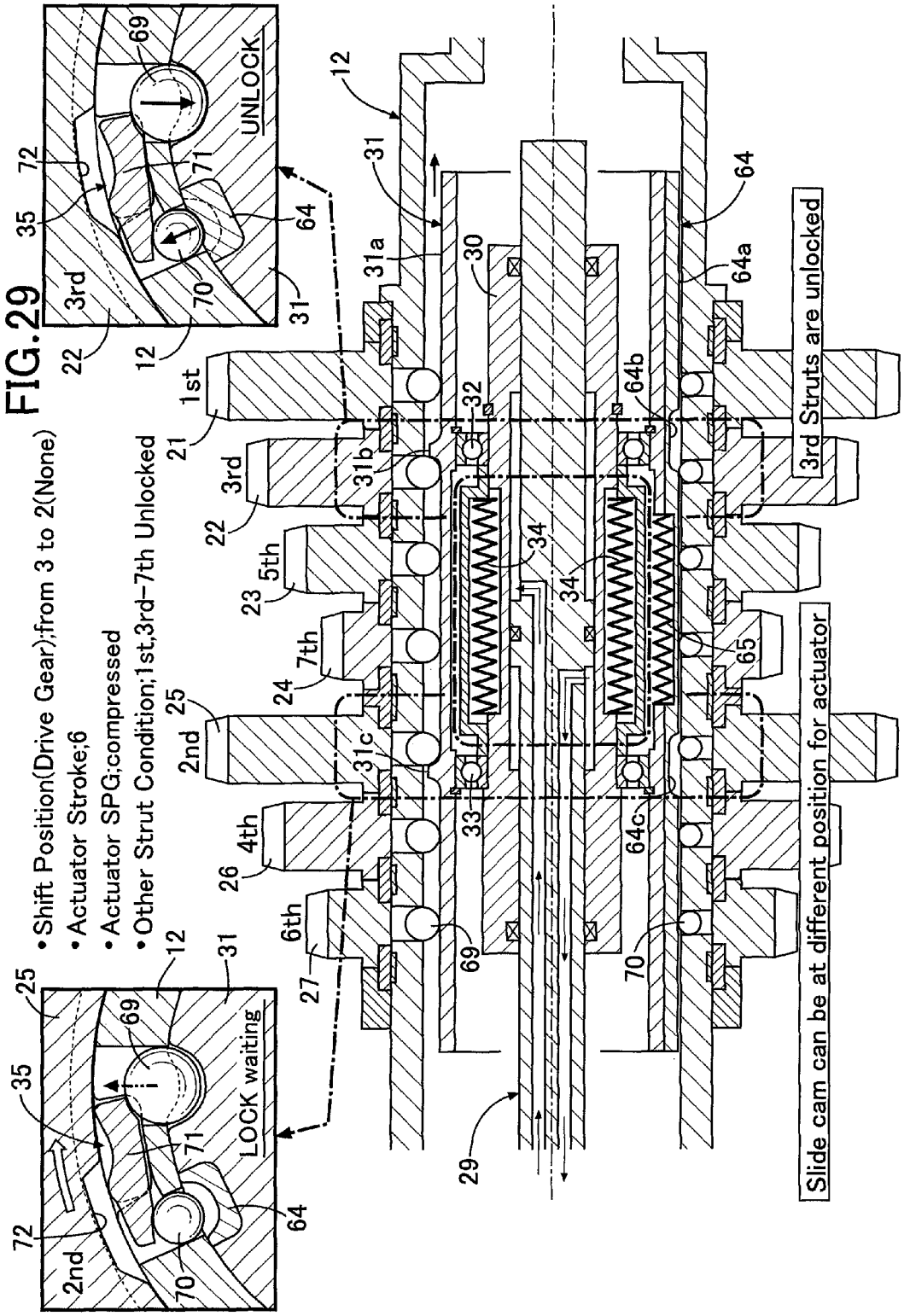

FIG. 29 corresponds to the actuator stroke "6" in Table 1. Even when the piston 30 moves further rightwards, the cutaway 72 of the second-speed driven gear 25 does not reach the position of the strut 71. Accordingly, the strut 71 blocks the head ball 69, and thereby the head ball 69 cannot move outwards in the radial direction. The head ball 69 gets stuck on the first convex portion 31b of the slide cam 31, so that the slide cam 31 cannot move rightwards. As a consequence, the cylinder 30 moves rightwards as compressing the actuator spring 34. In this event, the cylinder 30 leaves the slide cam 31 behind at the position shown in FIG. 29. In this state of the actuator stroke "6," the transmission of the driving force is temporarily discontinued.

Figure 30:
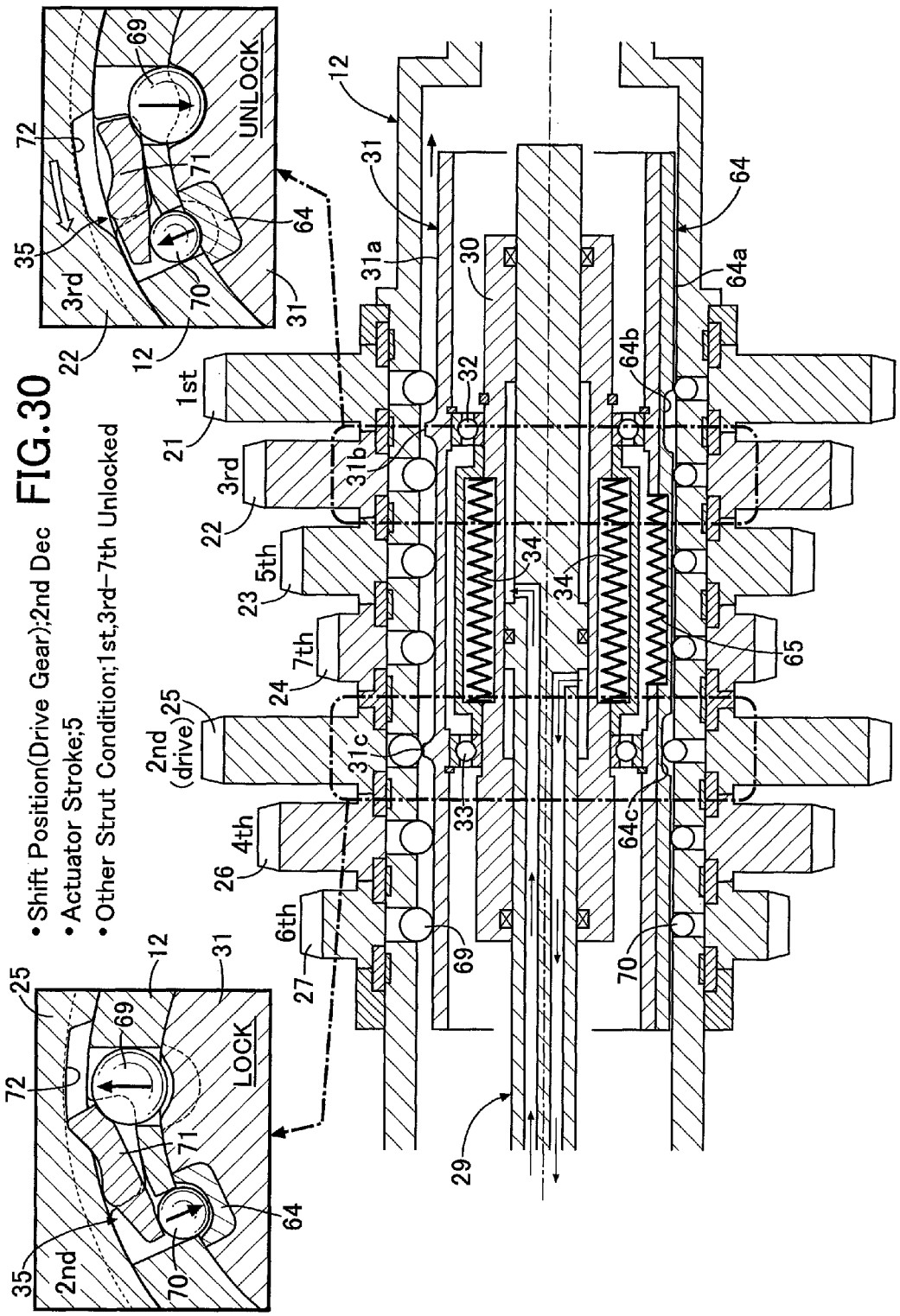

FIG. 30 corresponds to the actuator stroke "5" in Table 1. Once the cutaway 72 of the second-speed driven gear 25 reaches the position of the strut 71, the first engagement face 71b of the strut 71 is fitted to the cutaway 72, and the strut 71 moves swinging counterclockwise. Accordingly, the head ball 69 becomes capable of moving outwards in the radial direction. As a consequence, the spring force of the compressed actuator spring 34 moves the slide cam 31 rightwards so that the slide cam 31 can follow the cylinder 30. The second convex portion 31c of the cam groove 31a of the slide cam 31 pushes up the head ball 69, so that the engaging of the second-speed gear set is completed. The way in which the driving force is transmitted at this time is the same as the way at the time of deceleration described with reference to FIG. 15B.

As has been described above, even when the cylinder 30 moves rightwards, the slide cam 31 keeps its position as compressing the actuator springs 34. Once the rotation of the second-speed driven gear 25 makes the cutaway 72 be in a state where the strut 71 is capable of engaging with the cutaway 72, the spring force of the actuator springs 34 moves the slide corn 31 rightwards to make the second convex portion 31c push up the head ball 69. The head ball 69 thus pushed up makes the strut 71 move swinging into the inside of the cutaway 72. Accordingly, the strut 71 can be swung automatically at an appropriate timing irrespective of the moving speed of the cylinder 30.

Figure 31:
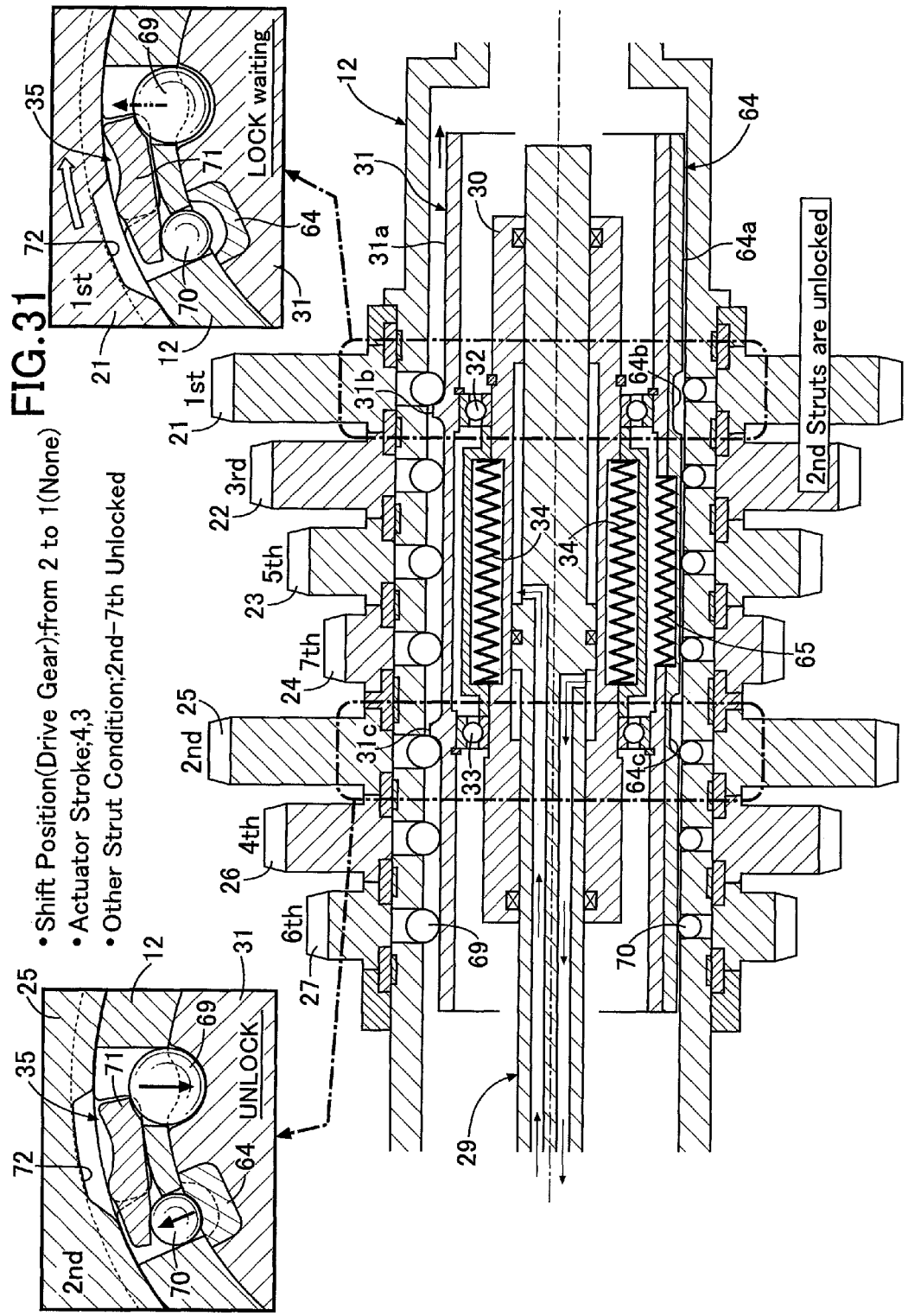

FIG. 31 corresponds to the actuator strokes "4" and "3" in Table 1. The slide cam 31 moves rightwards along with the rightward movement of the piston 30. Accordingly, the second convex portion 31c of the cam groove 31a of the slide cam 31 moves rightwards from the position below the head ball 69 of the second-speed shift stage. The head ball 69 falls down into the inside of the cam groove 31a, and, at the same time, the cam groove 64a of the slider 64 pushes up the tail ball 70. Accordingly, the strut 71 moves swinging clockwise to make the first engagement face 71b withdraws from the drive face 72a of the cutaway 72 of the second-speed driven gear 22, so that the second-speed gear set is engaged. In the meanwhile, the tail ball 70 of the first-speed shift stage faces the cam groove 64a of the slider 64, and the head ball 69 is biased outwards in the radial direction by the centrifugal force. The cutaway 72 of the first-speed shift stage, however, has not reached the position of the strut 71 yet. Accordingly, the engaging of the first-speed gear set has not been completed yet.

Figure 32:
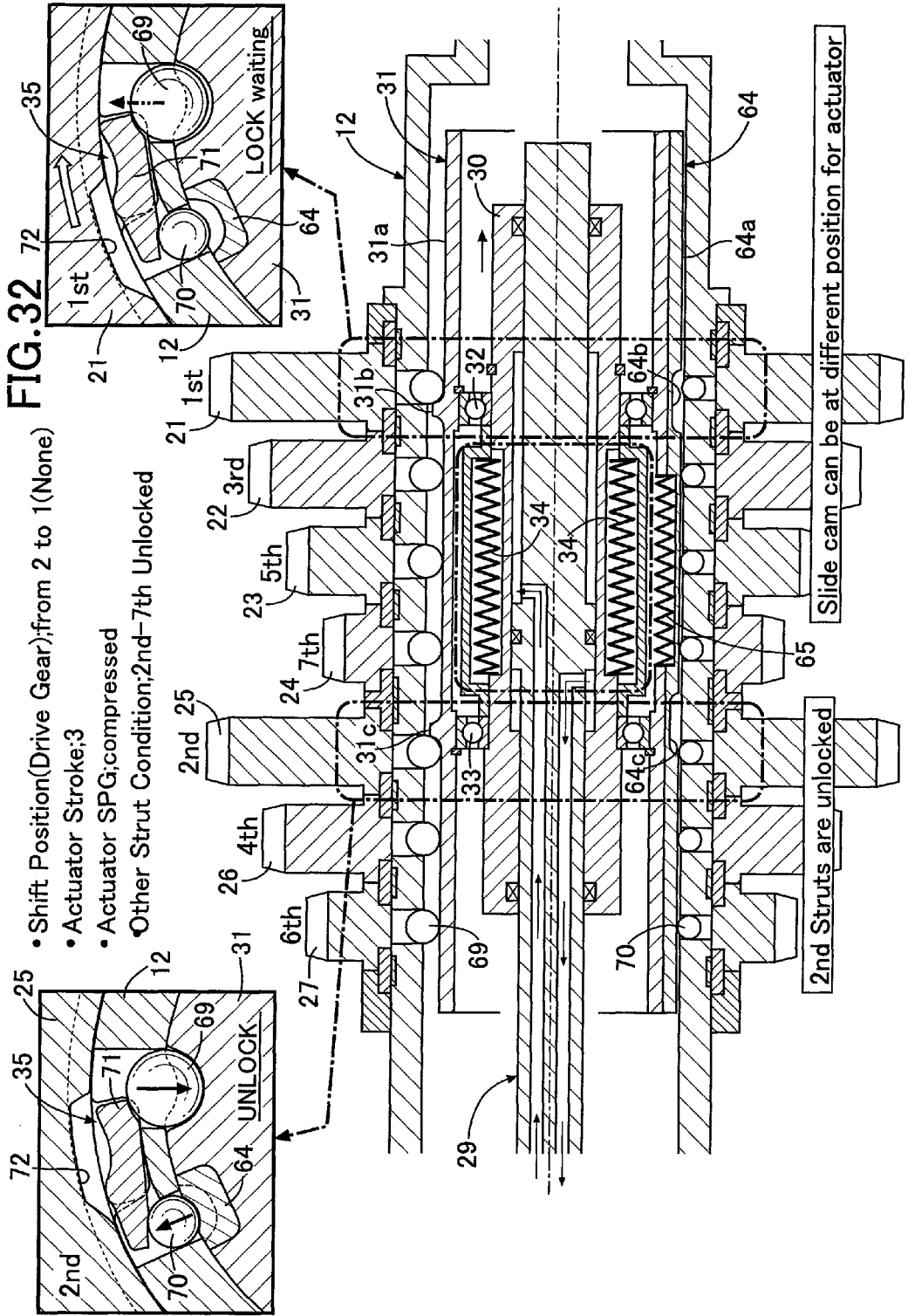

FIG. 32 corresponds to the actuator stroke "3" in Table 1. Even when the piston 30 moves further rightwards, the cutaway 72 of the first-speed driven gear 21 does not reach the position of the strut 71. Accordingly, the strut 71 blocks the head ball 69, and thereby the head ball 69 cannot move outwards in the radial direction. The head ball 69 gets stuck on the first convex portion 31b of the slide cam 31, so that the slide cam 31 cannot move rightwards. As a consequence, the cylinder 30 moves rightwards as compressing the actuator spring 34. In this event, the cylinder 30 leaves the slide cam 31 behind at the position shown in FIG. 31. In this state of the actuator stroke "3," the transmission of the driving force is temporarily discontinued.

Figure 33:
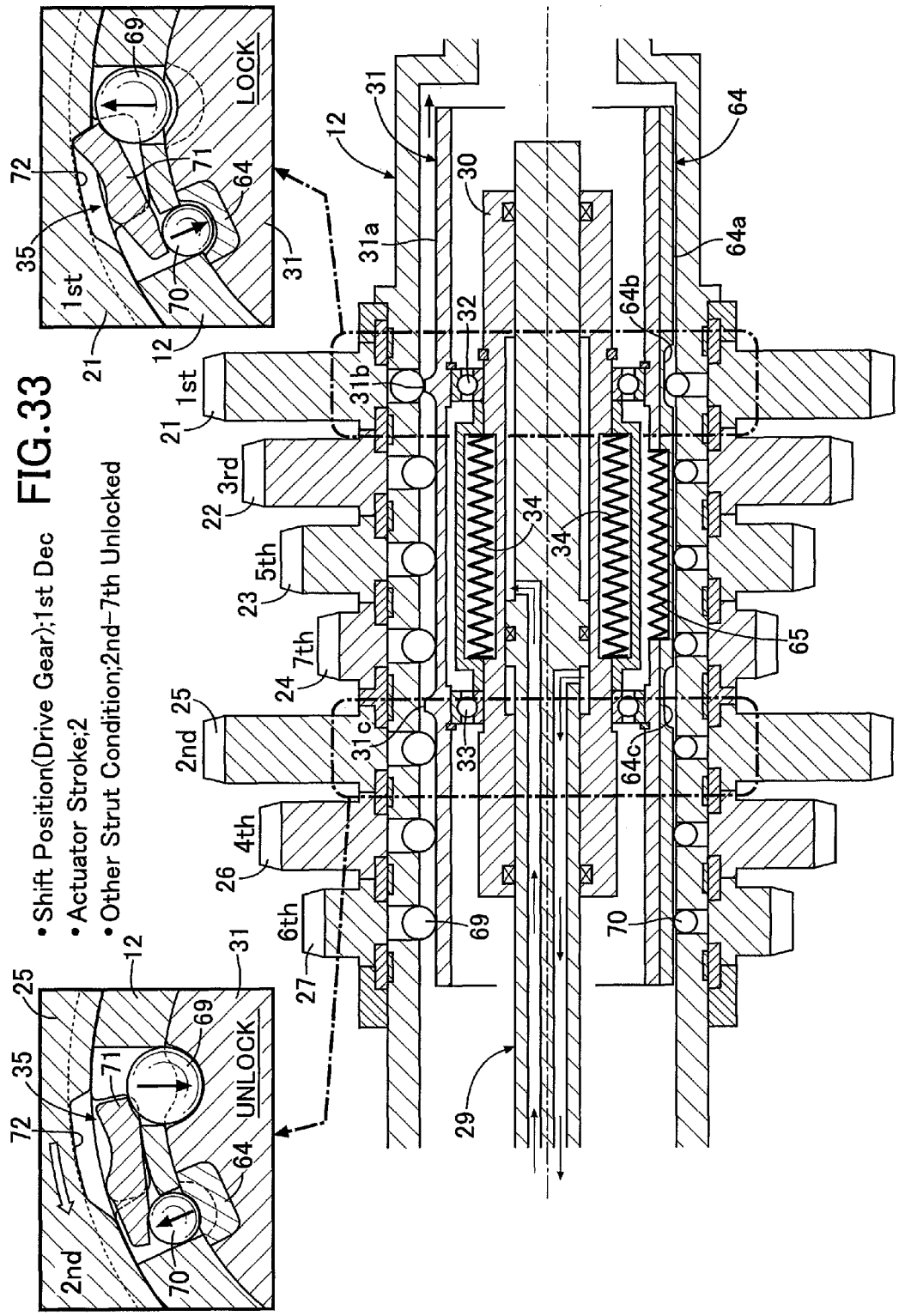

FIG. 33 corresponds to the actuator stroke "2" in Table 1. Once the cutaway 72 of the first-speed driven gear 21 reaches the position of the strut 71, the first engagement face 71b of the strut 71 is fitted to the cutaway 72, and the strut 71 moves swinging counterclockwise. Accordingly, the head ball 69 becomes capable of moving outwards in the radial direction. As a consequence, the spring force of the compressed actuator spring 34 moves the slide cam 31 rightwards so that the slide cam 31 can follow the cylinder 30. The first convex portion 31b of the cam groove 31a of the slide cam 31 pushes up the head ball 69, so that the engaging of the first-speed gear set is completed. The way in which the driving force is transmitted at this time is the same as the way at the time of deceleration described with reference to FIG. 15B.

As has been described above, even when the cylinder 30 moves rightwards, the slide cam 31 keeps its position as compressing the actuator springs 34. Once the rotation of the first-speed driven gear 21 makes the cutaway 72 be in a state where the strut 71 is capable of engaging with the cutaway 72, the spring force of the actuator springs 34 moves the slide cam 31 rightwards to make the first convex portion 31b push up the head ball 69. The head ball 69 thus pushed up makes the strut 71 move swinging into the inside of the cutaway 72. Accordingly, the strut 71 can be swung automatically at an appropriate timing irrespective of the moving speed of the cylinder 30.

Figure 34:
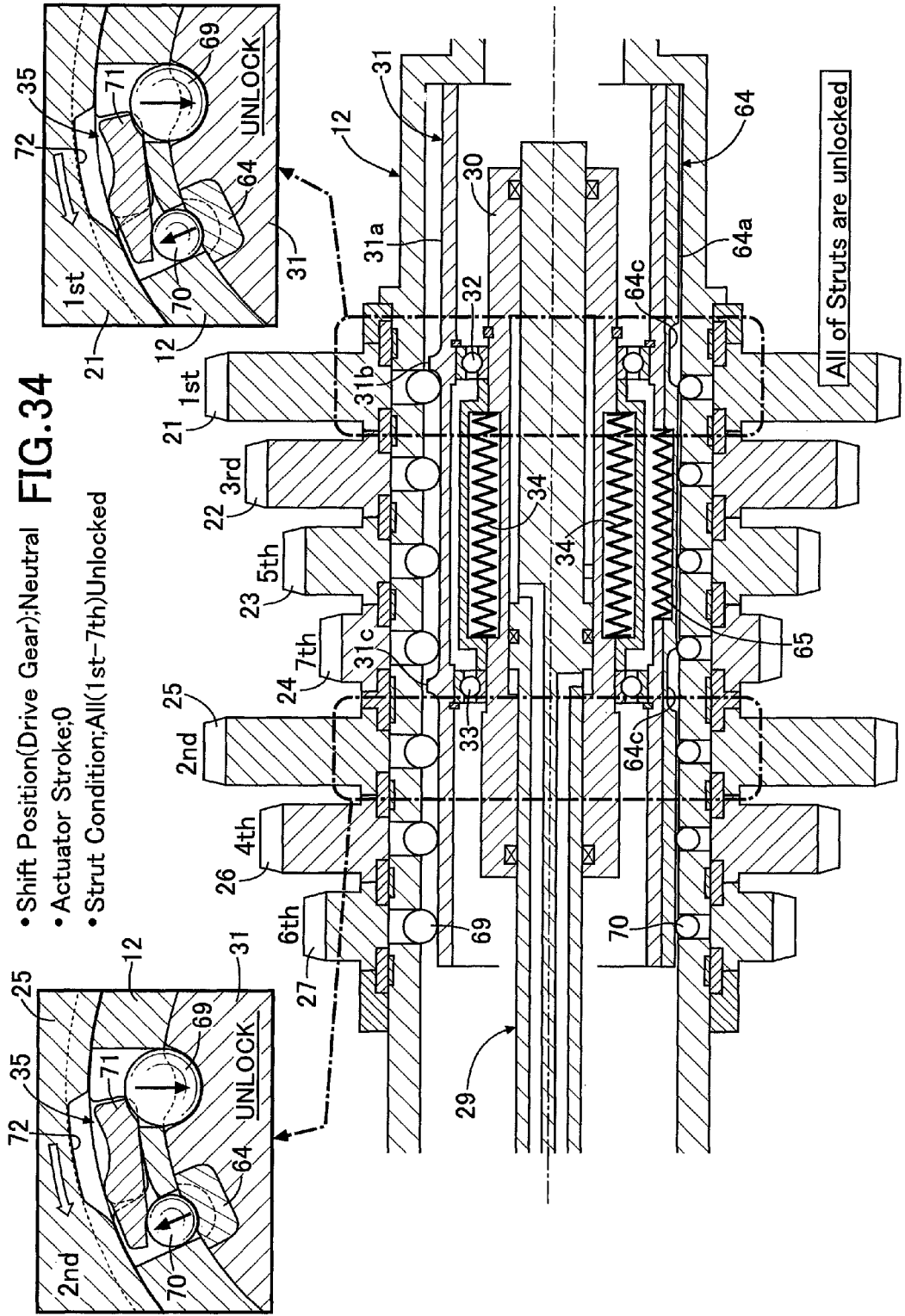
Figure 35:
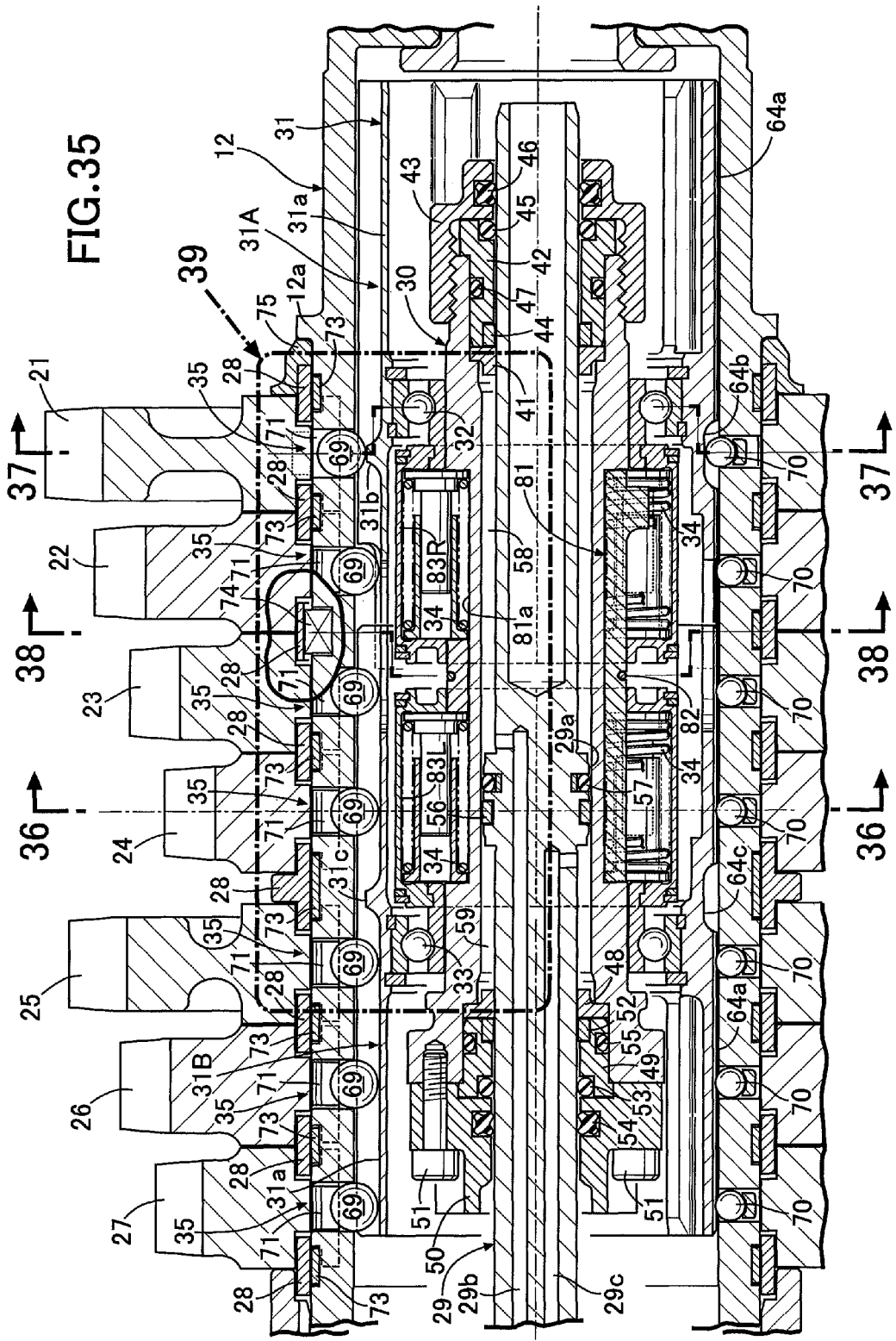
FIGS. 35 to 41 show a second embodiment of the present invention.
Figure 36:
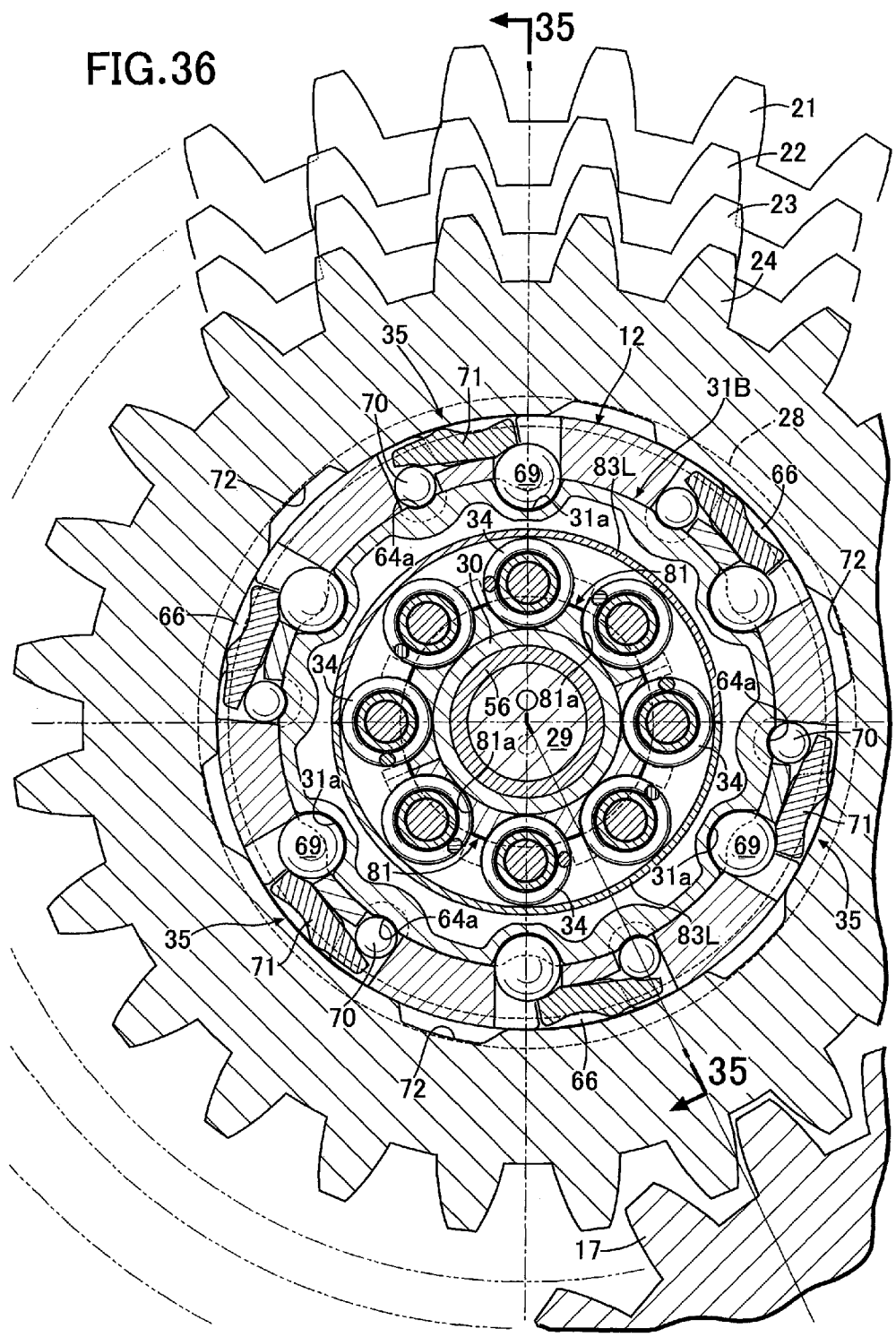
Figure 37:
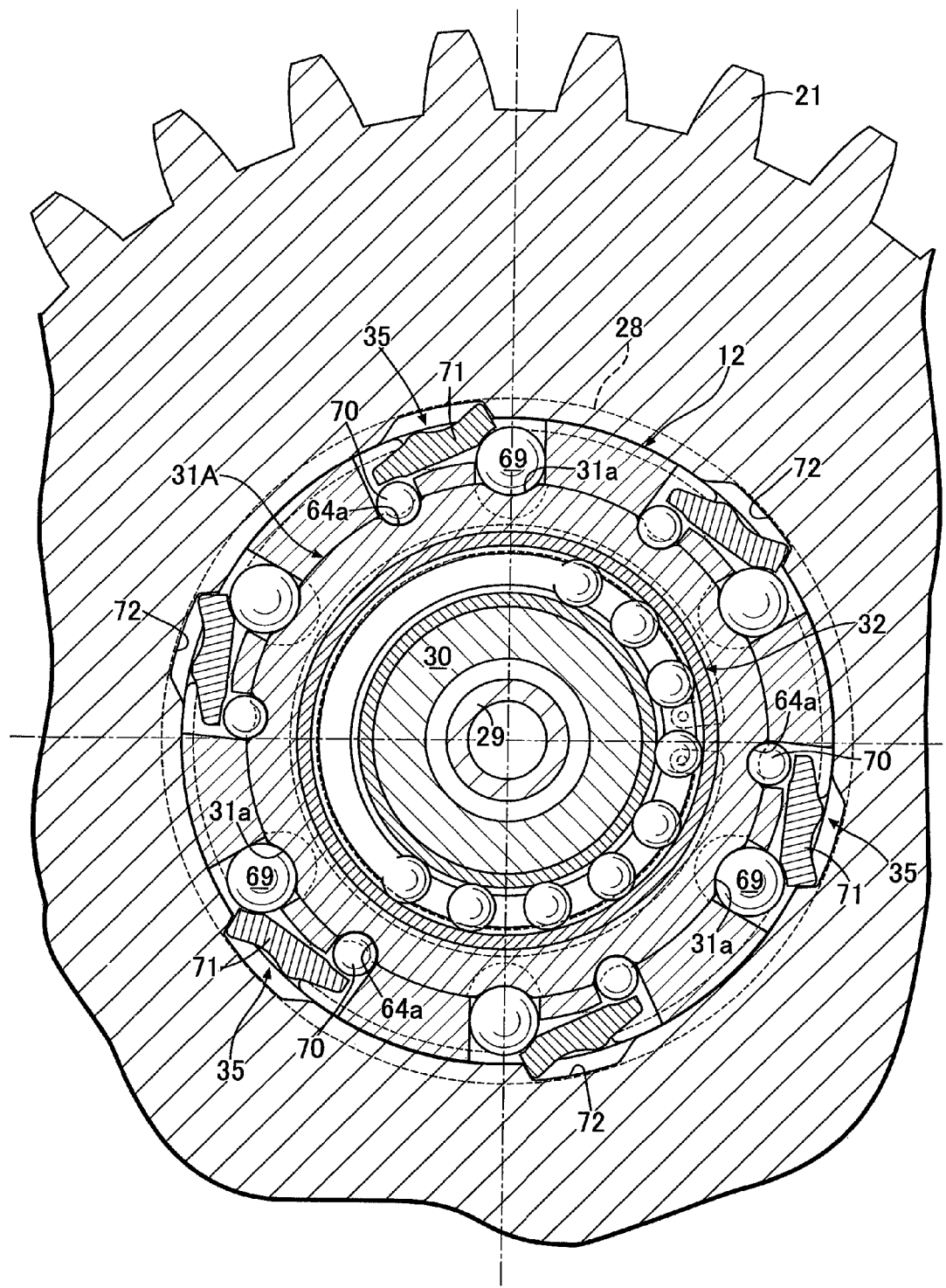
Figure 38:
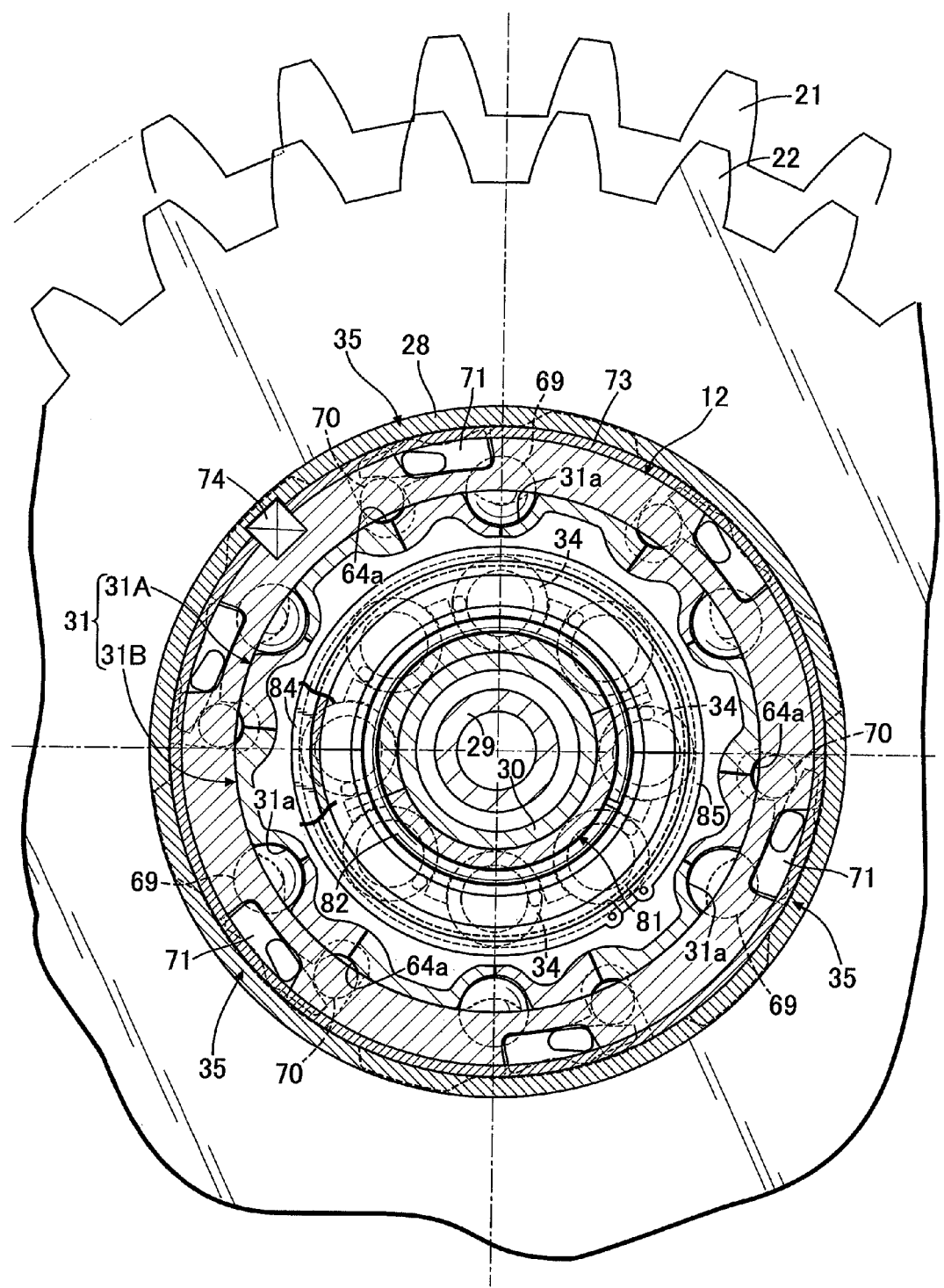
Figure 39:
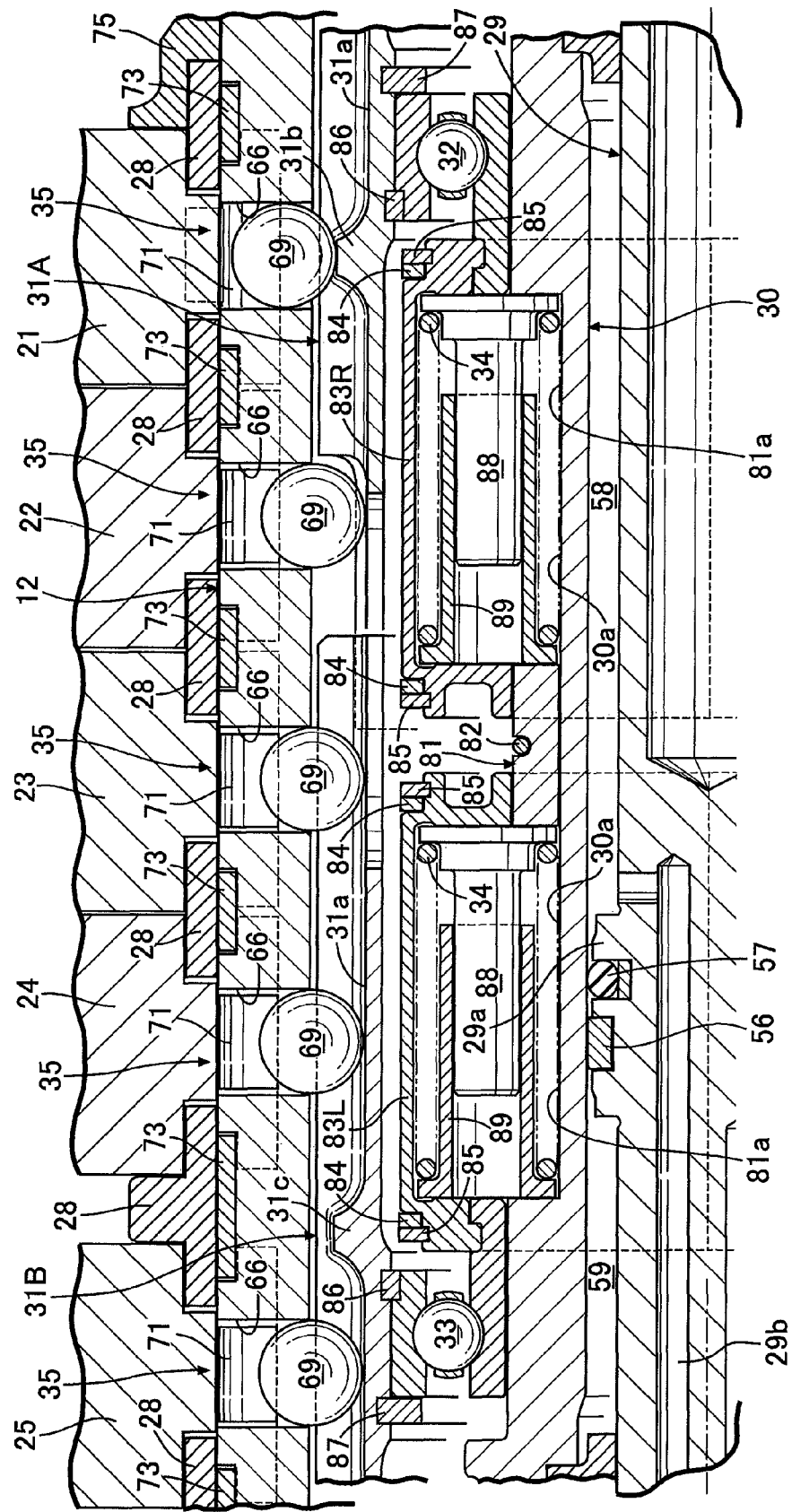
Figure 40:
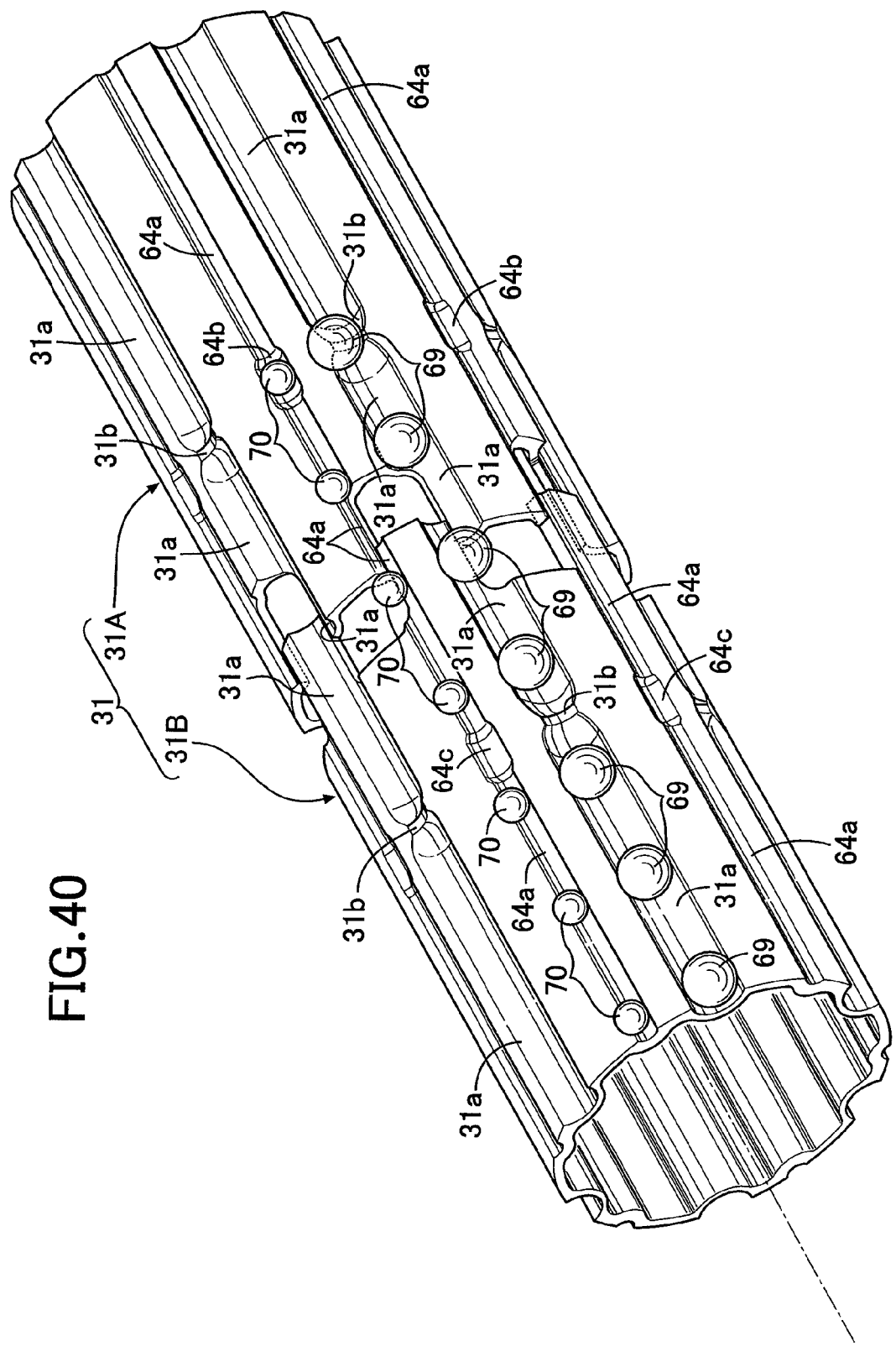
Figure 41:
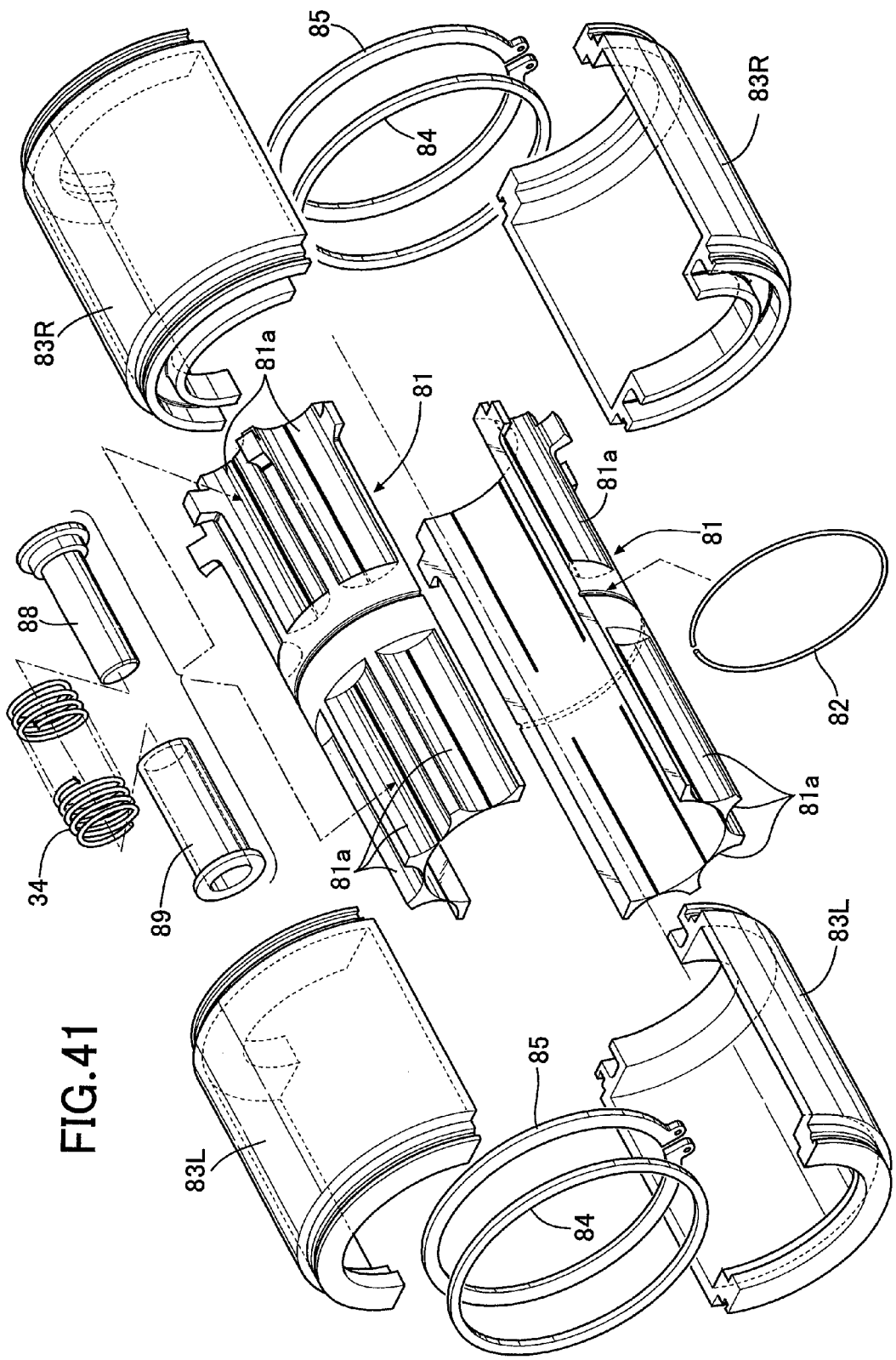
Figure 42:
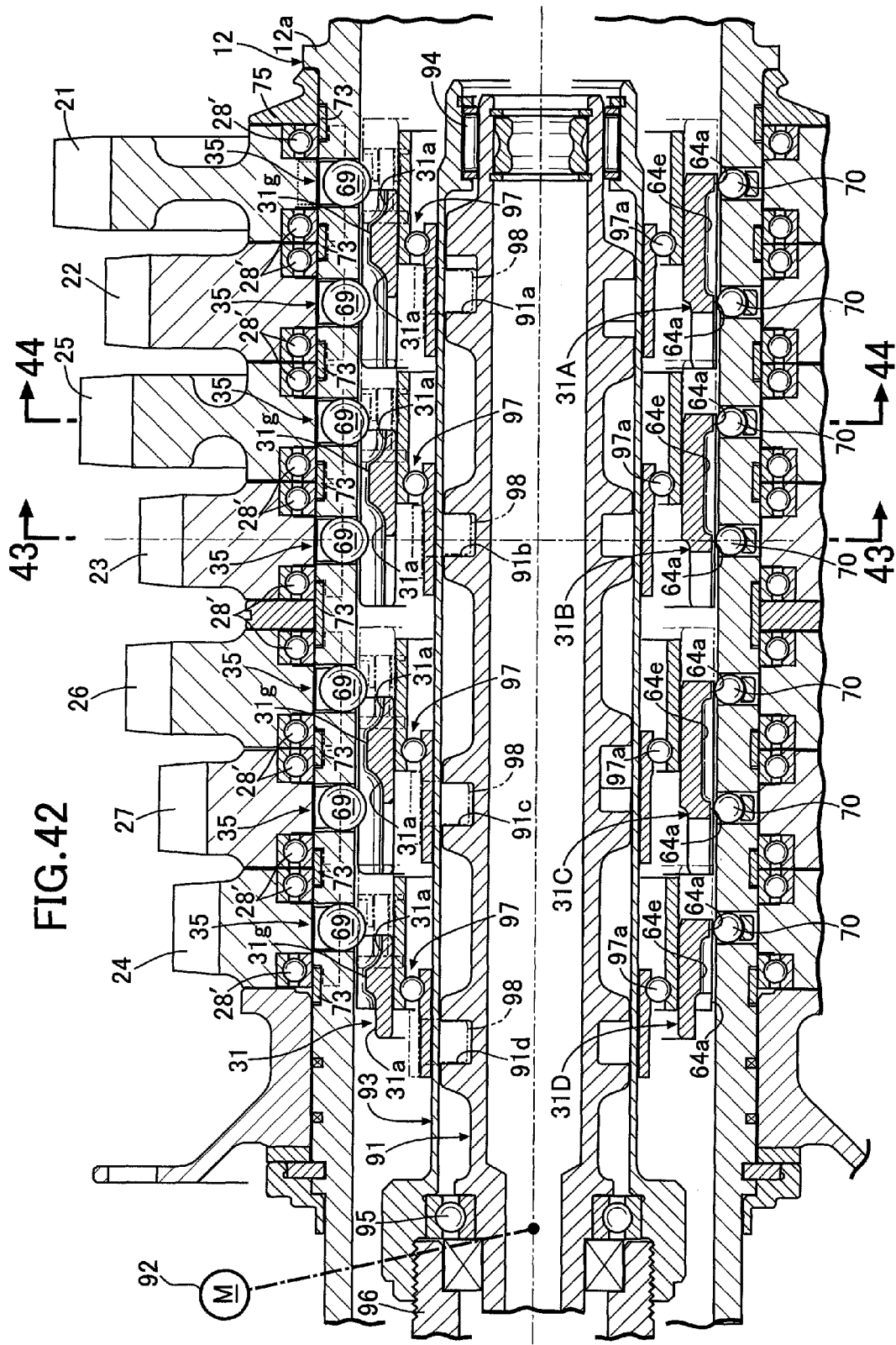
Figure 43:
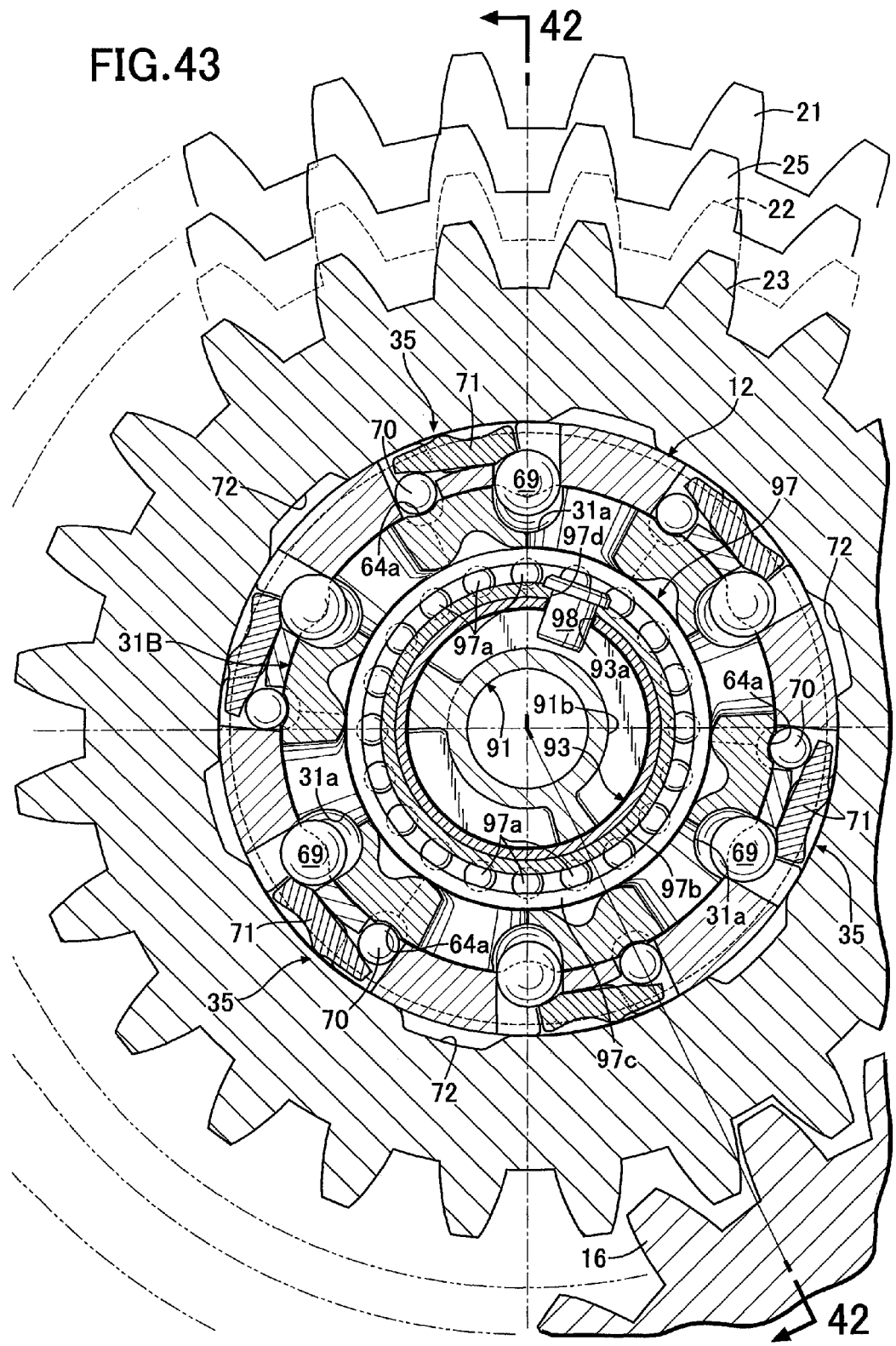
Figure 44:
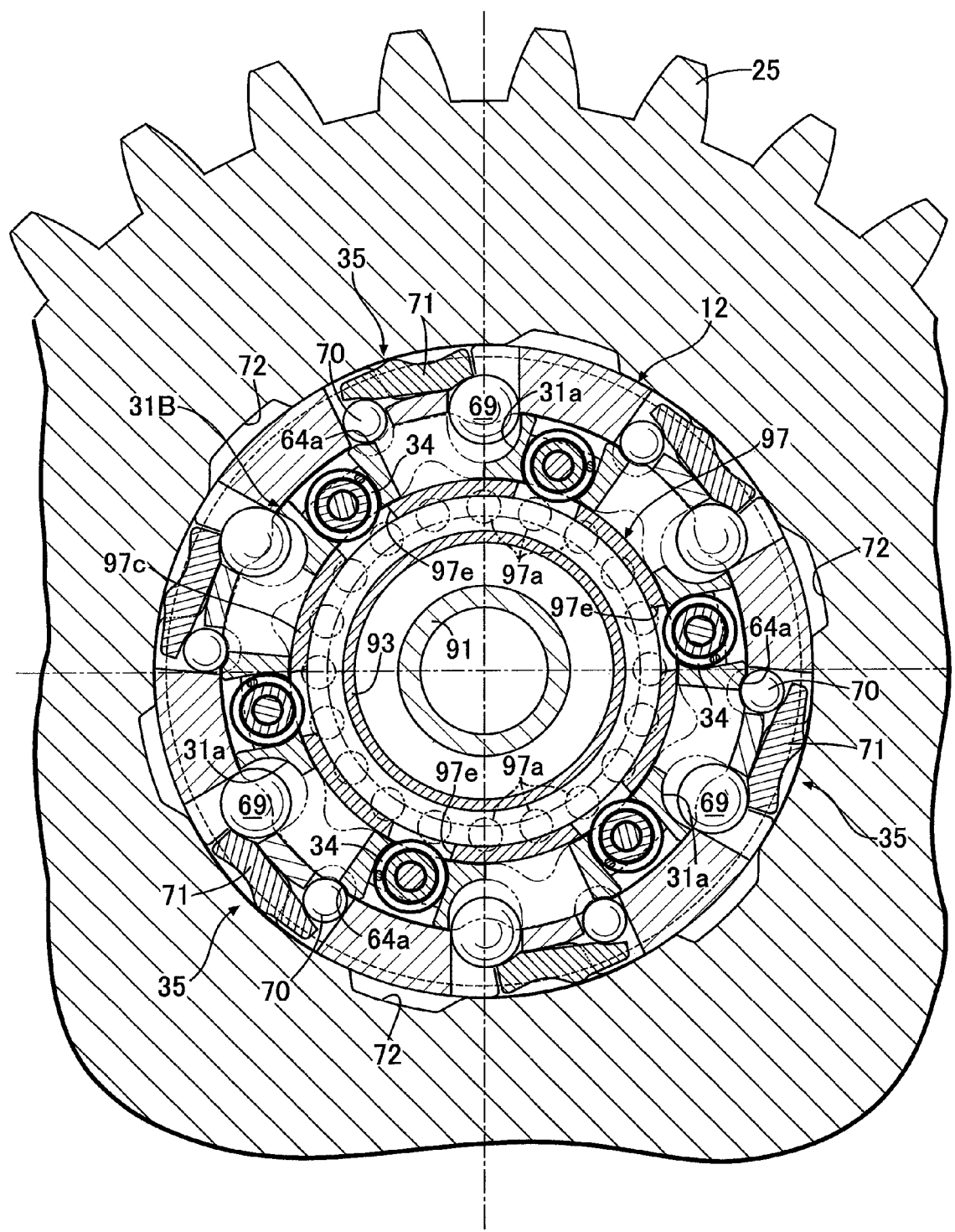
Figure 45:
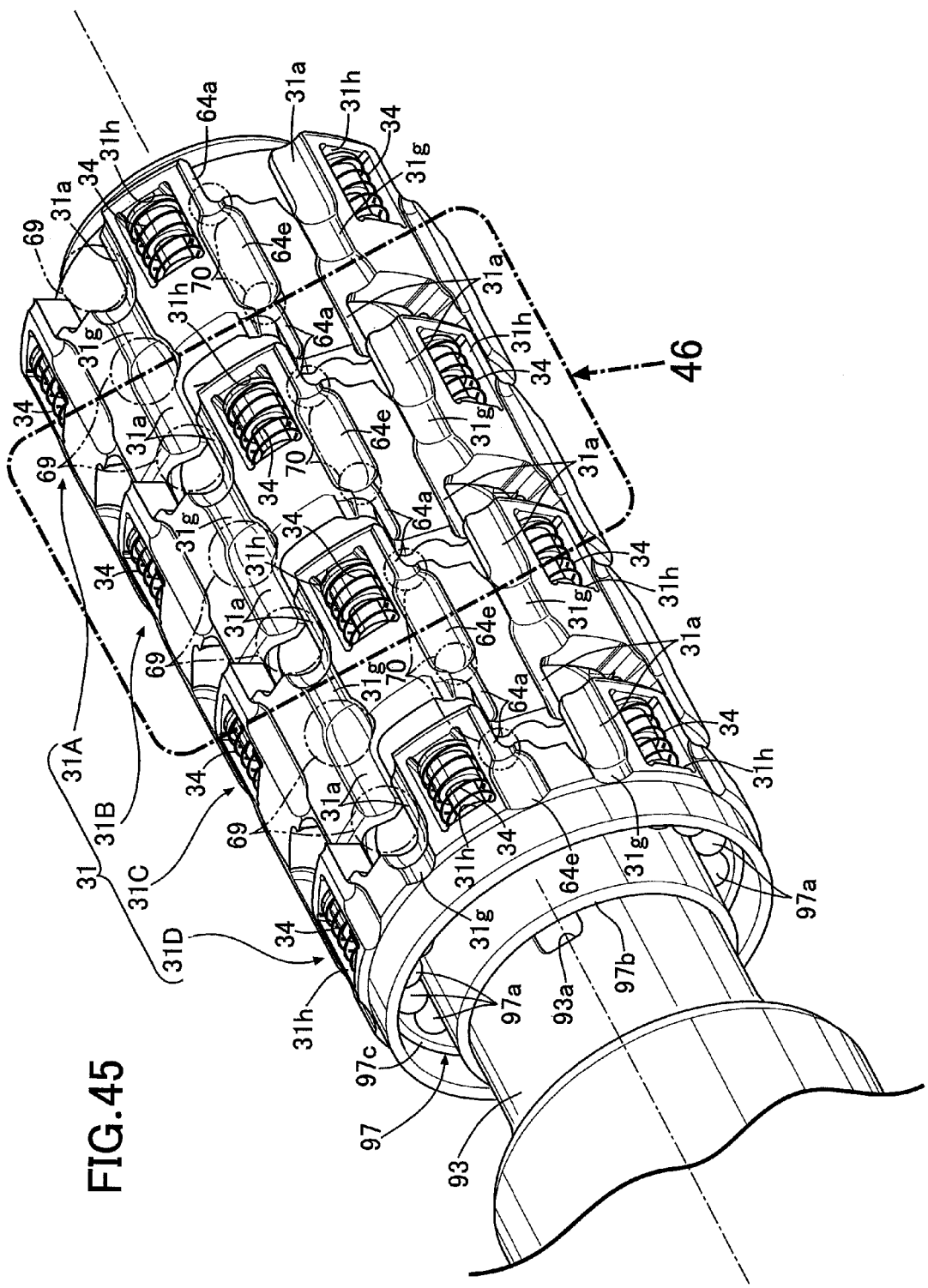
Figure 46:
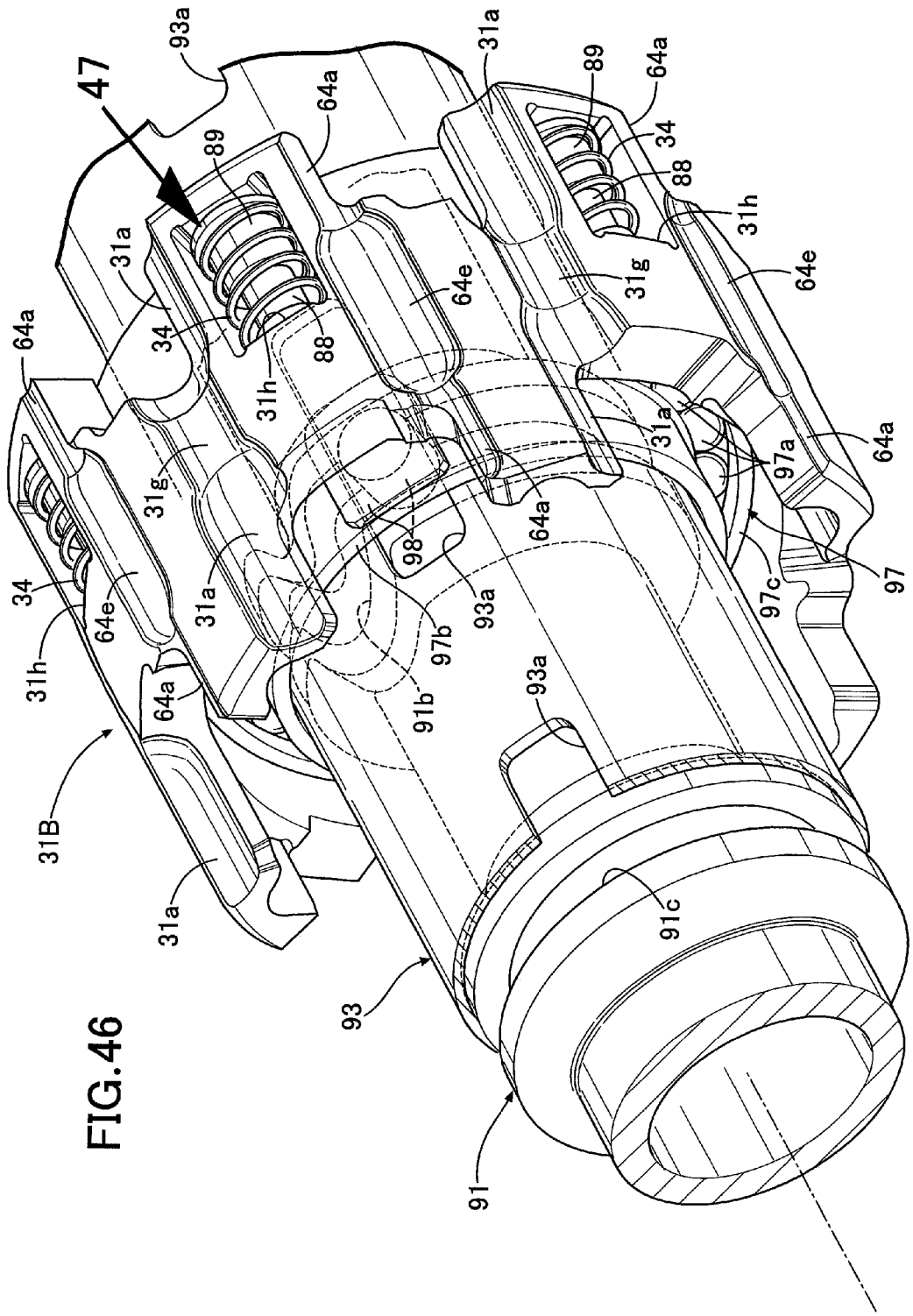
Figure 47:
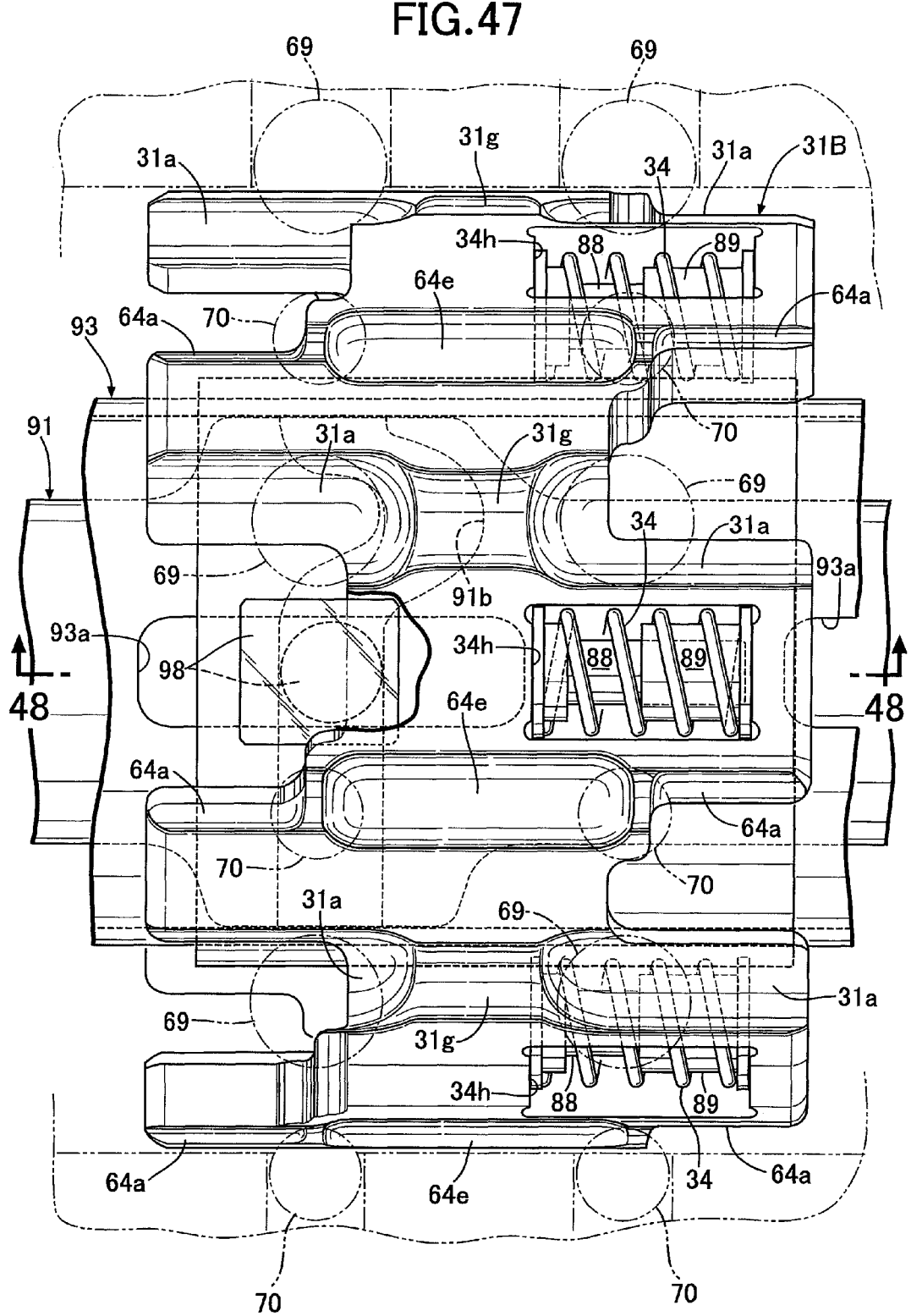
Figure 48:
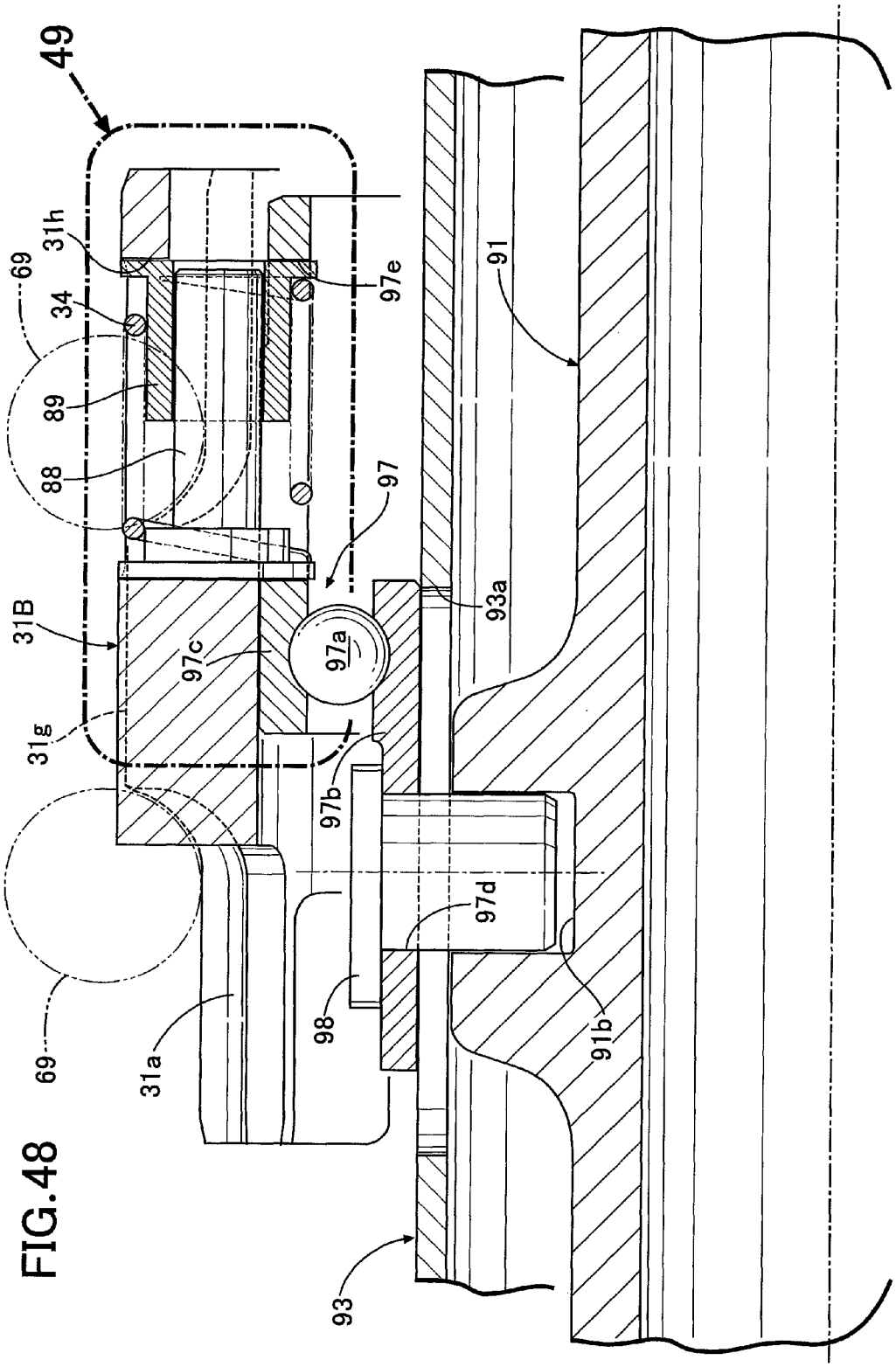
Figure 49:
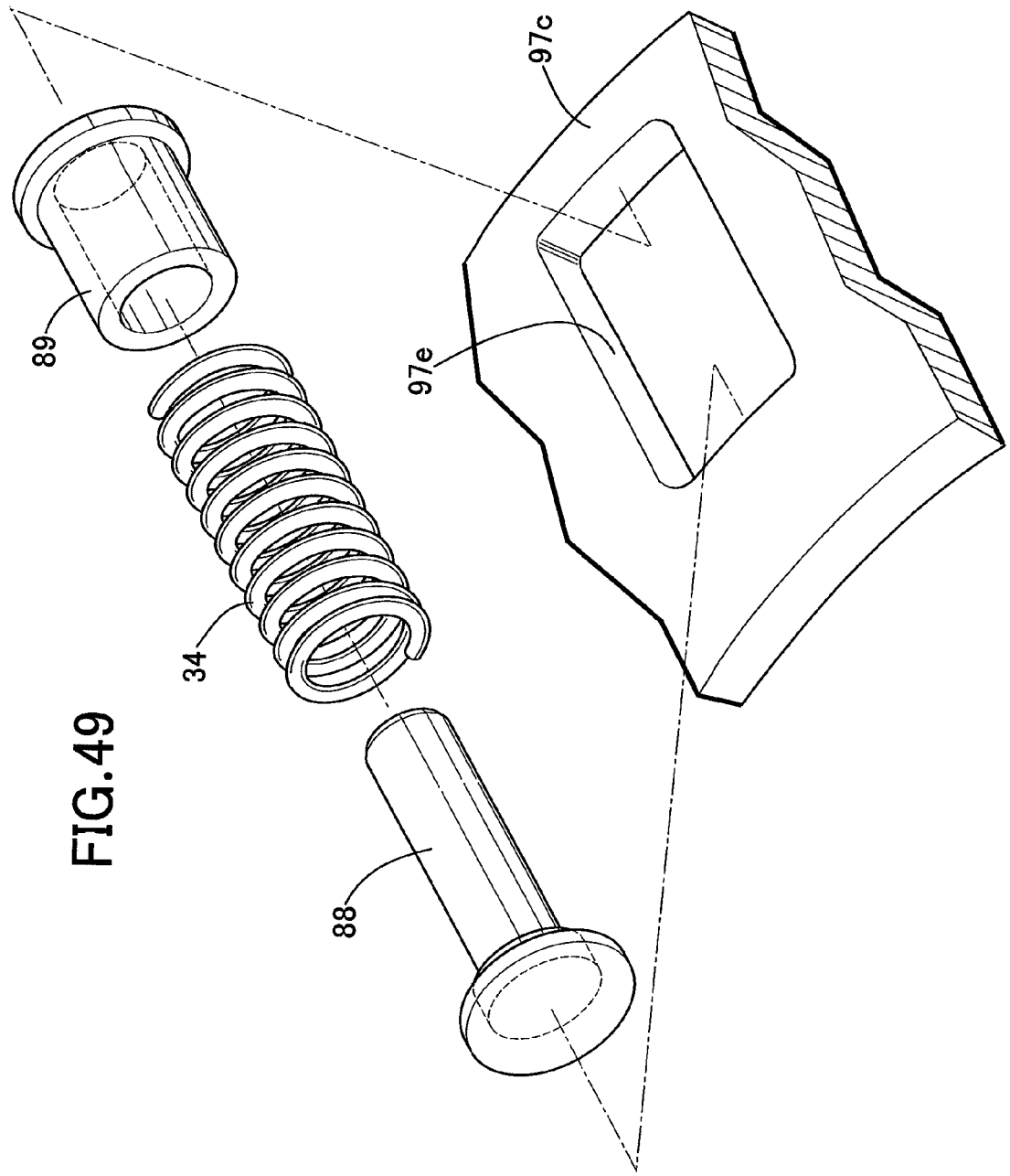
Figure 50:
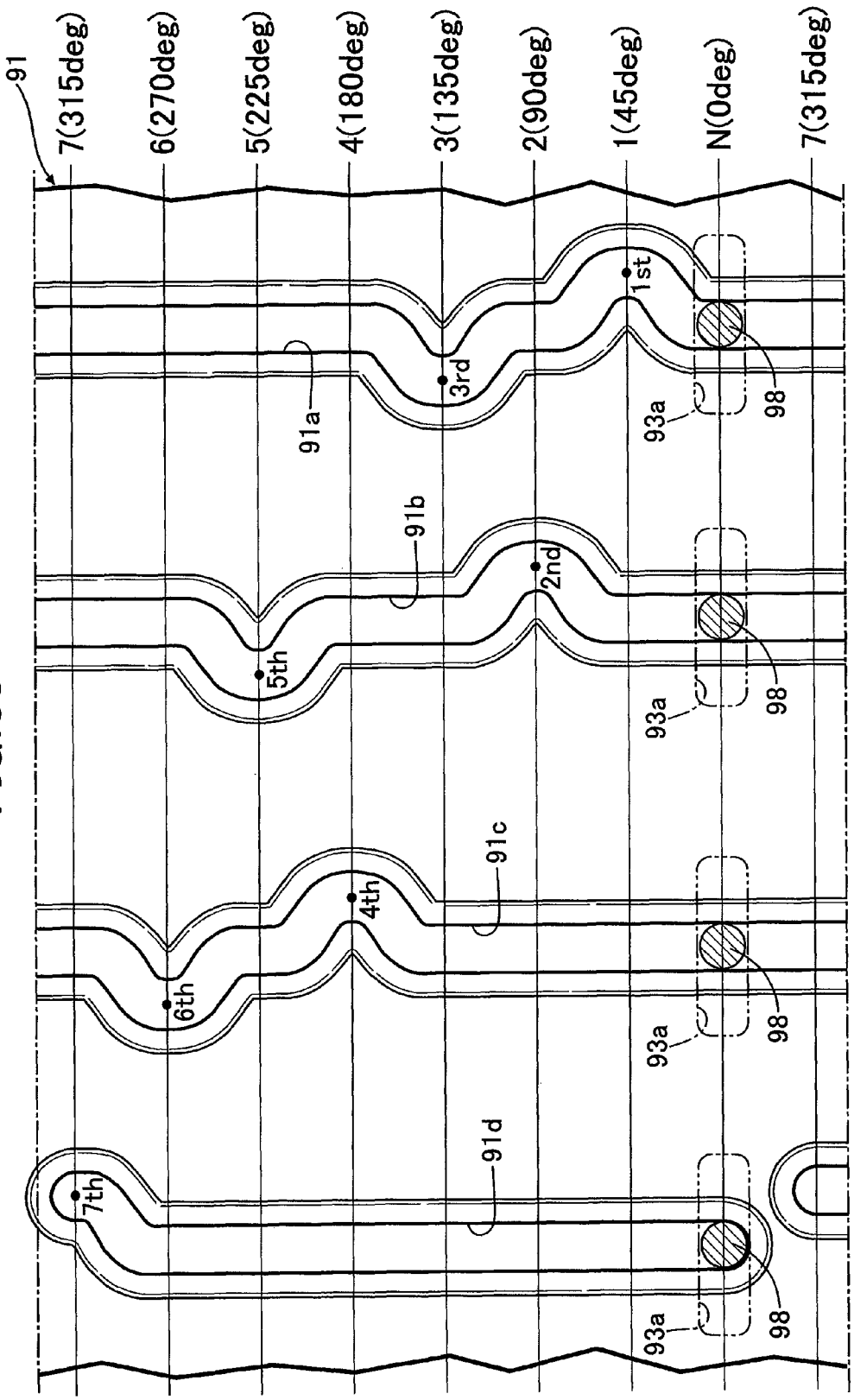

FIG. 34 corresponds to the actuator stroke "0" of Table 1. The cylinder 30 moves further rightwards. The first convex portion 31b of the slide cam 31 departs from the head ball 69 of the first-speed shift stage, and the cam groove 64a of the slider 64 pushes up the tail ball 70 so as to make the strut 71 be in the disengaged state, and the first-speed gear set is disengaged. In the meanwhile, the second-speed to the seventh-speed gear sets are likewise in the disengaged state, so that the neutral shift stage is achieved.

As has been described above, while the first-speed driven gear 21 to the seventh-speed driven gear 27 are supported relatively rotatably on the output shaft 12. In addition, sets of the strut-installation groove 66, the head-ball installation hole 67, and the tail-ball installation hole 68 are formed in the output shaft 12 so as to correspond to each of the first-speed driven gear 21 to the seventh-speed driven gear 27. The head ball 69 installed in the head-ball installation hole 67 is brought into contact with one of the opposite end portions, in the circumferential direction, of the strut 71 installed in the strut-installation groove 66, and the tail ball 70 installed in the tail-ball installation hole 68 is brought into contact with the other one of the opposite end portions, in the circumferential direction, of the strut 71. The strut 71 is swung by the head ball 69 and the tail ball 70 that are pushed in the radial direction by the slide cam 31 that moves sliding in the axial direction. Thereby, the engagement relationship between each strut 71 and the corresponding cutaway 72 formed in each of the first-speed driven gear 21 to the seventh-speed driven gear 27 can be arbitrarily changed.

What is made possible by the above-described mechanism is the switching of: the engaged state, where the transmission of the driving force from the driven-gear side to the output-shaft 12 side is possible both at the time of acceleration and at the time of deceleration; the one-way state, where the transmission of the driving force from the driven-gear side to the output-shaft 12 side is possible at the time of acceleration, but is impossible at the time of deceleration; and the disengaged state, where the transmission of the driving force from the driven-gear side to the output-shaft 12 side is possible neither at the time of acceleration nor at the time of deceleration.

In addition, in the disengaged state, the strut 71 is forced to retreat down into the inside of the strut-installation groove 66 of the output shaft 12. Accordingly, no friction acts between the strut 71 and the corresponding one of the first-speed driven gear 21 to the seventh-speed driven gear 27. As a consequence, the reduction of the drive efficiency caused by the friction can be suppressed to the minimum level.

Incidentally, at the time of acceleration in the engaged state shown in FIG. 15A and at the time of acceleration in the engaged state shown in FIG. 16A, that is, at the time in which the driving force to be transmitted is large, the driving force is transmitted not by means of the head ball 69. Instead, the driving force is transmitted at that time by means of: the surface contact portion between the first engagement face 71b of the strut 71 and the drive face 72a of the recessed portion 72 of the corresponding one of the first-speed driven gear 21 to the seventh-speed driven gear 27; and the surface contact portion between the second engagement face 71c of the strut 71 and the non-drive portion 66a of the strut-installation groove 66 of the output shaft 12. While the point contact of the spherical surface causes local wearing or deformation of the strut 71, such local wearing or deformation can be prevented by the above-mentioned transmission through the surface contact portions. As a consequence, the durability of the strut 71 can be improved. In addition, the head ball 69 does not have to transmit a heavy load, so that the head ball 69 can be made smaller in size. The smaller head ball 69 can contribute to a smaller dimension in the axial direction of the transmission T.

Incidentally, at the time of deceleration in the engaged state shown in FIG. 15B, the driving force is transmitted to the head-ball installation hole 67 of the output shaft 12 via the head ball 69. In this case, the transmission is carried out through the point contact of the spherical surface. Nevertheless, since the driving force to be transmitted is generally small at the time of deceleration, the transmission through the point contact causes no practical problems.

In addition, suppose a case of up-shifting at the time of acceleration. In this case, the gear set on the lower-speed side is kept in the one-way state since the disengaging of the gear set on the lower-speed side and until the completion of the engaging of the gear set of the higher-speed side. As FIG. 16A shows, the driving force is transmitted at the time of acceleration in the one-way state. Accordingly, the driving force is kept on being transmitted without any discontinuance since the disengaging of the gear set on the lower-speed side and until the completion of the engaging of the gear set of the higher-speed side. As a consequence, the acceleration performance of the vehicle can be enhanced to the maximum level.

In addition, the driven gears of the odd-number-speed shift stage—i.e., the first-speed, the third-speed, the fifth-speed, the seventh-speed driven gears 21 to 24—are grouped together and arranged on the output shaft 12 in this order from the right-hand side to the left-hand side at predetermined intervals. On the other hand, the driven gears of the even-number-speed shift stage—i.e., the second-speed, the fourth-speed, the sixth-speed driven gears 25 to 27—are grouped together and arranged on the output shaft 12 in this order from the right-hand side to the left-hand side at predetermined intervals. The movement of the struts 71 of the first-speed, the third-speed, the fifth-speed, and the seventh-speed driven gears 21 to 24 is operated by means of the first convex portions 31b of the slide cam 31 and of the first recessed portions 64b of the sliders 64. The movement of the struts 71 of the second-speed, the fourth-speed, and the sixth-speed driven gears 25 to 27 is operated by means of the second convex portions 31c of the slide cam 31 and of the second recessed portions 64c of the sliders 64. Accordingly, a reduction can be achieved in the necessary stoke of the slide cam 31 from the position where the engaging of the first-speed gear-set is completed to the position where the engaging of the seventh-speed gear-set is completed, or in the necessary stroke of the slide cam 31 from the position where the engaging of the seventh-speed gear-set is completed to the position where the engaging of the first-speed gear-set is completed.

In summary, it is possible that the smaller the distance between each two adjacent ones of the first-speed driven gear 21 to the seventh-speed driven gear 27 disposed on the output shaft 12, the smaller the necessary stroke of the slide cam 31. Nevertheless, in practice, the distance cannot be made smaller without any limit because the dimension, in the axial direction, of the strut 71 and the like serves as the restriction for the distance.

According to this embodiment, however, when the first convex portions 31b and the first recessed portions 64b are located an intermediate between the first-speed driven gear 21 and the second-speed driven gear 25, the second convex portions 31c and the second recessed portions 64c contribute to the completion of the engaging of the second-speed gear-set. When the second convex portions 31c and the second recessed portions 64c are located an intermediate between the second-speed driven gear 25 and the fourth-speed driven gear 26, the first convex portions 31b and the first recessed portions 64b contribute to the completion of the engaging of the third-speed gear-set. When the first convex portions 31b and the first recessed portions 64b are located an intermediate between the third-speed driven gear 22 and the fifth-speed driven gear 23, the second convex portions 31c and the second recessed portions 64c contribute to the completion of the engaging of the fourth-speed gear-set. When the second convex portions 31c and the second recessed portions 64c are located an intermediate between the fourth-speed driven gear 26 and the sixth-speed driven gear 27, the first convex portions 31b and the first recessed portions 64b contribute to the completion of the engaging of the fifth-speed gear-set. When the first convex portions 31b and the first recessed portions 64b are located an intermediate between the fifth-speed driven gear 23 and the seventh-speed driven gear 24, the second convex portions 31c and the second recessed portions 64c contribute to the completion of the engaging of the sixth-speed gear-set. When the second convex portions 31c and the second recessed portions 64c pass to the left-hand side of the sixth-speed driven gear 27, the first convex portions 31b and the first recessed portions 64b contribute to the completion of the engaging of the seventh-speed gear-set. Accordingly, the necessary stroke of the slide cam 31 for the changing of the shift stage between the first-speed shift stage to the seventh-speed shift stage is about half of that in the case of using a single kind of convex portions and a single kind of recessed portions. Such a structure can contribute to a smaller dimension, in the axial direction, of the transmission T.

The gear-shifting operation, described thus far, of the transmission T needs no cutting-off of the transmission of the driving force by means of a speed-change clutch. The gear-shifting operation can be done while the driving force is kept on being transmitted. Accordingly, the acceleration performance at the time of acceleration can be assured to the maximum level.

Subsequently, a second embodiment of the present invention will be described with reference to FIGS. 35 to 41. Note that those members in the second embodiment that have their respective counterparts in the first embodiment will be given the same reference numerals as those used in the first embodiment. No description will be given for these members.

The slide cam 31 of the above-described first embodiment is formed of a single member. A slide cam 31 of the second embodiment shown in FIG. 40, however, is divided into two separate bodies—a first slide cam 31R on the right-hand side and a second slide cam 31L on the left-hand side—that are floatingly supported so as to move relative to each other in the axial direction. In addition, the slide cam 31 of the first embodiment provides a floating support to the six sliders 64 that are formed as separate members, and the sliders 64 are capable of moving relative to the slide cam 31 in the axial direction. The slide cam 31 of the second embodiment shown in FIG. 40, however, includes no sliders 64. Instead, cam grooves 64a, first recessed portions 64b, and second recessed portions 64c are formed directly in the surface of the slide cam 31.

The comb-shaped first slide cam 31R and the comb-shaped second slide cam 31L mesh with each other so as to move relative to each other in the axial direction. The line at which the two slide cams 31R and 31L mesh with each other is designed to be located at the center, in the width direction, of each cam groove 31a that guides the head ball 69 and at the center, in the width direction, of each cam groove 64a that guides the tail ball 70.

As described above, the first slide cam 31R and the second slide cam 31L are meshed with each other at the portions of cam grooves 31a and cam grooves 64a so as to be capable of sliding in the axial direction. Accordingly, the dimension, in the axial direction, of the slide cam 31 can be prevented from increasing. There is one thing that should be noted here. At the meshing portion, the width of each cam groove 31a that guides the head ball 69 and the width of each cam groove 64a that guides the tail ball 70 are reduced to half of their respective widths at the other parts thereof. Nevertheless, the head ball 69 and the tail ball 70 are restricted respectively by the head-ball installation hole 67 of the output shaft 12 and by the tail-ball installation hole 68 thereof, so that the head ball 69 and the tail ball 70 will not drop off respectively from the narrow part of the cam groove 31a and from the narrow part of the cam groove 64a.

Subsequently, the structure for floatingly supporting the first and the second slide cams 31R and 31L independently with respect to the cylinder 30 will be described with reference to FIGS. 35, 36, 39, and 41.

A spring-installation groove 30a that has a small diameter is formed in the cylinder 30 at the central position, in the axial direction thereof. A pair of spring retainers 81 and 81 formed by splitting a cylinder into two along a diameter line are fitted to each other to form a cylinder. The spring retainers 81 are fixed by means of a retainer set clip 82 that is fitted to the outer circumferential surface of the spring retainers 81 at the central position in the axial direction thereof. In the outer circumferential surface on each of the right-hand and the left-hand sides of the pair of spring retainers 81 and 81, eight arc-shaped grooves 81a each of which has a semi-circle-shaped cross section are formed at 45° intervals.

The inner races of two ball bearings 32 and 33 are slidably fitted to the cylinder 30 at the respective outer sides, in the axial direction, of the spring-installation groove 30a. A pair of spring-guide housings 83R and 83R that are formed by splitting a cylinder into two along a diameter line are fitted to a portion between the inner race of the ball bearing 32 on the right-hand side and the center of the spring retainers 81 and 81, so that the pair of spring-guide housings 83R and 83R thus fitted form a cylinder. In order to fix the spring-guide housings 83R and 83R, a ring 84 and a C-clip 85 are provided to each of the right-hand-side and the left-hand-side ends of the pair of spring-guide housings 83R and 83R. In addition, a pair of C-clips 86 and 87 are provided to fix the outer race of the ball bearing 32 to the first slide cam 31R. Likewise, a pair of spring-guide housings 83L and 83L that are formed by splitting a cylinder into two along a diameter line are fitted to a portion between the inner race of the ball bearing 33 on the left-hand side and the center of the spring retainers 81 and 81, so that the pair of spring-guide housings 83L and 83L thus fitted form a cylinder. In order to fix the spring-guide housings 83L and 83L, a ring 84 and a C-clip 85 are provided to each of the right-hand-side and the left-hand-side ends of the pair of spring-guide housings 83L and 83L. In addition, a pair of C-clips 86 and 87 are provided to fix the outer race of the ball bearing 33 to the second slide cam 31L.

As a consequence, the cylinder 30 and the spring retainers 81 and 81 are integrated together to form a unit. In addition, the spring-guide housings 83R and 83R on the right-hand side, the ball bearing 32 on the right-hand side, and the first slide cam 31R on the right-hand side are integrated together to form a unit. Moreover, the spring-guide housings 83L and 83L on the left-hand side, the ball bearing 33 on the left-hand side and the second slide cam 31L on the left-hand side are integrated together to form a unit.

A pair of spring guides 88 and 89 are fitted together so as to be free to stretch and contract. In addition, a contracted actuator spring 34 is provided on the spring guides 88 and 89 to form an assembled part. A certain number of the assembled parts are installed between the set of spring retainers 81 and 81 and the set of spring-guide housings 83R and 83R on the right-hand side. Likewise, a certain number of the assembled parts are installed between the set of spring retainers 81 and 81 and the set of spring-guide housings 83L and 83L on the left-hand side.

Accordingly, when the cylinder 30 moves leftwards, the load is transmitted from the spring retainers 81 and 81, sequentially by way of the actuator springs 34 on the right-hand side, the spring-guide housings 83R and 83R on the right hand side, the ball bearing 32 on the right-hand side, and the C-clips 86 and 87, to the first slide cam 31R on the right-hand side. Concurrently, the load is transmitted from the spring retainers 81 and 81, sequentially by way of the actuator springs 34 on the left-hand side, the ball bearing 33 on the left-hand side, and the C-clips 86 and 87, to the second slide cam 31L on the left-hand side.

In addition, when the cylinder 30 moves rightwards, the load is transmitted from the spring retainers 81 and 81, sequentially by way of the actuator springs 34 on the left-hand side, the spring-guide housings 83L and 83L on the left-hand side, the ball bearing 33 on the left-hand side, and the C-clips 86 and 87, to the second slide cam 31L on the left-hand side. Concurrently, the load is transmitted from the spring retainers 81 and 81, sequentially by way of the actuator springs 34 on the right-hand side, the ball bearing 32 on the right-hand side, and the C-clips 86 and 87, to the first slide cam 31R on the right-hand side.

When the cylinder 30 moves to the right-hand side or to the left-hand side, if the movement of the first slide cam 31R on the right-hand side is restricted, then the cylinder 30 alone moves as compressing the actuator springs 34 on the right-hand side. Likewise, when the cylinder 30 moves to the right-hand side or to the left-hand side, if the movement of the second slide cam 31L on the left-hand side is restricted, then the cylinder 30 alone moves as compressing the actuator springs 34 on the left-hand side.

Now, suppose a state corresponding to FIG. 21 of the first embodiment. Specifically, suppose a state that in a process of up-shifting from the first-speed shift stage to the second-speed shift stage, the leftward movement of the second convex portion 31c of the second slide cam 31L on the left-hand side is blocked by the head ball 69 of the second-speed shift stage. The leftward movement of the second slide cam 31L on the left-hand side is temporarily stopped, and the cylinder 30 alone moves leftwards as compressing the actuator springs 34 on the left-hand side. Then, along with the rotation of the second-speed driven gear 25, the strut 71 moves swinging, and enters the cutaway 72, so that the head ball 69 becomes capable of moving outwards in the radial direction. By this moment, the restraint for the second slide cam 31L on the left-hand side has been released, and the spring force of the actuator springs 34 on the left-hand side move the second slide cam 31L on the left-hand side leftwards so as to follow the movement of the cylinder 30.

Now, suppose a state corresponding to FIG. 25 of the first embodiment. Specifically, suppose a state that in a process of up-shifting from the second-speed shift stage to the third-speed shift stage, the leftward movement of the first convex portion 31b of the first slide cam 31R on the right-hand side is blocked by the head ball 69 of the third-speed shift stage. The leftward movement of the first slide cam 31R on the right-hand side is temporarily stopped, and the cylinder 30 alone moves leftwards as compressing the actuator springs 34 on the right-hand side. Then, along with the rotation of the third-speed driven gear 22, the strut 71 moves swinging, and enters the cutaway 72, so that the head ball 69 becomes capable of moving outwards in the radial direction. By this moment, the restraint for the first slide cam 31R on the right-hand side has been released, and the spring force of the actuator springs 34 on the right-hand side move the first slide cam 31R on the right-hand side leftwards so as to follow the movement of the cylinder 30.

Now, suppose a state corresponding to FIG. 29 of the first embodiment. Specifically, suppose a state that in a process of down-shifting from the third-speed shift stage to the second-speed shift stage, the rightward movement of the second convex portion 31c of the second slide cam 31L on the left-hand side is blocked by the head ball 69 of the second-speed shift stage. The rightward movement of the second slide cam 31L on the left-hand side is temporarily stopped, and the cylinder 30 alone moves rightwards as compressing the actuator springs 34 on the left-hand side. Then, along with the rotation of the second-speed driven gear 25, the strut 71 moves swinging, and enters the cutaway 72, so that the head ball 69 becomes capable of moving outwards in the radial direction. By this moment, the restraint for the second slide cam 31L on the left-hand side has been released, and the spring force of the actuator springs 34 on the left-hand side move the second slide cam 31L on the left-hand side rightwards so as to follow the movement of the cylinder 30.

Now, suppose a state corresponding to FIG. 32 of the first embodiment. Specifically, suppose a state that in a process of down-shifting from the second-speed shift stage to the first-speed shift stage, the rightward movement of the first convex portion 31b of the first slide cam 31R on the right-hand side is blocked by the head ball 69 of the first-speed shift stage. The rightward movement of the first slide cam 31R on the right-hand side is temporarily stopped, and the cylinder 30 alone moves rightwards as compressing the actuator springs 34 on the right-hand side. Then, along with the rotation of the first-speed driven gear 21, the strut 71 moves swinging, and enters the cutaway 72, so that the head ball 69 becomes capable of moving outwards in the radial direction. By this moment, the restraint for the first slide cam 31R on the right-hand side has been released, and the spring force of the actuator springs 34 on the right-hand side move the first slide cam 31R on the right-hand side rightwards so as to follow the movement of the cylinder 30.

As has been described thus far, the second embodiment can also achieve similar effects to those obtained according to the first embodiment. Specifically, until the cutaway 72 of the driven gear of the subsequent shift stage reaches the position where the cutaway 72 can engage with the strut 71, the first and the second slide cams 31R and 31L follow the cylinder 30 with a certain amount of time behind. Accordingly, the time lag between the disengaging of the gear-set for the prior shift stage and the engaging of the gear-set for the subsequent shift stage can be automatically absorbed, so that a smooth gear-shifting operation is made possible irrespective of the moving speed of the cylinder 30. In addition, the second embodiment needs neither sliders 64 nor slider springs 65, so that the number of parts can be reduced. The reduced number of parts can bring about a cost reduction.

In addition, the two split first and the second slide cams 31R and 31L of the second embodiment as well as the actuator springs 34 have the functions of the sliders 64 of the first embodiment and the slider springs 65 thereof. Specifically, suppose the state of FIG. 22 of the first embodiment. That is, suppose that, in the process of up-shifting from the first-speed shift stage to the second-speed shift stage, the driving force is being transmitted through the gear-set of the first-speed shift stage through the strut 71 and the cutaway 72 meshing with each other in the one-way state. In this state, the strut 71 cannot move swinging clockwise, so that the tail ball 70 that is restrained by the strut 71 cannot move outwards in the radial direction.

In this case, according to the second embodiment, even when the cylinder 30 tries to move leftwards, since the first recessed portion 64b of the first slide cam 31R on the right-hand side is blocked by the tail ball 70, the first slide cam 31R on the right-hand side cannot move leftwards. The first slide cam 31R is left behind the cylinder 30 while compressing the actuator springs 34 on the right-hand side. Then, once the engaging of the second-speed gear-set is completed and the strut 71 of the first speed shift stage is withdrawn into the strut-installation groove 66, the spring force of the compressed actuator springs 34 moves, leftwards, the first slide cam 31R on the right-hand side that has been released from the restraints of the tail ball 70 so as to follow the cylinder 30.

In addition, suppose the state of FIG. 26 of the first embodiment. That is, suppose that, in the process of up-shifting from the second-speed shift stage to the third-speed shift stage, the driving force is being transmitted through the gear-set of the second-speed shift stage through the strut 71 and the cutaway 72 meshing with each other in the one-way state. In this state, the strut 71 cannot move swinging clockwise, so that the tail ball 70 that is restrained by the strut 71 cannot move outwards in the radial direction.

In this case, according to the second embodiment, even when the cylinder 30 tries to move leftwards, since the second recessed portion 64c of the second slide cam 31L on the left-hand side is blocked by the tail ball 70, the second slide cam 31L on the left-hand side cannot move leftwards. The second slide cam 31L is left behind the cylinder 30 while compressing the actuator springs 34 on the left-hand side. Then, once the engaging of the third-speed gear-set is completed and the strut 71 of the second speed shift stage is withdrawn into the strut-installation groove 66, the spring force of the compressed actuator springs 34 move, leftwards, the second slide cam 31L on the left-hand side that has been released from the restraints of the tail ball 70 so as to follow the cylinder 30.

As has been described above, when the compressed actuator springs 34 move the first or the second slide cams 31R or 31L leftwards, the cylinder 30 does not move and keeps its position. Accordingly, the necessary stroke of cylinder 30 can be reduced by the amount equivalent to strokes of the first and the second slide cams 31R and 31L depend on the actuator springs 34. As a consequence, the dimension, in the axial direction, of the transmission can be shortened.

To put it differently, in the second embodiment, in a case where the subsequent shift stage is achieved by the first slide cam 31R, the second slide cam 31L functions as the sliders 64 of the first embodiment. In a case where the subsequent shift stage is achieved by the second slide cam 31L, the first slide cam 31R functions as the sliders 64 of the first embodiment.

The other operations and the other effects of the second embodiment are similar to those of the first embodiment.

Subsequently, a third embodiment of the present invention will be described with reference to FIGS. 42 to 61. Note that those members in the third embodiment that have their respective counterparts in the first or the second embodiment will be given the same reference numerals as those used in the first or the second embodiment. No overlapped description will be given for these members.

To begin with, a structure of a transmission T will be described with reference to FIGS. 42 to 50.

The gear-shifting operation of the first embodiment is carried out by use of the single-piece slide cam 31 that is moved by the hydraulically-driven movement, in the axial direction, of the cylinder 30. The gear-shifting operation of the second embodiment, on the other hand, is carried out by use of the two split slide cams 31L and 31R that are moved by the hydraulically-driven movement, in the axial direction, of the cylinder 30. In the third embodiment, however, the gear-shifting operation is carried out by use of four split slide cams 31A to 31D that are individually moved in the axial direction by the rotation of a rotary barrel 91. The rotary barrel 91 is rotated by an actuator, such as an electric motor. What should be noted here is that the slide cam 31 of the third embodiment is divided into four members—the slide cams 31A to 31D.

In addition, in the first and the second embodiments, the first-speed, the third-speed, the fifth-speed, and the seventh-speed driven gears 21 to 24 are grouped and disposed together while the second-speed, the fourth-speed, the sixth-speed driven gears 25 to 27 are grouped and disposed together. In the third embodiment, on the other hand, two driven gears that are not of two successive shift stages are disposed together as a set. Specifically, a set of the first-speed and the third-speed driven gears 21 and 22, a set of the second-speed and the fifth-speed driven gears 25 and 23, a set of the four-speed and the sixth-speed driven gears 26 and 27, and the independent seventh-speed driven gear 24 are disposed in this sequence from the right-hand side to the left-hand side. Such an arrangement of these gears of the third embodiment is not limited, and any arrangement is arbitrarily possible as long as the two driven gears in any set are not of two successive shift stages.

The rotary barrel 91 is disposed in the center of the hollow output shaft 12. An actuator 92, such as an electric motor, is disposed outside of the output shaft 12 makes the rotary barrel 91 capable of reciprocating so as to rotate within a range from 0° to 315°. Four guide grooves 91a to 91d (see FIG. 50) are formed in the outer circumferential surface of the rotary barrel 91 so as to be separated from one another in axial direction. The direction in which the guide grooves 91a to 91d are formed is the circumferential direction. A cylindrical bearing holder 93 is disposed coaxiary at the outer circumference of the rotary barrel 91. The right-hand-side end of the rotary barrel 91 is relatively rotatably supported by a needle bearing 94 disposed on the inner circumferential surface of the right-hand-side end portion of the bearing holder 93. The left-hand-side end of the rotary barrel 91 is relatively rotatably supported by a ball bearing 95 disposed on the inner circumferential surface of the left-hand-side end portion of the bearing holder 93. A support tube 96 is coupled to the left-hand side end portion of the bearing holder 93, and is fixed to a casing (not illustrated) of the transmission T. The bearing holder is thus fixed to the casing while not allowed to rotate or to move in the axial direction.

Those four slide cams 31A to 31D have substantially identical structures. So, in order to describe the structures of the slide cams 31A to 31D, the slide cam 31B located at the second position from the right-hand side is taken as an example. The structure of the slide cam 31B is similar to the structure of each of the slide cams 31L and 31R of the second embodiment. The comb-shaped slide cam 31B meshes with adjacent slide cams, and thereby the slide cam 31B is capable of moving relative to the adjacent slide cams in the axial direction. Six cam grooves 31a for the head balls 69 and six cam grooves 64a for the tail balls 70 are formed in the outer surface of the slide cam 31B. The cam grooves 31a alternate the cam grooves 64a in the circumferential direction. A single convex portion 31g is formed so as to protrude from each of the cam grooves 31a for the head balls 69 while a single recessed portion 64e is formed so as to be recessed in each of the cam grooves 64a for the tail balls 70.

The portion at which the comb-shaped slide cam 31B mesh with each of the two adjacent slide cams 31A and 31C each other is designed to be located at the center, in the width direction, of each of the six cam grooves 31a for the head balls 69 and at the center, in the width direction, of each of the six cam grooves 64a for the tail balls 70. Six rectangular openings 31h (see FIG. 45) are formed in the slide cam 31B. Each of the openings 31h is located between each of the cam grooves 31a for the head balls 69 and the adjacent one of the cam grooves 64a for the tail balls 70 of the slide cam 31B.

The slide cam 31B is relatively rotatably supported by a ball bearing 97 disposed on the outer circumferential surface of the bearing holder 93. The ball bearing 97 includes balls 97a, as well as an inner race 97b and an outer race 97c that sandwich the balls 97a. The inner race 97b extends long leftwards from the balls 97a while the outer race 97c extends long rightwards from the balls 97a. The inner race 97b is capable of sliding in the axial direction on the outer circumferential surface of the bearing holder 93 while the outer race 97c is capable of sliding in the axial direction on the inner circumferential surface of the slide cam 31B.

A pin hole 97d is formed in the inner race 97b. A pin 98 is fit with pressure into the pin hole 97d. The pin 98 is guided along a slit 93a (see FIG. 48) that is formed in the bearing holder 93 in the axial direction. In addition, the inner end, in the radial direction, of the pin 98 engages with a guide groove 91b formed in the rotary barrel 91. Rectangular openings 97e are formed in the outer race 97c so as to be laid respectively over the openings 31h of the slide cams 31B. A pair of spring guides 88 and 89 are fitted to each opening 31h of the slide cam 31B and each opening 97e of the outer race 97c. An actuator spring 34 is compressed by and set between the spring guides 88 and 89.

Accordingly, the slide cam 31B is floatingly supported by the ball bearing 97. A movement, in the axial direction, of the ball bearing 97 with the movement, in the axial direction, of the slide cam 31B being restricted, makes the actuator springs 34 be compressed, so that the relative movement of the ball bearing 97 and the slide cam 31B can be absorbed. This relationship is identical to the relationship between the slide cams 31L and 31R on the left-hand and the right-hand sides of the second embodiment.

A rightward movement of the slide cam 31B of the second position from the right-hand side can move the head balls 69 and the tail balls 70 for the second-speed driven gear 25 that is located at the right-hand side of the slide cam 31B. A leftward movement of the slide cam 31B can move the head balls 69 and the tail balls 70 for the fifth-speed driven gear 23 that is located at the left-hand side of the slide cam 31B. The operation of the slide cam 31A of the first position from the right-hand side and the operation of the slide cam 31C of the third position therefrom are similar to the above-described operation of the slide cam 31B of the second position therefrom. The slide cam 31D that is located at the most left-hand side of all moves only rightwards, and moves the head balls 69 and the tail balls 70 for the seventh-speed driven gear 24 that is located at the right-hand side of the slide cam 31D.

The structure of the clutch mechanism 35 of the third embodiment is identical to those of the above-described first and the second embodiments. In the first and the second embodiments, the bushes 28 are provided to support the first-speed driven gear 21 to the seventh-speed driven gear 27, but, in the third embodiment, ball bearings 28' are provided for this purpose.

Accordingly, when the rotary barrel 91 is rotated by the actuator 92, the pins 98 that engage with the four guide grooves 91a to 91d formed in the outer circumferential surface and in the circumferential direction are guided, in the axial direction, by the slits 93a of the bearing holder 93 that is fixed to the casing. The inner races 97b are fitted to the outer circumferential surface of the bearing holder 93, and when the inner races 97b are pushed or pulled, the ball bearings 97 move in the axial direction. In addition, the slide cams 31A to 31D that are coupled to the outer races 97c of the ball bearings 97 with actuator springs 34 set in between can move individually in the axial direction.

In this event, the bearing holder 93 that is fixed to the casing prevents the inner race 97b of each ball bearing 97 from rotating. The rotary barrel 91 relatively rotates with respect to the bearing holder 93 within a range from 0° to 315°. The outer race 97c of each ball bearing 97, the slide cams 31A to 31D, and the output shaft 12 are relatively rotated, at a high speed, with respect to the bearing holder 93 by the driving force of the engine.

What follows is the detailed description for the operation in a case of up-shifting from the neutral shift stage, via the first-speed shift stage and the second-speed shift stage, to the third-speed shift stage, and then down-shifting from the third-speed shift stage, via the second-speed shift stage and the first-speed shift stage, to the neutral shift stage. The description will be given with reference to FIGS. 51 to 61.

Figure 51:
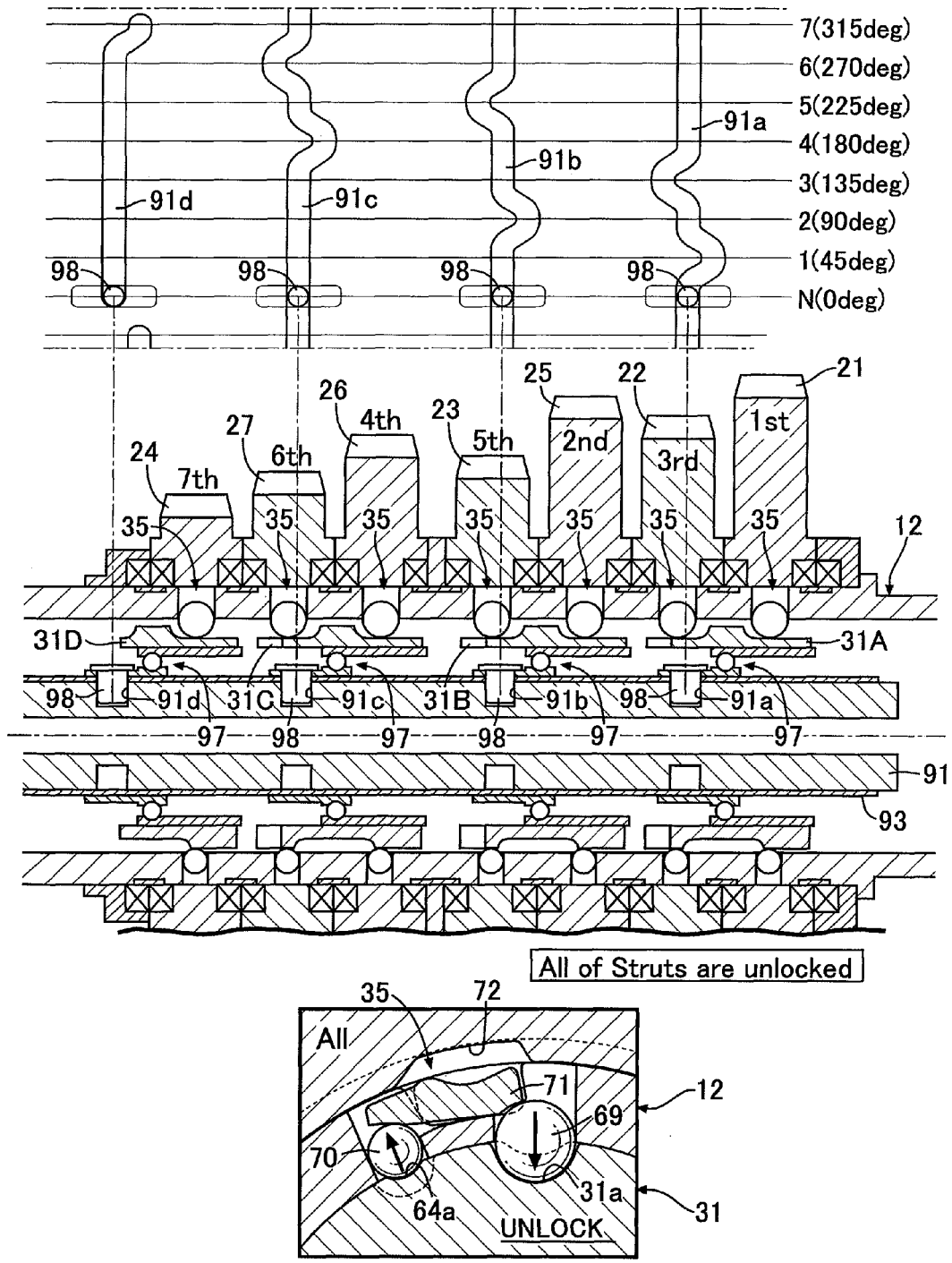

FIG. 51 illustrates the state where the neutral shift stage is achieved. All of the first to the fourth slide cams 31A to 31D are located at their respective neutral positions in the right-and-left direction. All of the head balls 69 have been fallen down respectively into the bottom portions of the cam grooves 31a. All of the tail balls 70, on the other hand, ride respectively on the cam grooves 64a. Each of the struts 71 moves swinging clockwise, so that the strut 71 disengages from the corresponding driven gear. As a consequence, in this state, the driven gear slips on the output shaft 12, so that the rotation of the input shaft 11 does not be transmitted to the output shaft 12.

Figure 52:
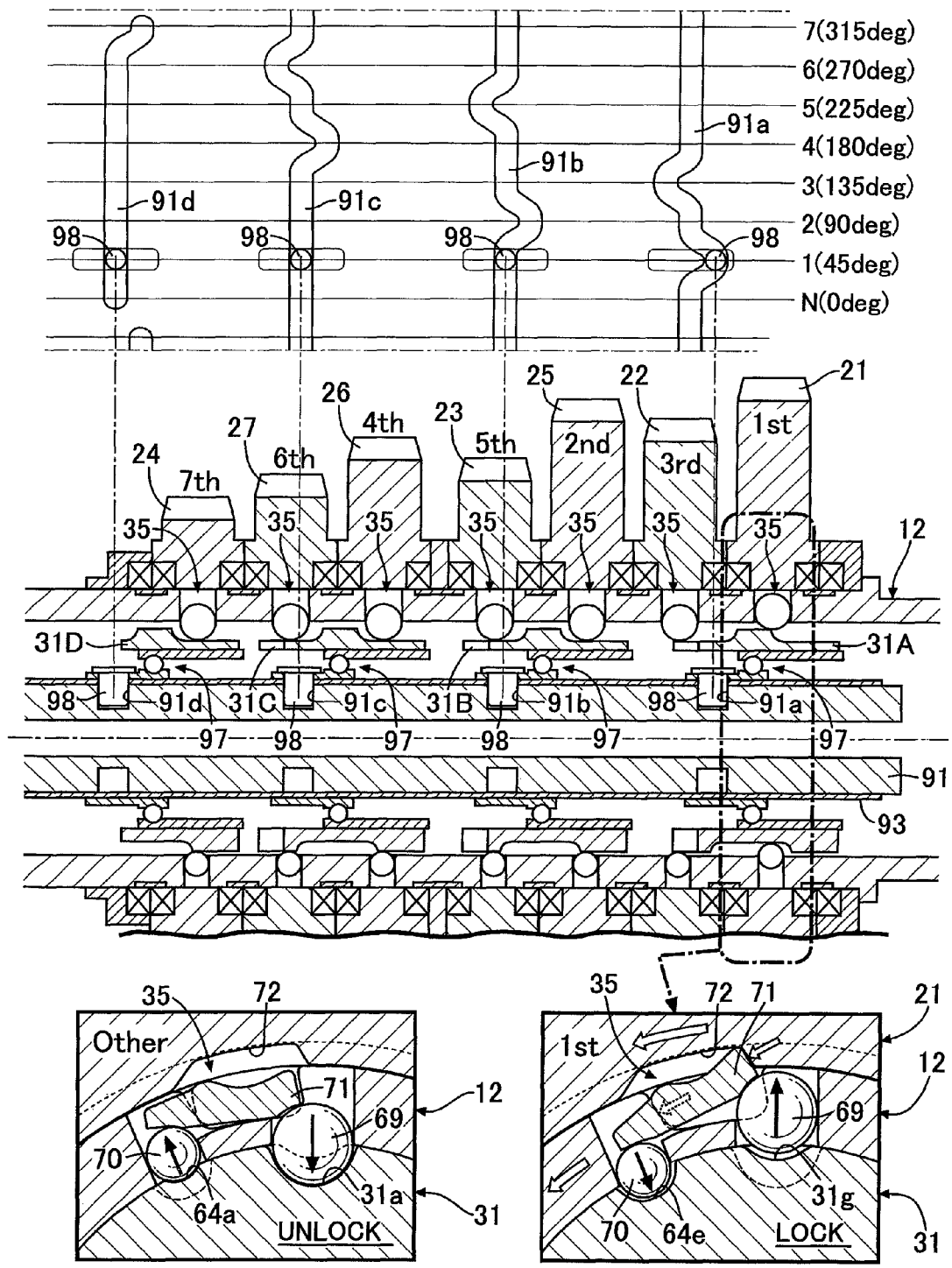

FIG. 52 illustrates the state where the engaging of the first-speed gear-set is completed. The rotational angle of the rotary barrel 91 is 45°. The first slide cam 31A is moved rightwards by the guide groove 91a of the rotary barrel 91. The convex portion 31g of the cam groove 31a pushes up the head ball 69 of the first-speed shift stage while the tail ball 70 falls down into the recessed portion 64e of the first slide cam 31A. Accordingly, the strut 71 moves swinging counterclockwise to come to be in the engaged state. The rotation of the first-speed driven gear 21 is transmitted to the output shaft 12 by means of the strut 71, so that the engaging of the first-speed gear-set is completed. In the meanwhile, the second-speed driven gear 22 to the seventh-speed driven gear 27 still remains in the disengaged state.

Figure 53:
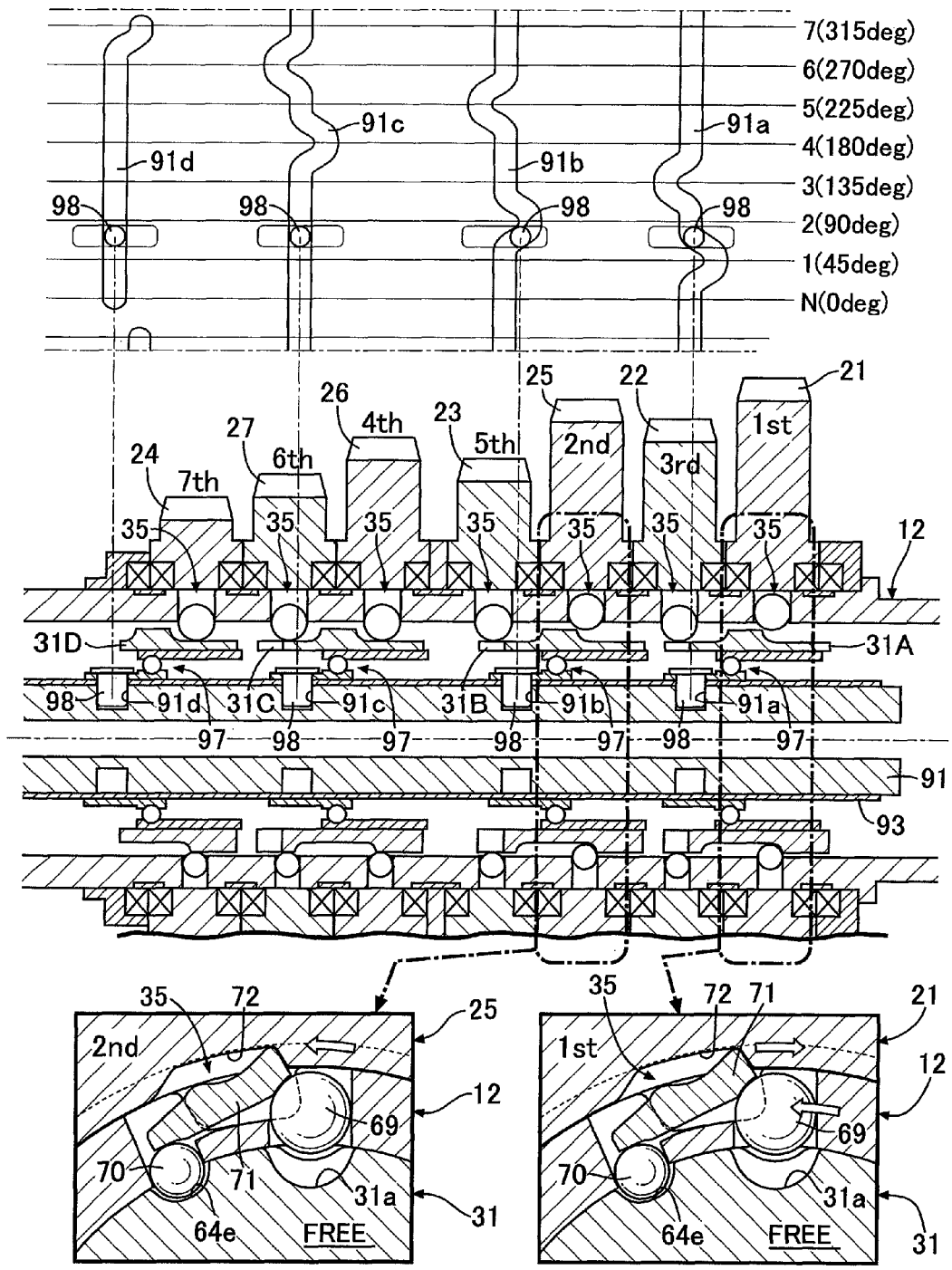

FIG. 53 illustrates the process of up-shifting from the first-speed shift stage to the second-speed shift stage. The rotational angle of the rotary barrel 91 is 70°. At this time, the guide groove 91a of the rotary barrel 91 attempts to make the first slide cam 31A resume its neutral position, so that the convex portion 31g of the cam groove 31a withdraws from the bottom of the head ball 69 of the first-speed shift stage. Instead, the cam groove 31a comes to face the bottom of the head ball 69. In the meanwhile, the head ball 69 is kept on being pushed up outwards in the radial direction by the centrifugal force. The rotation of the first-speed driven gear 21 is still being transmitted to the output shaft 12 by means of the strut 71. Accordingly, the first-speed gear set comes to be in the one-way state, and the driving force is being transmitted without any discontinuance.

While the first-speed gear set is in the one-way state and is transmitting the driving force, as described above, the strut 71 is restrained at the position at which the strut 71 swinging counterclockwise arrives. Accordingly, the tail ball 70 cannot move outwards in the radial direction, and gets stuck on the recessed portion 64e of the cam groove 64a. As a consequence, the first slide cam 31A cannot move leftwards. In addition, the first slide cam 31A cannot resume its neutral position by compressing the actuator spring 34.

In addition, at this time, the guide groove 91b of the rotary barrel 91 moves the second slide cam 31B rightwards, and the tail ball 70 falls into the recessed portion 64e of the cam groove 64a of the second slide cam 31B. Accordingly, the second-speed gear set comes to be in the one-way state. In the course of time, the cutaway 72 of the second-speed driven gear 25 reaches the position of the strut 71, and then the second-speed gear set begins to transmit the driving force. Note that until the cutaway 72 of the second-speed driven gear 25 reaches the position of the strut 71, the rightward movement of the second slide cam 31B that is compressing the actuator spring 34 is restrained. At the instant when the cutaway 72 of the second driven gear 25 reaches the position of the strut 71, the spring force of the actuator spring 34 moves the second slide cam 31B rightwards. Accordingly, the engaging of the second-speed gear set can be completed irrespective of the timing at which the actuator 92 drives the rotary barrel 91.

Once the engaging of the second-speed gear set is thus completed, the restraint for the strut 71 of the first-speed shift stage is released so as to allow the tail ball 70 to move outwards in the radial direction. Accordingly, the spring force of the compressed actuator spring 34 moves the first slide cam 31A leftwards, so that the first slide cam 31A resumes its neutral position. Thus, the first-speed gear set is disengaged. As has been described above, the first slide cam 31A is moved by the spring force of the compressed actuator spring 34 though the movement of the first slide cam 31A is delayed with a certain length of time. Accordingly, the first slide cam 31A can be moved, by the actuator 92, with only a reduced amount, so that the transmission T can be made smaller in the dimension in the axial direction.

Figure 54:
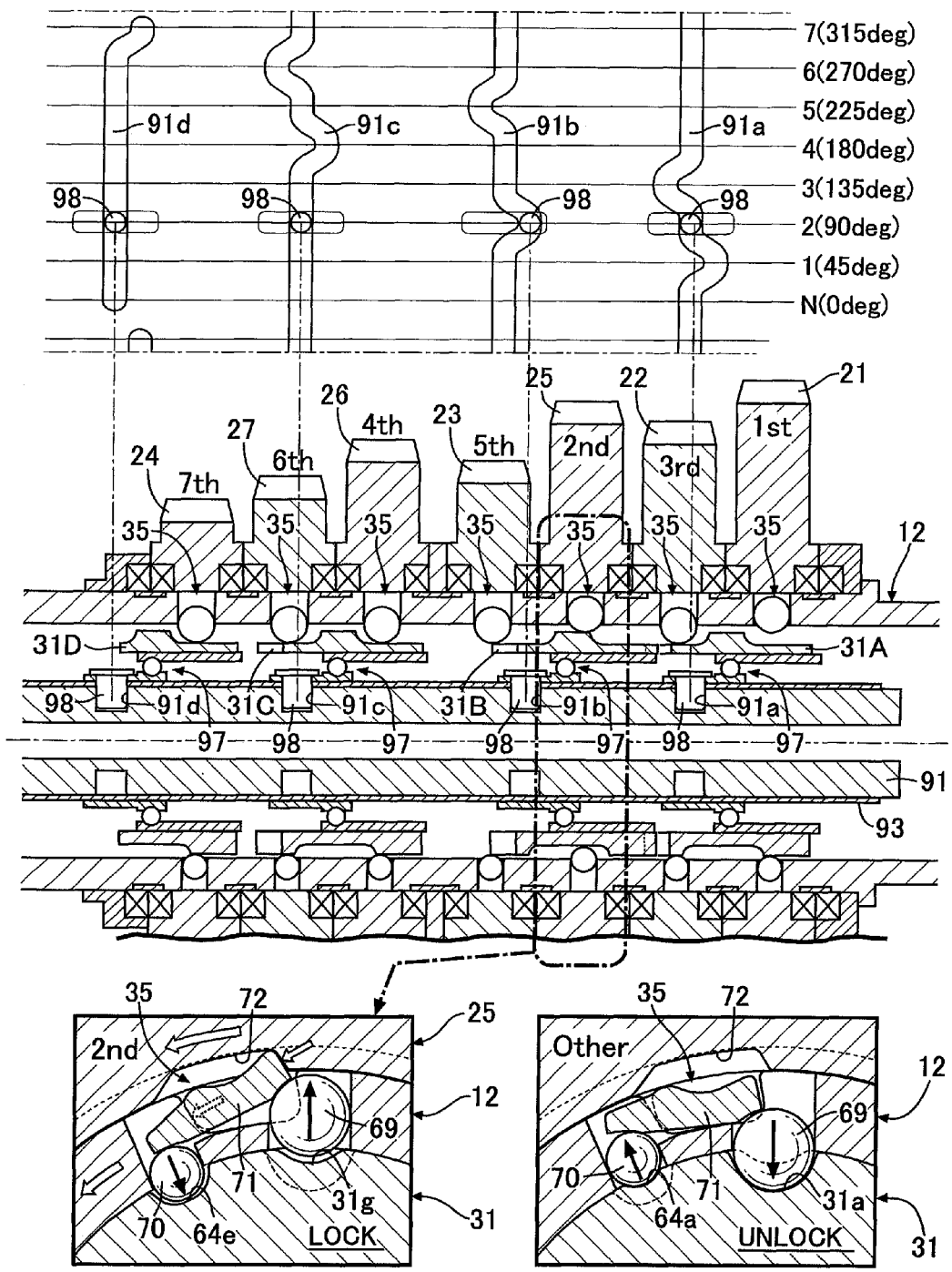

FIG. 54 illustrates the state where the rotational angle of the rotary barrel is 90°. The convex portion 31g of the cam groove 31a of the second slide cam 31B that is moved rightwards pushes up the head ball 69. The strut 71 thus moves swinging counterclockwise to complete the engaging of the second-speed gear set.

Figure 55:
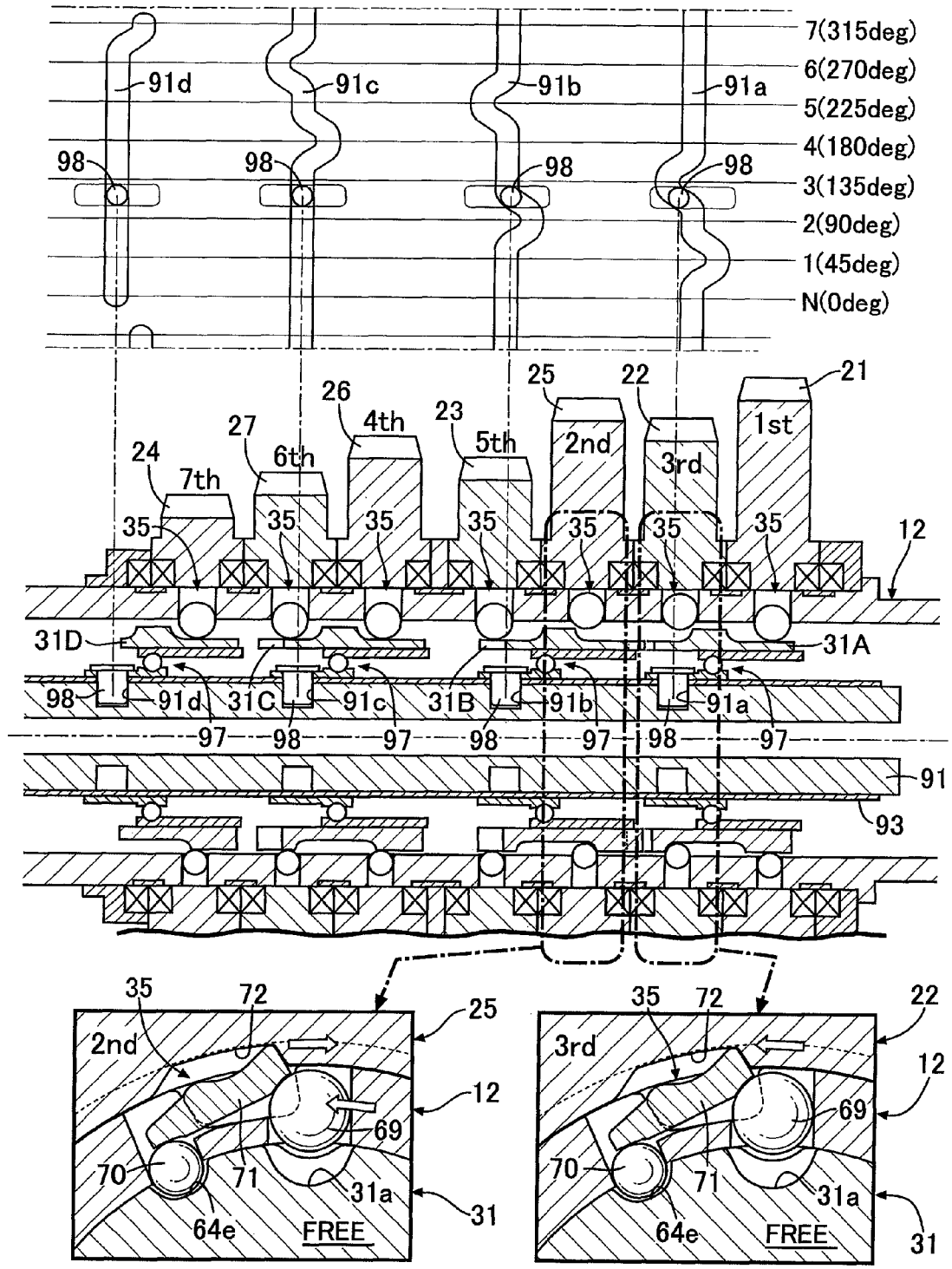

FIG. 55 illustrates the process of up-shifting the second-speed shift stage to the third-speed shift stage. The rotational angle of the rotary barrel 91 is 115°. At this time, the guide groove 91b of the rotary barrel 91 attempts to make the second slide cam 31B resume its neutral position, so that the convex portion 31g of the cam groove 31a withdraws from the bottom of the head ball 69 of the second-speed shift stage. Instead, the cam groove 31a comes to face the bottom of the head ball 69. In the meanwhile, the head ball 69 is kept on being pushed up outwards in the radial direction by the centrifugal force. The rotation of the second-speed driven gear 25 is still being transmitted to the output shaft 12 by means of the strut 71. Accordingly, the second-speed gear set comes to be in the one-way state, and the driving force is being transmitted without any discontinuance.

While the second-speed gear set is in the one-way state and is transmitting the driving force, as described above, the strut 71 is restrained at the position at which the strut 71 swinging counterclockwise arrives. Accordingly, the tail ball 70 cannot move outwards in the radial direction, and gets stuck on the recessed portion 64e of the cam groove 64a. As a consequence, the second slide cam 31B cannot move leftwards. In addition, the second slide cam 31B cannot resume its neutral position by compressing the actuator spring 34.

In addition, at this time, the guide groove 91a of the rotary barrel 91 moves the first slide cam 31A leftwards, and the tail ball 70 falls down into the recessed portion 64e of the cam groove 64a of the first slide cam 31A. Accordingly, the third-speed gear-set comes to be in the one-way state. When the cutaway 72 of the third-speed driven gear 22 reaches the position of the strut 71, the third-speed gear set begins to transmit the driving force. Note that until the cutaway 72 of the third-speed driven gear 22 reaches the position of the strut 71, the leftward movement of the first slide cam 31A that is compressing the actuator spring 34 is restrained. At the instant when the cutaway 72 of the third driven gear 22 reaches the position of the strut 71, the spring force of the actuator spring 34 moves the first slide cam 31A leftwards. Accordingly, the engaging of the third-speed gear-set can be completed irrespective of the timing at which the actuator 92 drives the rotary barrel 91.

Once the engaging of the third-speed gear-set is thus completed, the restraint for the strut 71 of the second-speed shift stage is released so as to allow the tail ball 70 to move outwards in the radial direction. Accordingly, the spring force of the compressed actuator spring 34 moves the second slide cam 31B leftwards, so that the second slide cam 31B resumes its neutral position. Thus, the second-speed gear set is disengaged. As has been described above, the second slide cam 31B is moved by the spring force of the compressed actuator spring 34 though the movement of the second slide cam 31B is delayed with a certain length of time. Accordingly, the second slide cam 31B can be moved, by the actuator 92, with only a reduced amount, so that the transmission T can be made smaller in the dimension in the axial direction.

Figure 56:
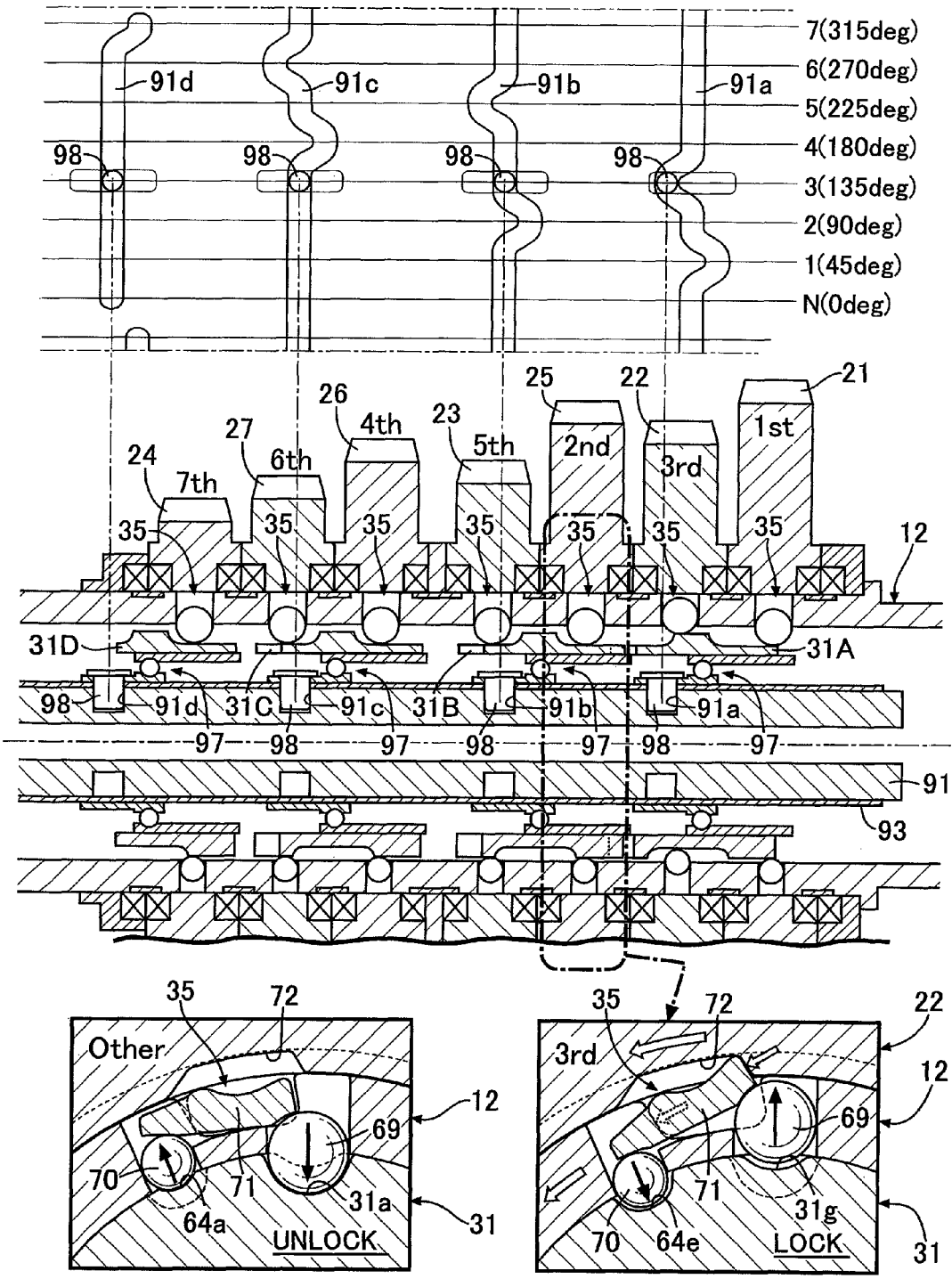

FIG. 56 illustrates the state where the rotational angle of the rotary barrel is 135°. The convex portion 31g of the cam groove 31a of the first slide cam 31A that is moved leftwards pushes up the head ball 69. The strut 71 thus moves swinging counterclockwise to complete the engaging of the third-speed gear-set.

The process of up-shifting from the neutral shift stage to the third-speed shift stage has been described thus far. The process of up-shifting from the third-speed shift stage to the seventh-speed shift stage is substantially the same as the above-described process, so that the overlapped description for the up-shifting process from the third-speed shift stage to the seventh-speed shift stage will not be given below. Instead, what will be given next is the description of down-shifting from the third-speed shift stage to the neutral shift stage.

Figure 57:
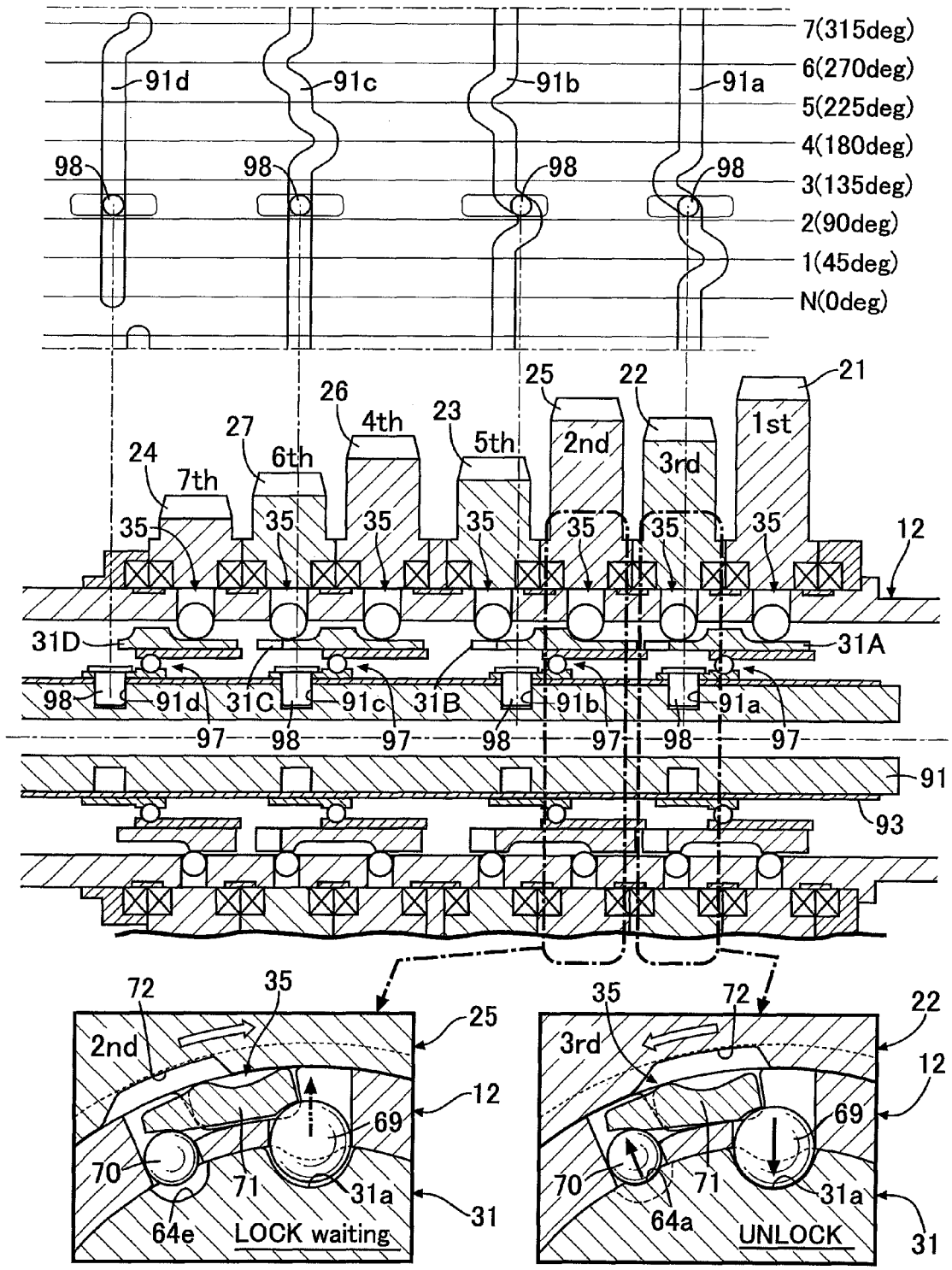

FIG. 57 illustrates the process of down-shifting from the third-speed shift stage to the second-speed shift stage. The rotational angle of the rotary barrel 91 is 106.5°. At this time, the first guide groove 91a of the rotary barrel 91 makes the first slide cam 31A resume its neutral position. The convex portion 31g of the cam groove 31a of the first slide cam 31A moves from the bottom of the head ball 69 of the third-speed shift stage to the right-hand side thereof. The head ball 69 falls down into the cam groove 31a, and the cam groove 64a pushes up the tail ball 70. Accordingly, the strut 71 moves swinging clockwise to make the first engagement face 71b withdraws from the drive face 72a of the cutaway 72 of the third-speed driven gear 22, so that the third-speed gear-set is disengaged.

In the meanwhile, the tail ball 70 of the second-speed shift stage faces the recessed portion 64e of the cam groove 64a, and the head ball 69 is biased outwards in the radial direction by the centrifugal force. The cutaway 72 of the second-speed driven gear 25, however, has not reached the position of the strut 71 yet. Accordingly, the engaging of the second-speed gear-set has not been completed yet. Once the cutaway 72 of the second-speed driven gear 25 reaches the position of the strut 71 to make the strut 71 move swinging clockwise, the engaging of the second-speed gear-set is completed. Accordingly, the transmission of the driving force is temporarily discontinued.

Figure 58:
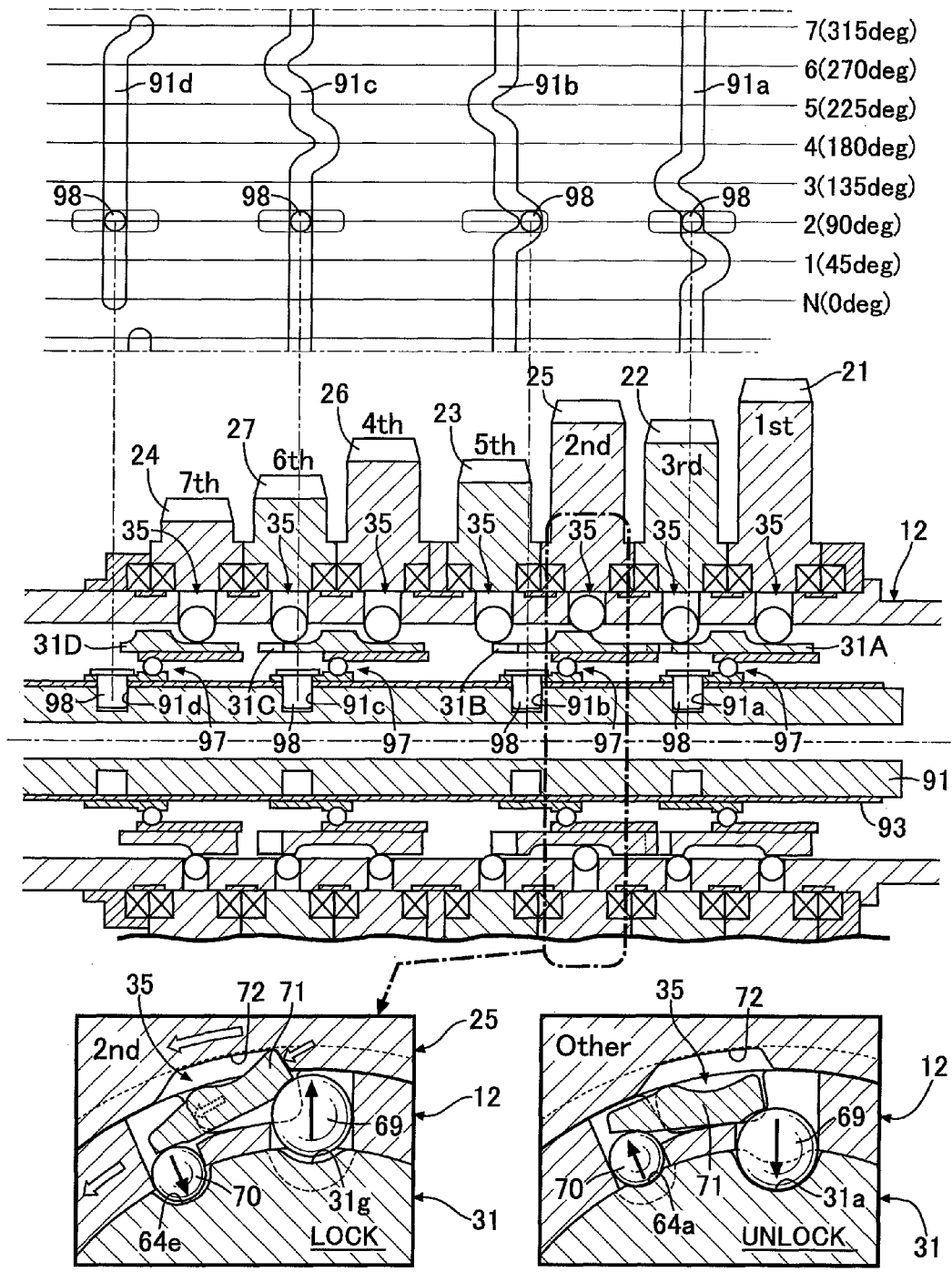

FIG. 58 corresponds to the state where the rotational angle of the rotary barrel 91 is 90°. The convex portion 31g of the cam groove 31a of the second slide cam 31B moved rightwards pushes up the head ball 69 to make the strut 71 move swinging counterclockwise. Thus, the engaging of the second-speed gear-set is completed. Until the cutaway 72 of the second-speed driven gear 25 reaches the position of the strut 71 to complete the engaging of the second-speed gear set, the rightward movement of the second slide cam 31B has been blocked. The compressing of the actuator spring 34, however, absorbs the difference in the timing, so that the engaging of the second-speed gear-set can be completed irrespective of the timing at which the actuator 92 drives the rotary barrel 91.

Figure 59:
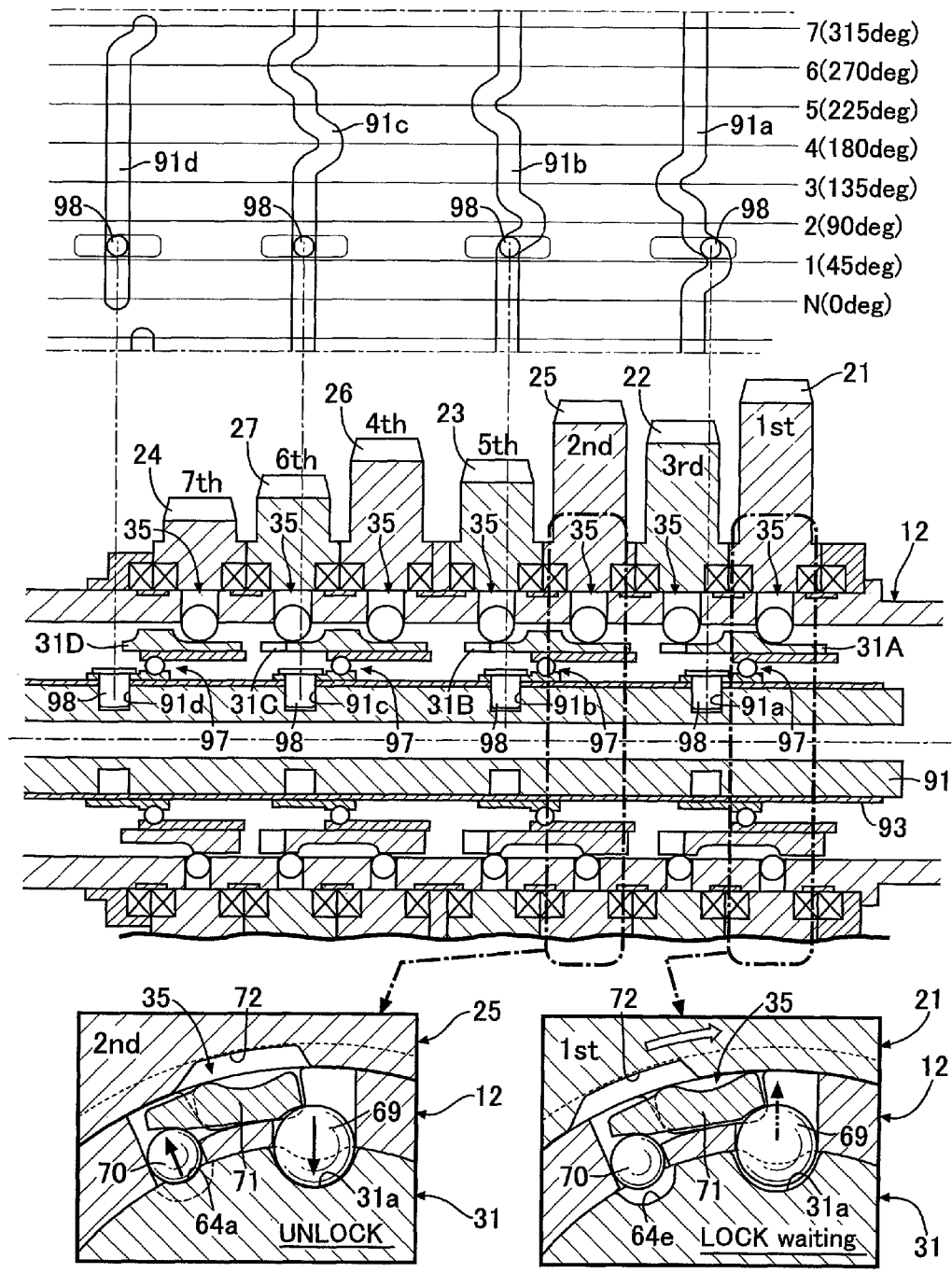

FIG. 59 illustrates the process of down-shifting from the second-speed shift stage to the first-speed shift stage. The rotational angle of the rotary barrel 91 is 61.5°. At this time, the second guide groove 91b of the rotary barrel 91 makes the second slide cam 31B resume its neutral position. The convex portion 31g of the cam groove 31a of the second slide cam 31B moves from the bottom of the head ball 69 of the second-speed shift stage to the left-hand side thereof. The head ball 69 falls down into the cam groove 31a, and thus the cam groove 64a pushes up the tail ball 70. Accordingly, the strut 71 moves swinging clockwise to make the first engagement face 71b withdraws from the drive face 72a of the cutaway 72 of the second-speed driven gear 25, so that the second-speed gear-set is disengaged.

In the meanwhile, the tail ball 70 of the first-speed shift stage faces the recessed portion 64e of the cam groove 64a, and the head ball 69 is biased outwards in the radial direction by the centrifugal force. The cutaway 72 of the first-speed driven gear 21, however, has not reached the position of the strut 71 yet. Accordingly, the engaging of the first-speed gear-set has not been completed yet. Once the cutaway 72 of the first-speed driven gear 21 reaches the position of the strut 71 to make the strut 71 move swinging clockwise, the engaging of the first-speed gear-set is completed. Accordingly, the transmission of the driving force is temporarily discontinued.

Figure 60:
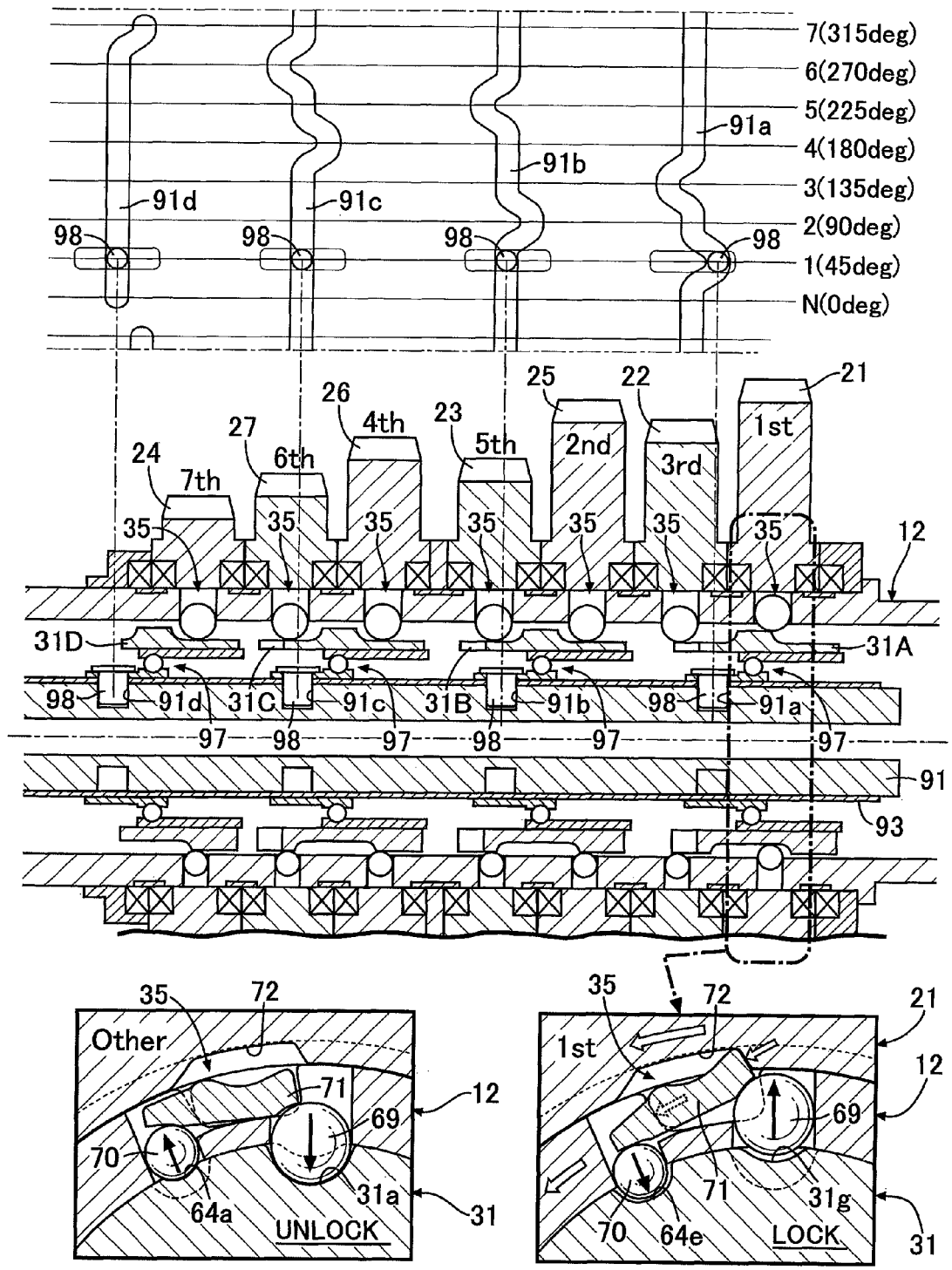

FIG. 60 corresponds to the state where the rotational angle of the rotary barrel 91 is 45°. The convex portion 31g of the cam groove 31a of the first slide cam 31A moved rightwards pushes up the head ball 69 to make the strut 71 move swinging counterclockwise. Thus, the engaging of the first-speed gear-set is completed. Until the cutaway 72 of the first-speed driven gear 21 reaches the position of the strut 71 to complete the engaging of the first-speed gear set, the rightward movement of the first slide cam 31A has been blocked. The compressing of the actuator spring 34, however, absorbs the difference in the timing, so that the engaging of the first-speed gear-set can be completed irrespective of the timing at which the actuator 92 drives the rotary barrel 91.

FIG. 61 illustrates the state where the neutral shift stage is achieved. The rotational angle of the rotary barrel 91 is 0°. At this time, the first guide groove 91a of the rotary barrel 91 makes the first slide cam 31A resume its neutral position. The convex portion 31g of the cam groove 31a of the first slide cam 31A moves from the bottom of the head ball 69 of the first-speed shift stage to the left-hand side thereof. The head ball 69 falls down into the cam groove 31a, and the cam groove 64a pushes up the tail ball 70. Accordingly, the strut 71 moves swinging clockwise to make the first engagement face 71b withdraws from the drive face 72a of the cutaway 72 of the first-speed driven gear 21, so that the first-speed gear-set is disengaged.

According to the third embodiment, the advantageous effects of the above-described second embodiment can be basically accomplished. In addition, to arrange the driven gears in the third embodiment, the driven gears that have to be grouped into a set only have to be not of successive shift stages. The degree of freedom in laying out the driven gears is enhanced to a great extent in comparison to the cases of the first and the second embodiments where the driven gears of odd-number speed shift stages are grouped into a set and the driven gears of even-number speed shift stages are grouped into a set to arrange sequentially.

In addition, the driven gears of not successive shift stages are grouped into a set and disposed. Accordingly, while the disengaging operation for the prior shift stage is going on, the engaging operation of the subsequent shift stage can be concurrently carried out. As a consequence, a more smooth gear shifting is made possible. Now assume a case where driven gears of successive shift stages are grouped into a set and disposed. In this case, the engaging operation of the subsequent shift stage has to be started after the completion of the disengaging operation of the prior shift stage. Accordingly, the gear shifting takes more time. In addition, the configuration brings about a problem of discontinuance of the transmission of driving force.

In addition, each of the slide cams 31A to 31C only has to move, either to the right-hand side or to the left-hand side, by an amount that corresponds to a single stroke (the slide cam 31D for the seventh-speed shift stage only has to move to the right-hand side by an amount that corresponds to a single stroke). Moreover, the comb-shaped slide cams 31A to 31D mesh with one another and are capable of sliding with respect to one another. Accordingly, the dimension, in the axial direction, of the transmission T can be further shortened in comparison to the cases of the first and the second embodiments.

In addition, the cylinder 30 as an actuator does not have to be disposed inside the output shaft 12. Accordingly, the diameter of the output shaft 12 can be made smaller. Moreover, the actuator 92 is disposed outside of the output shaft 12. Accordingly, the degree of freedom in choosing the actuator 92 can be enhanced.

In addition, while the bearings 97 is provided to support respectively the first to the fourth slide cams 31A to 31D on the outer circumference of the bearing holder 93, the inner race 97b and the outer race 97c of each bearing 97 is formed to be larger in the axial direction. Accordingly, the inner race 97b in which the pin hole 97d formed can be coupled to the rotary barrel 91 by means of the pin hole 97d and the pin 98. In addition, the actuator spring 34 can be supported in the opening 97e that is formed in the outer race 97c. As a consequence, the number of parts can be reduced significantly, and the diameter of the output shaft 12 can be made smaller.

Embodiments of the present invention have been described thus far, but various modifications in design can be made without departing the scope of the present invention.

For example, in the above-described embodiments, while the transmission T is provided with the input shaft 11 and the output shaft 12, the gear shifting is carried out by use of the clutch mechanisms 35 that engage or disengage the driven gears 21 to 27 disposed on the output shaft 12. Alternatively, the gear shifting may be carried out by use of the clutch mechanisms 35 that engage or disengage the drive gears 14 to 20 disposed on the input shaft 11.

In addition, the number of shift stages does not have to be seven. Any plural number of shift stages can be employed.

What is claimed is:

1. A transmission in which a plurality of gears are relatively rotatably supported on a rotational shaft, and in which a desired shift stage is achieved by selectively connecting any one of the plurality of gears to the rotational shaft by means of a corresponding one of clutch mechanisms, wherein
each of the clutch mechanisms includes:
a strut-installation groove formed in an outer circumferential portion of the rotational shaft that is formed to have a hollow structure;
a strut swingably supported in an inside of the strut-installation groove;
a first engagement face which is formed on a trailing side of the strut in a rotational direction of the gear and which is capable of engaging with a cutaway formed in an inner circumferential surface of the gear; and
a second engagement face which is formed on a leading side of the strut in the rotational direction of the gear and which engages with the strut-installation groove, and
each of the clutch mechanisms is capable of switching the following states in accordance with the position of a slide cam that is disposed in an inside of the rotational shaft so as to be movable in an axial direction, and that controls a swinging state of the strut, said states being:
an engaged state where the first engagement face of the strut is forced to protrude in the cutaway of the gear;
a one-way state where the first engagement face of the strut and the cutaway of the gear are engaged with or disengaged from each other in accordance with the rotating direction of the gear relative to the rotational shaft; and
a disengaged state where the first engagement face of the strut is forced to withdraw from the cutaway of the gear.

2. The transmission according to claim 1
wherein each of the clutch mechanisms includes:
a head-ball installation hole which is communicated with the trailing side, in the rotational direction of the gear, of the strut-installation groove and which penetrates the rotational shaft in the radial direction;
a head ball which is fitted to the head-ball installation hole so as to be movable in the radial direction, and which is capable of abutting on the inner surface, in the radial direction, of an end portion of the strut located on the trailing side, in the rotational direction of the gear;
a tail-ball installation hole which is communicated with the leading side, in the rotational direction of the gear, of the strut-installation groove and which penetrates the rotational shaft in the radial direction;
a tail ball which is fitted to the tail-ball installation hole so as to be movable in the radial direction, and which is capable of abutting on the inner surface, in the radial direction, of an end portion of the strut located on the leading side, in the rotational direction of the gear,
the slide cam is capable of controlling the position, in the radial direction, of the head ball and the position, in the radial direction, of the tail ball, and
the following states are capable of being switched in accordance with the position of the slide cam, said states being:
the engaged state where the first engagement face of the strut is forced to protrude in the cutaway of the gear, the engaged state being accomplished by allowing the inward movement, in the radial direction, of the tail ball and by pushing up the head ball outwards in the radial direction;

the one-way state where the first engagement face of the strut and the cutaway of the gear are engaged with or disengaged from each other, the one-way state being accomplished by allowing both the inward movement, in the radial direction, of the tail ball and the inward movement, in the radial direction, of the head ball;

the disengaged state where the first engagement face of the strut is forced to withdraw from the cutaway of the gear, the disengaged state being accomplished by allowing the inward movement, in the radial direction, of the head ball and by pushing up the tail ball outwards in the radial direction.

3. The transmission according to claim 2 wherein at the time of acceleration, the first engagement face of the strut is in surface contact with the cutaway of the gear, and the second engagement face of the strut is in surface contact with the strut-installation groove of the rotational shaft.

4. The transmission according to claim 2 wherein, at the time of deceleration in the engaged state, the driving force is transmitted from the cutaway of the gear to the rotational shaft by the strut, the head ball, and the head-ball installation hole.

5. The transmission according to claim 2 wherein, at the time of acceleration in the one-way state, the head ball is biased to a position outwards in the radial direction by its own centrifugal force so as to maintain the engaged state.

6. The transmission according to any one of claims 1 to 5 wherein each of the gears is supported on the outer circumference of the rotational shaft by a pair of bearing members that are disposed respectively on the opposite end portions, in the axial direction, of the gear, and each of the clutch mechanisms is disposed in a space formed between the pair of bearing members.

7. The transmission according to claim 6 wherein, among the plurality of gears, both of the two gears that are adjacent to any of the bearing members are supported together by the bearing member located between the two gears.

8. The transmission according to any one of claims 2 to 5, wherein while the head ball and the tail ball are installed respectively in the head-ball installation hole and in the tail-ball installation hole, the strut is installed in the strut-installation groove so as to cover the head ball and the tail ball from the outer side in the radial direction, and each of set-ring engagement portions that protrude respectively from the opposite end faces, in the axial direction, of the strut is held by the inner circumferential surface of a set ring that is fitted to the outer circumference of the output shaft.

9. An up-shifting method for a transmission in which a plurality of gears are relatively rotatably supported on a rotational shaft, and in which a desired shift stage is achieved by selectively connecting any one of the plurality of gears to the rotational shaft by means of a corresponding one of clutch mechanisms, each of the clutch mechanism including
 a strut-installation groove formed in an outer circumferential portion of the rotational shaft that is formed to have a hollow structure;
 a strut swingably supported in an inside of the strut-installation groove;
 a first engagement face which is formed on a trailing side of the strut in a rotational direction of the gear and which is capable of engaging with a cutaway formed in an inner circumferential surface of the gear; and
 a second engagement face which is formed on a leading side of the strut in the rotational direction of the gear and which engages with the strut-installation groove, and each of the clutch mechanisms being capable of switching the following states in accordance with the position of a slide cam that is disposed in an inside of the rotational shaft so as to be movable in an axial direction, and that performs the up-shifting operation by sequentially changing each swinging state of the strut of each shift stage, said states being:
 an engaged state where the first engagement face of the strut is forced to protrude in the cutaway of the gear;
 a one-way state where the first engagement face of the strut and the cutaway of the gear are engaged with or disengaged from each other in accordance with the rotating direction of the gear relative to the rotational shaft; and
 a disengaged state where the first engagement face of the strut is forced to withdraw from the cutaway of the gear, wherein the up-shifting method comprises:
 a first step of moving the slide cam in the up-shifting direction from a first position to a second position,
  in the first position, the gear set of the lower-speed side shift stage being in the engaged state and the gear set of the higher-speed side shift stage being in the disengaged state, and
  in the second position, the gear set of the lower-speed side shift stage being in the one-way state where the gear set is capable of transmitting the driving force and the gear set of the higher-speed side shift stage being in the disengaged state; and
 a second step of moving the slide cam in the up-shifting direction from the second position to a third position,
  in the third position, the gear set of the higher-speed side shift stage being in the engaged state and the gear set of the lower-speed side shift stage being in the disengaged state.

10. The up-shifting method for a transmission according to claim 9
wherein each of the clutch mechanisms includes:
 a head-ball installation hole which is communicated with the trailing side, in the rotational direction of the gear, of the strut-installation groove and which penetrates the rotational shaft in the radial direction;
 a head ball fitted to the head-ball installation hole so as to be movable in the radial direction, and which is capable of abutting on the inner surface, in the radial direction, of an end portion of the strut located on the trailing side, in the rotational direction of the gear;
 a tail-ball installation hole which is communicated with the leading side, in the rotational direction of the gear, of the strut-installation groove and which penetrates the rotational shaft in the radial direction;
 a tail ball which is fitted to the tail-ball installation hole so as to be movable in the radial direction, and which is capable of abutting on the inner surface, in the radial direction, of an end portion of the strut located on the leading side, in the rotational direction of the gear, the slide cam is capable of controlling the position, in the radial direction, of the head ball and the position, in the radial direction, of the tail ball, and the following states are capable of being switched in accordance with the position of the slide cam, said states being:

the engaged state where the first engagement face of the strut is forced to protrude in the cutaway of the gear, the engaged state being accomplished by allowing the inward movement, in the radial direction, of the tail ball and by pushing up the head ball outwards in the radial direction;

the one-way state where the first engagement face of the strut and the cutaway of the gear are engaged with or disengaged from each other, the one-way state being accomplished by allowing both the inward movement, in the radial direction, of the tail ball and the inward movement, in the radial direction, of the head ball;

the disengaged state where the first engagement face of the strut is forced to withdraw from the cutaway of the gear, the disengaged state being accomplished by allowing the inward movement, in the radial direction, of the head ball and by pushing up the tail ball outwards in the radial direction.

* * * * *